United States Patent
Giordano et al.

(10) Patent No.: US 7,640,185 B1
(45) Date of Patent: Dec. 29, 2009

(54) DISPENSING SYSTEM AND METHOD WITH RADIO FREQUENCY CUSTOMER IDENTIFICATION

(75) Inventors: Joseph August Giordano, Centerville, VA (US); Samuel S. Hendricks, Pflugerville, TX (US); Carl R. Jacobs, Bertram, TX (US); Thomas L. Mays, Austin, TX (US); Don Charles McCall, Round Rock, TX (US); Geeta Bholanath Nadkarni, Austin, TX (US); Karen Scott Guthrie, Oak Hill, VA (US); Lloyd G. Sargent, Elgin, TX (US); Jeffrey L. Turner, Albuquerque, NM (US); Deborah T. Wilkins, Austin, TX (US); Bernard Barink, Dallas, TX (US); Thomas Josef Flaxl, Dachau (DE); Andreas Hagl, Dachau (DE); George A. Holodak, Belton, TX (US); Loek d'Hont, Garland, TX (US); Scott D. Larson, Lewisville, TX (US); Robert A. Lorentzen, Carrollton, TX (US); Joseph Pearson, Cedar Park, TX (US); Anne Tip, Den Hague (NL); Alex J. Weyer, Borne (NL)

(73) Assignees: Dresser, Inc., Addison, TX (US); ExxonMobile Oil Corporation, Fariview, VA (US); Texas Instruments Incorporated, Dallas, TX (US)

( * ) Notice: Subject to any disclaimer, the term of this patent is extended or adjusted under 35 U.S.C. 154(b) by 0 days.

(21) Appl. No.: 09/224,027
(22) Filed: Dec. 31, 1998

Related U.S. Application Data

(63) Continuation-in-part of application No. 08/768,723, filed on Dec. 18, 1996, now abandoned.
(60) Provisional application No. 60/009,369, filed on Dec. 29, 1995.

(51) Int. Cl.
*G06Q 40/00* (2006.01)
(52) U.S. Cl. ............................................ 705/23; 705/1

(58) Field of Classification Search ................ 705/1, 705/10–44
See application file for complete search history.

(56) References Cited

U.S. PATENT DOCUMENTS 3,527,268 A    9/1970   Ginsburgh
(Continued)

FOREIGN PATENT DOCUMENTS

EP         0 253 499 B1    1/1988
(Continued)

OTHER PUBLICATIONS

"Buying gas at the pump no longer requires a card . . . ", Business Wire, p4040100, Dialog file 148, Accession No. 09402394, Apr. 4, 1997.*
(Continued)

*Primary Examiner*—Frantzy Poinvil
(74) *Attorney, Agent, or Firm*—Fish & Richardson P.C.

(57) ABSTRACT

A system and method for providing a fuel dispenser with radio frequency customer identification capabilities. The system and method determines whether a transponder containing customer identification data is within range of a dispenser, the dispenser requiring activation by the customer to initiate a transaction and including a reader associated therewith for emitting radio frequency signals within the dispenser range, and for receiving customer identification data from the transponder responsive to the emitted radio frequency signals received by the transponder. When the transponder is within range of the dispenser, an in-range indication is provided to the customer. A determination is made whether the dispenser has been activated by the customer following a determination that the transponder is within the dispenser range. Upon activation of the dispenser following the determination that the transponder is within the dispenser range, the customer identification data received by the reader is associated with a transaction at the activated dispenser, whereupon the transaction at the activated dispenser is permitted and charged to the customer according to the customer identification data. The system easily retrofits onto an existing, conventional fuel dispenser.

34 Claims, 31 Drawing Sheets

U.S. PATENT DOCUMENTS

| | | | |
|---|---|---|---|
| 3,536,109 A | 10/1970 | Ginsburgh et al. | |
| 3,582,890 A | 6/1971 | Rivers | 340/149 |
| 3,602,881 A | 8/1971 | Bayne et al. | |
| 3,639,894 A | 2/1972 | Tanaka | |
| 3,641,569 A | 2/1972 | Bushnell et al. | |
| 3,642,036 A | 2/1972 | Ginsburgh et al. | |
| 3,670,303 A | 6/1972 | Dame | |
| 3,873,019 A | 3/1975 | Holcolmb | |
| 3,931,497 A | 1/1976 | Gentile et al. | |
| 3,952,285 A | 4/1976 | Falck | |
| 4,075,632 A | 2/1978 | Baldwin et al. | |
| 4,107,777 A * | 8/1978 | Pearson et al. | 705/413 |
| 4,199,100 A | 4/1980 | Wostl et al. | |
| 4,263,945 A * | 4/1981 | Van Ness | |
| 4,278,977 A | 7/1981 | Nossen | |
| 4,303,904 A | 12/1981 | Chasek | |
| 4,313,168 A | 1/1982 | Stephens et al. | |
| 4,325,146 A | 4/1982 | Lennington | |
| 4,333,072 A | 6/1982 | Beigel | |
| 4,335,426 A | 6/1982 | Maxwell et al. | |
| 4,338,587 A | 7/1982 | Chiappetti | |
| 4,345,146 A | 8/1982 | Story et al. | |
| 4,361,837 A | 11/1982 | Malinowski et al. | |
| 4,395,627 A | 7/1983 | Barker et al. | |
| 4,398,172 A | 8/1983 | Carroll et al. | |
| 4,469,149 A | 9/1984 | Walkey et al. | |
| 4,490,798 A | 12/1984 | Franks et al. | |
| 4,555,618 A | 11/1985 | Riskin | |
| 4,614,945 A | 9/1986 | Brunius et al. | |
| 4,658,371 A | 4/1987 | Walsh et al. | |
| 4,691,202 A | 9/1987 | Denne et al. | |
| 4,739,328 A | 4/1988 | Koelle et al. | |
| 4,782,342 A | 11/1988 | Walton | |
| 4,799,059 A | 1/1989 | Grindahl et al. | |
| 4,804,961 A | 2/1989 | Hane | |
| 4,829,540 A | 5/1989 | Waggener, Sr. et al. | |
| 4,846,233 A | 7/1989 | Flockens | |
| 4,862,162 A | 8/1989 | Duley | |
| 4,864,615 A | 9/1989 | Bennet et al. | |
| 4,881,581 A | 11/1989 | Hollerback | |
| 4,882,779 A | 11/1989 | Rahtgen | |
| 4,888,474 A | 12/1989 | Walton | |
| 4,912,471 A | 3/1990 | Tyburski et al. | |
| 4,916,296 A | 4/1990 | Streck | |
| 4,918,955 A | 4/1990 | Kimura et al. | |
| 4,932,049 A | 6/1990 | Lee | |
| 4,934,419 A | 6/1990 | Lamont et al. | |
| 4,937,581 A | 6/1990 | Baldwin et al. | |
| 4,967,366 A | 10/1990 | Kaehler | |
| 4,989,146 A | 1/1991 | Imajo | |
| 5,030,807 A | 7/1991 | Landt et al. | |
| 5,047,613 A | 9/1991 | Swegen et al. | |
| 5,053,774 A | 10/1991 | Schuermann et al. | |
| 5,072,380 A * | 12/1991 | Randelman et al. | |
| 5,124,697 A | 6/1992 | Moore | |
| 5,144,312 A | 9/1992 | McCann | |
| 5,144,667 A | 9/1992 | Pogue et al. | |
| 5,144,677 A | 9/1992 | Asakura et al. | |
| 5,156,198 A | 10/1992 | Hall | |
| 5,164,985 A | 11/1992 | Nysen et al. | |
| 5,204,819 A | 4/1993 | Ryan | |
| 5,211,129 A | 5/1993 | Taylor et al. | |
| 5,214,409 A | 5/1993 | Beigel | |
| 5,257,011 A | 10/1993 | Beigel | |
| 5,310,999 A | 5/1994 | Claus et al. | |
| 5,321,753 A | 6/1994 | Gritton | |
| 5,327,066 A | 7/1994 | Smith | |
| 5,340,969 A | 8/1994 | Cox | |
| 5,343,906 A | 9/1994 | Tibballs, III | |
| 5,349,332 A | 9/1994 | Ferguson et al. | |
| 5,351,052 A | 9/1994 | D'Hont et al. | |
| 5,355,120 A | 10/1994 | Ferguson et al. | |
| 5,355,137 A | 10/1994 | Schurmann | |
| 5,359,522 A | 10/1994 | Ryan | |
| 5,369,706 A | 11/1994 | Latka | |
| 5,377,270 A | 12/1994 | Koopman, Jr. et al. | |
| 5,383,500 A | 1/1995 | Dwars et al. | |
| 5,422,624 A | 6/1995 | Smith | |
| 5,450,492 A | 9/1995 | Hook et al. | |
| 5,453,747 A | 9/1995 | D'Hont et al. | |
| 5,482,139 A | 1/1996 | Rivalto | |
| 5,485,520 A | 1/1996 | Chaum et al. | |
| 5,493,315 A | 2/1996 | Atchley | |
| 5,499,181 A | 3/1996 | Smith | |
| 5,508,705 A | 4/1996 | Spiess | |
| 5,552,789 A | 9/1996 | Schuermann | |
| 5,557,268 A | 9/1996 | Hughes et al. | |
| 5,557,529 A | 9/1996 | Warn et al. | |
| 5,602,745 A | 2/1997 | Atchley et al. | |
| 5,602,919 A | 2/1997 | Hurta et al. | |
| 5,605,182 A | 2/1997 | Oberrecht et al. | |
| 5,612,890 A | 3/1997 | Strasser et al. | |
| 5,628,351 A | 5/1997 | Ramsey, Jr. et al. | |
| 5,637,845 A | 6/1997 | Kolls | 235/381 |
| 5,637,846 A | 6/1997 | Boers et al. | |
| 5,638,875 A | 6/1997 | Corfitsen | |
| 5,644,119 A | 7/1997 | Padula et al. | |
| 5,648,767 A | 7/1997 | O'Connor et al. | |
| 5,694,326 A | 12/1997 | Warn et al. | 364/479.01 |
| 5,717,374 A | 2/1998 | Smith | |
| 5,797,470 A | 8/1998 | Behnert et al. | 186/53 |
| 5,859,779 A | 1/1999 | Giordano et al. | |
| 6,070,156 A * | 5/2000 | Hartsell, Jr. | 705/413 |

FOREIGN PATENT DOCUMENTS

| | | |
|---|---|---|
| EP | 0 358 525 A2 | 3/1990 |
| EP | 0349316 | 3/1990 |
| EP | 0 358 525 A3 | 7/1991 |
| EP | 0 198 642 B2 | 5/1996 |
| EP | 0 930 590 A1 | 7/1999 |
| GB | 2 222 714 A | 3/1990 |
| GB | 2222714 | 3/1990 |
| JP | 62-297971 | 12/1987 |
| JP | 401282696 A * | 11/1989 |
| JP | 2-23465 | 1/1990 |
| JP | 424153 | 1/1992 |
| JP | 5-229599 | 9/1993 |
| JP | 6-68317 | 3/1994 |
| JP | 6-176251 | 6/1994 |
| WO | WO 95/14612 | 6/1995 |
| WO | WO 95/32919 | 12/1995 |
| WO | WO 97/21626 | 6/1997 |
| WO | WO 97/35284 | 9/1997 |
| WO | WO99/16701 | 4/1999 |

OTHER PUBLICATIONS

Joe Quinlan, "Rad O Tags—The New Identifiers", Handling & Shipping Management, V. 26, p. 90-93. Apr. 1985.

Identification Devices Inc., "Automated Vehicle Identification System I. D.", (Brochure), Nov. 1986.

Circle, "Budget to Test Automated Return System", p. 174.

* cited by examiner

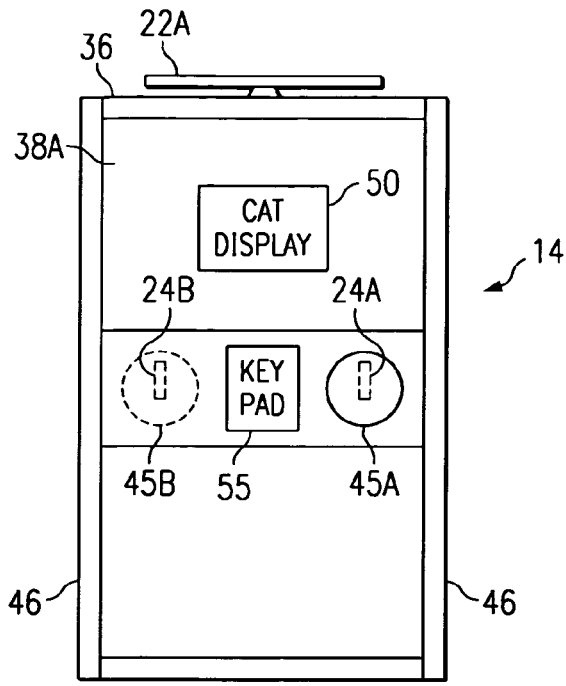
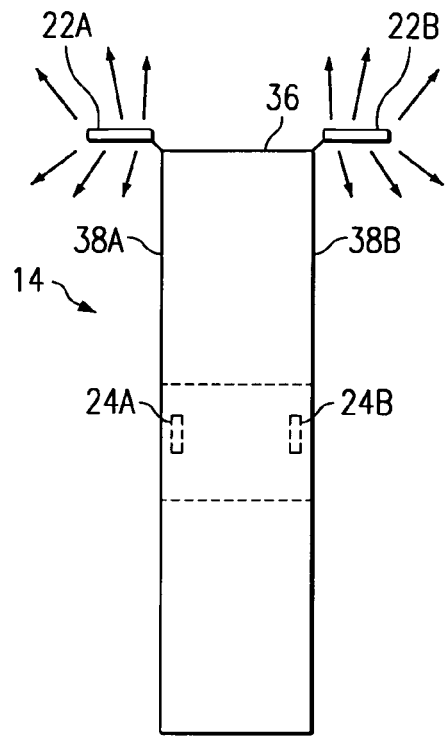
Fig. 4A  Fig. 4B
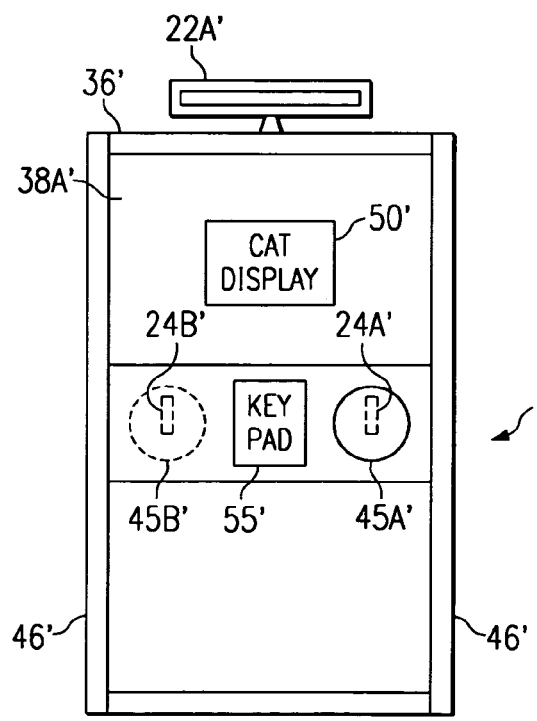
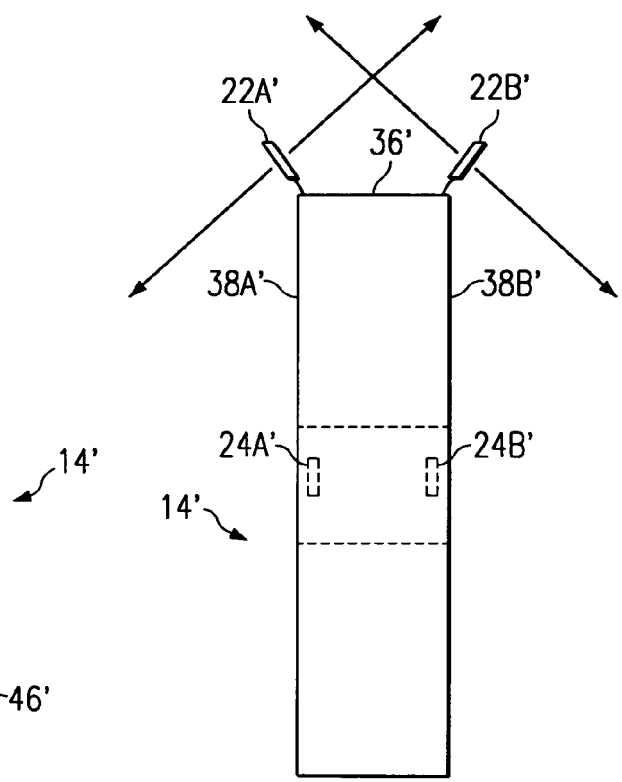
Fig. 5A  Fig. 5B

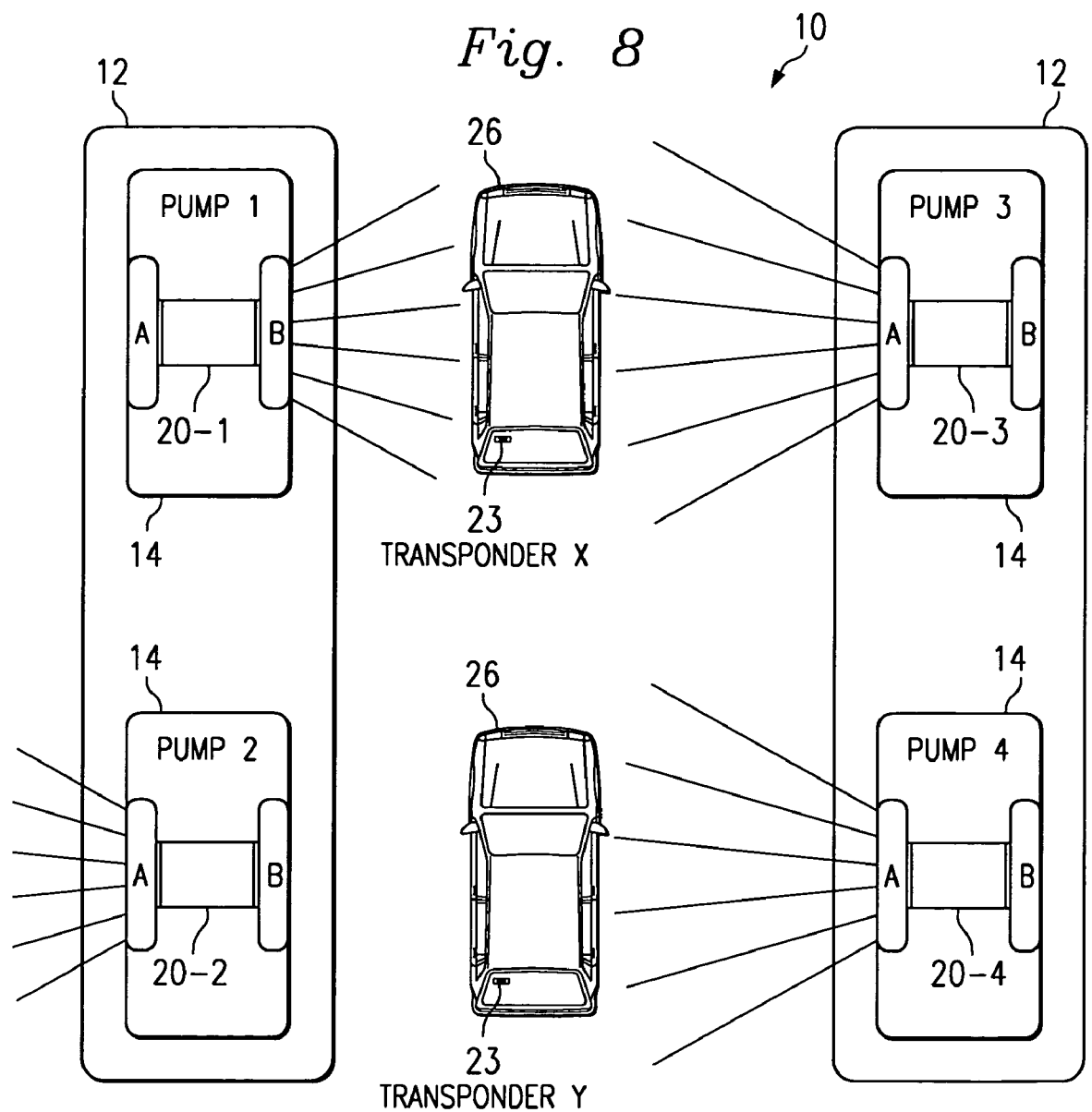

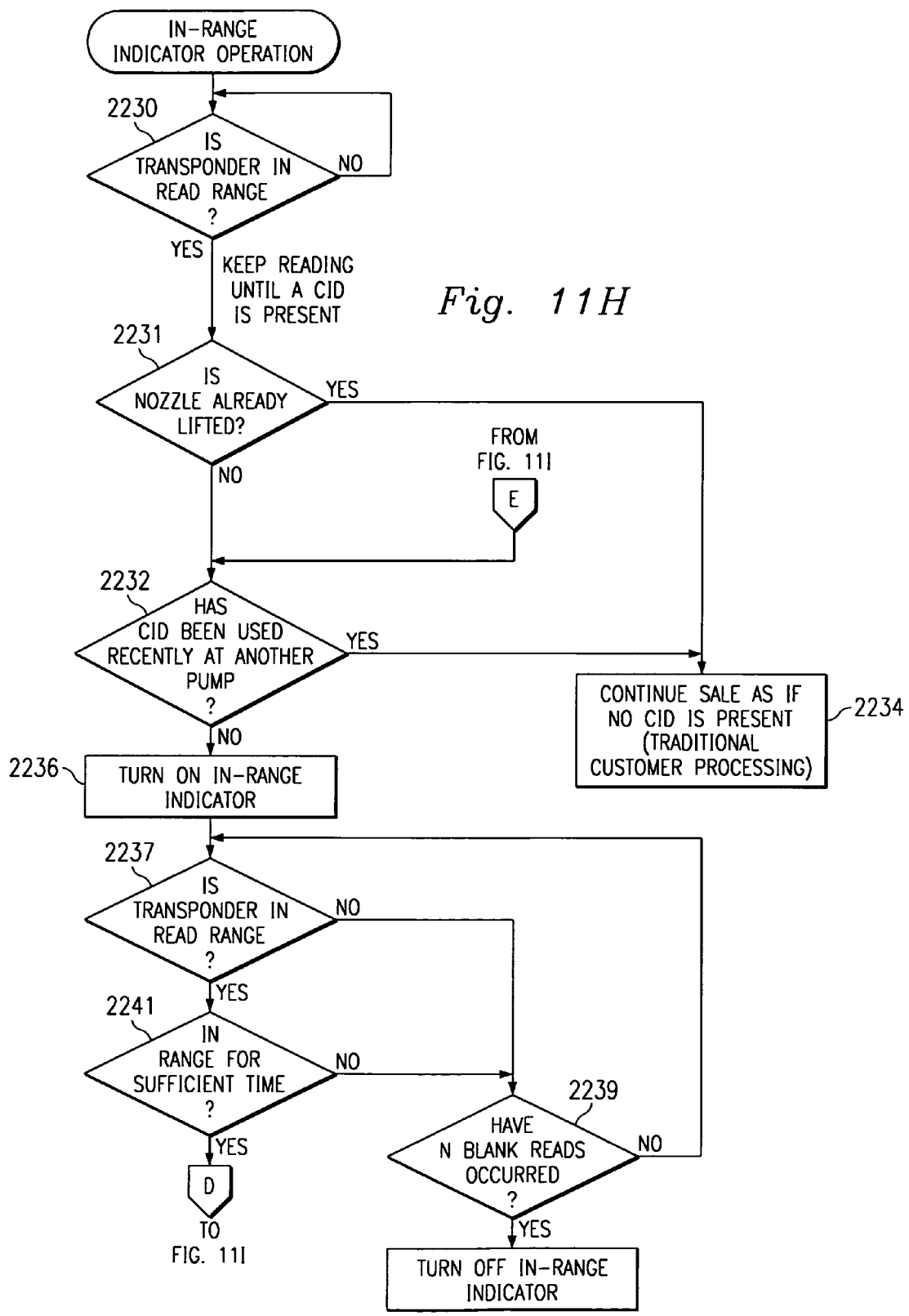

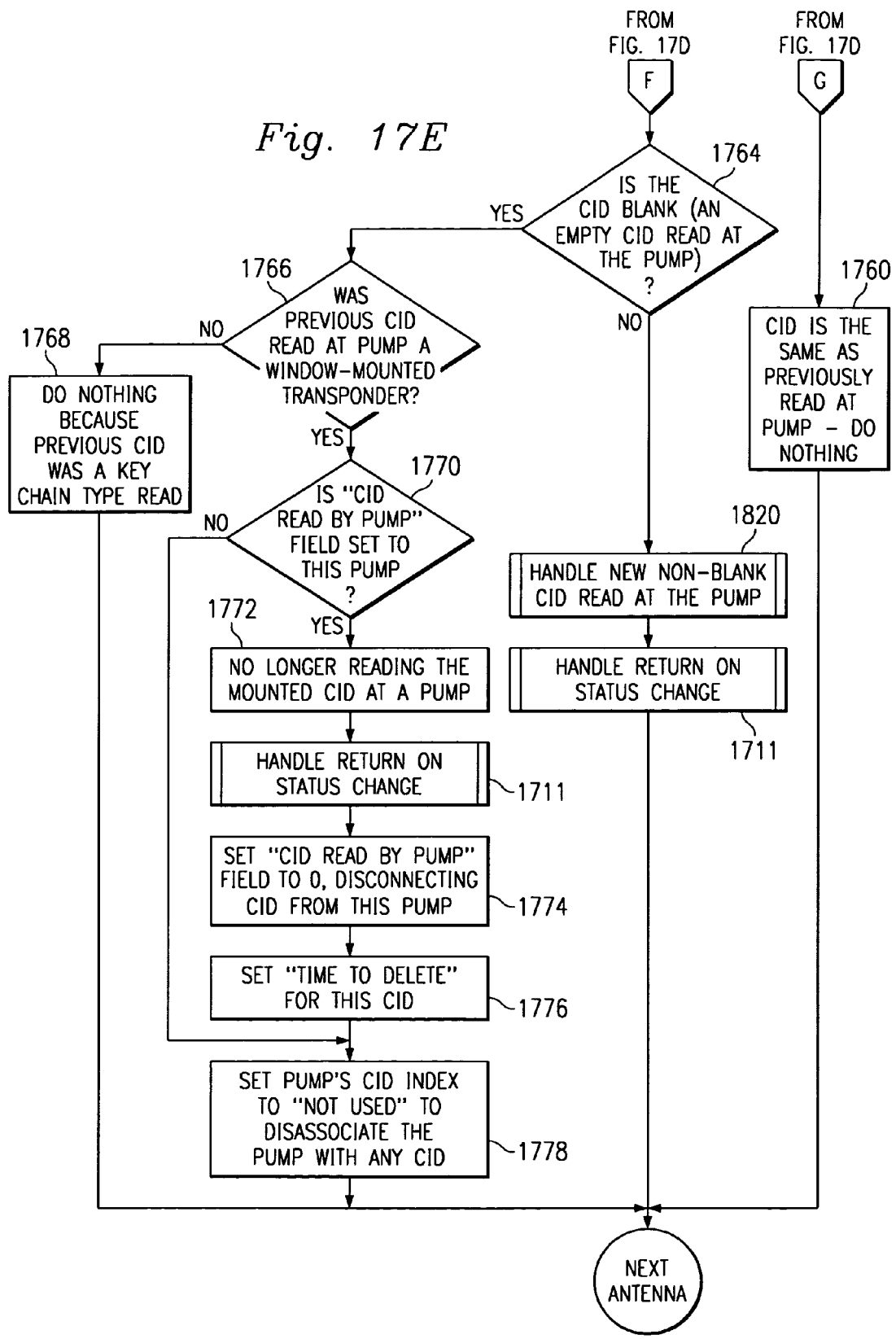

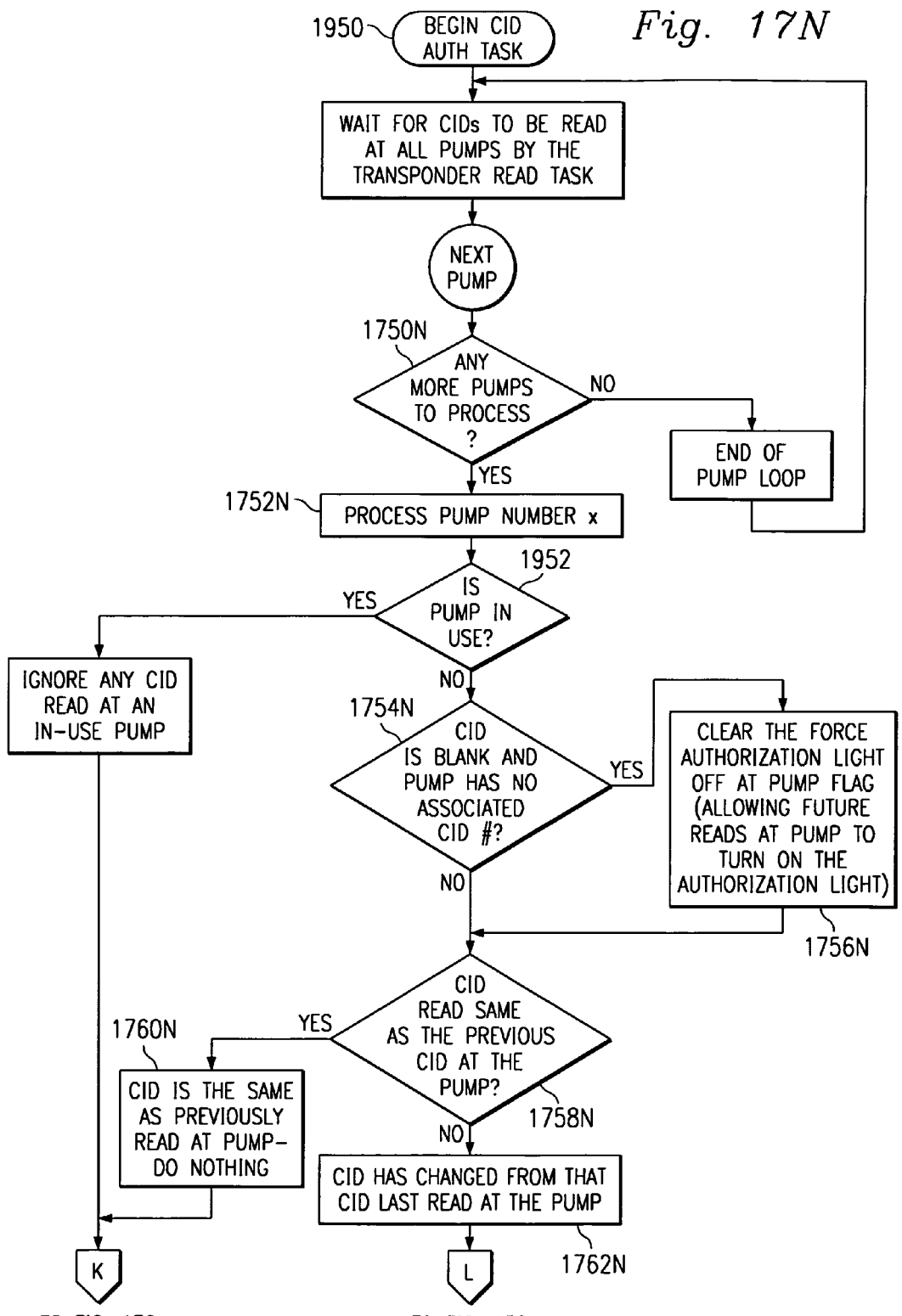

DISPENSING SYSTEM AND METHOD WITH RADIO FREQUENCY CUSTOMER IDENTIFICATION

CROSS REFERENCE

This application is a continuation-in-part of U.S. patent application Ser. No. 08/768,723, filed on Dec. 18, 1996 now abandoned, which claims the benefit of U.S. Provisional Application No. 60/009,369, filed Dec. 29, 1995.

BACKGROUND OF THE INVENTION

The present invention relates to dispensers and, more particularly, to fuel dispensers that uses radio frequency identification technology to automatically identify a customer with little or no customer interaction in order to authorize the sale of products or services to the customer and to subsequently bill the customer's charge account for the products or services. The present invention is particularly useful in a service station environment where customers may purchase fuel for their vehicles, obtain a car wash, or purchase other items such as food, drinks, or sundries from a convenience store, or drive-through window, that may be located on the premises.

Typically, when a customer purchases fuel at a service station, the customer presents payment, in the form of cash or credit/debit card, to the service station attendant either before or after fueling. The attendant controls the activation of the dispenser to allow fueling. If payment is required before fueling may begin, the attendant must activate a switch, typically near the cash register, in order to unlock the dispenser to allow fueling to begin. Once fueling has been completed and the dispenser nozzle has been returned to its seat, the attendant manually resets the dispenser again through activation of a switch at the cash register.

An example of an existing service station control system that integrates dispenser control and cash register control is the Wayne Plus/2 control system available from Wayne Division. Dresser Industries, Inc. of Austin, Tex. The Wayne Plus/2 system includes a host computer or site controller and a point-of-sale terminal that interfaces with the attendant.

The Wayne Plus/2 host computer is provided with a microprocessor and a pump controller board that is electrically linked to the various dispensers of the station to provide pump control. The pump controller board turns the dispensers on or off, controls the flow rate, and keeps track of the amount of fuel dispensed. The host computer is also provided with memory, communication ports, and a serial input/output board ("SIO") that may be linked to a remote customer-authorization computer network.

The point-of-sale terminal (also known as a Wayne Plus brand Retail Control System) includes a card reader for reading and identifying credit/debit cards, a keyboard for use by the attendant, and a display. The attendant can use the point-of-sale terminal to process payments and to control the activation of the dispensers. Should a customer choose to use a credit/debit card for payment, the attendant runs the card through the card reader, and the credit/debit card information is forwarded to the remote customer-authorization network for verification and billing.

Many service stations, however, are now equipped with credit/debit card readers at the dispensers for direct use by the customer. An example of a service station system that integrates dispenser control, cash register control, and credit/debit card processing that may be originated at the dispenser is the Wayne Plus/3™ system available from Wayne Division, Dresser Industries, Inc. of Austin, Tex. The Wayne Plus/3 system is similar to the Wayne Plus/2 system described above; however, the host computer or site controller has been modified to accommodate dispensers equipped with customer-activated-terminals (CATs) electronically linked to the host computer.

The customer-activated-terminals (CATs) each have a card reader, a display which displays messages to the customer, a key pad for use by the customer to make fueling and payment selections, a printer for printing receipts, and individual price displays corresponding to the individual fuel dispensing nozzles of the dispenser. Examples of dispensers equipped with such customer-activated terminals (CATs) are the Vista brand fuel dispensers available from Wayne Division. Dresser Industries, Inc. of Austin, Tex.

The Wayne Plus/3 host computer is loaded with a software driver (also referred to herein as a "primitive") for controlling and interfacing with the CATs. Before a customer begins fueling, the customer uses the keyboard of the CAT to select the type of payment desired (e.g. cash or credit/debit card). If the customer chooses to pay with a credit/debit card, the customer inserts the credit/debit card into the card reader at the CAT. The customer then waits for a message to display indicating that the customer may begin fueling. The CAT forwards the credit/debit card information to the host computer which in turn forwards the credit/debit card information to the remote customer authorization network for verification and billing. U.S. Pat. No. 5,340,969 issued Aug. 23, 1994 to Dresser Industries, Inc. describes a method and apparatus for approving or disapproving fuel dispensing transactions using credit cards.

In both types of systems described above, the customer is required to interact (for payment purposes) with either the service station attendant or with the customer-activated terminal (CAT) at the dispenser. U.S. Pat. No. 5,072,380 issued to Robert E. Randelman et al. describes an automatic vehicle recognition and customer billing system that may be used in a service station environment. The system automatically recognizes vehicles and correlates the purchase of products and services with the vehicle.

The system of the '380 patent includes an antenna embedded in the ground near a gasoline dispensing pump. The antenna is connected to a controller located in a housing near the antenna. The controller controls the output of a radio frequency signal from the antenna and can detect an RF input signal. The antenna is always energized and, therefore, creates an electromagnetic field at a predetermined radio frequency in the fueling area.

The system of the '380 patent also includes an emitter (or card) affixed to a vehicle. The card comprises an RF coil and integrated circuit component. When the card crosses the electromagnetic field, the electromagnetic field energizes the card. The activated card then emits an encoded electromagnetic pulse signal. The controller receives the signal and converts it into a data bit stream. A computer receives the data bit stream from the controller and in turn utilizes the data for displaying information on the pump display, for controlling the fuel dispenser, and for billing purposes.

One disadvantage of the '380 patent is that the antenna which emits the electromagnetic field is embedded in the ground near the fuel dispenser. The installation of such an antenna (or antennas where there is more than one dispenser) can be costly and can create a fire hazard from fueling spills or leaks from the fuel storage tanks typically located under ground near the fuel dispensers. Furthermore, where multiple dispensers are present and therefore multiple antennas and controllers are present, the system does not adequately prevent a vehicle card from being activated by more than one antenna at a time and detected by more than one controller at a time, such as may happen where antennas are positioned near each other and therefore interfere with one another. Furthermore, the system does not prevent the inadvertent detection of vehicle cards not intended to be used in a fueling transaction.

Many service stations provide for separate fueling on both sides of a dispenser and/or have several closely-spaced rows of dispensers. With such a dispenser arrangement and the system of the '380 patent, the vehicle card of a vehicle stopped between antennas may be detected by the wrong controller, i.e., one not associated with the dispenser where the vehicle is actually receiving fuel, or may wrongly be detected by a controller, i.e., where the vehicle is stopped near an antenna but is not fueling.

Other automatic identification systems exist that employ radio frequency technology. For example, Texas Instruments Incorporated of Dallas, Tex., markets a number of radio frequency identification systems referred to commercially as its TIRIS™ (Texas Instruments Registration and Identification Systems) product line. The TIRIS™ product line includes radio frequency transponders (read-only as well as read-write) that may be low frequency or high frequency in their operation and which may be attached to or embedded in objects or may be hand-held. Readers, through antennas, send out radio frequency waves to the transponders, and the transponders broadcast stored data back to the reader for processing. Suggested applications of the TIRIS™ product line include an automatic access system for parking lot entrance and exit barriers, anti-theft systems for vehicles (where a transponder is placed in the ignition key and a transceiver module is positioned near the ignition), and a fuel dispensing system (where a transponder is mounted beside the vehicle's fuel tank and a transceiver is mounted on the fuel dispensing nozzle). The fuel dispensing system application, however, is not desirable because maintenance of the fuel dispensing nozzle with the transceiver can present a service problem as well as a replacement problem and, furthermore, the location of the transponder and transceiver can create a fire hazard.

Application of the above-described radio frequency customer identification (RF-CID) technology to a service station environment is fraught with heretofore unresolved problems. In large service stations with multiple islands of two-sided pumps and heavy, unpredictable traffic patterns, the potential exists for unintended crosstalk. i.e., "cross-reads," of an RF-CID transponder attached to a vehicle by the wrong antenna/reader. Crosstalk can result in the erroneous billing of a customer for services never received. While commercially available readers can be physically linked or otherwise operated to synchronize their transmission pulses, a system and strategy has not yet been developed for effectively synchronizing multiple readers in a service station environment to minimize, if not eliminate, cross-reads. The problem of implementing a synchronization strategy, once determined, is further complicated by individual readers dropping out of synchronization in the course of detecting transponders.

In addition to transponder crosstalk, other aspects of the customer identification process are less than ideal when RF-CID technology is used in a service station environment. As mentioned previously, the vehicle recognition system of the '380 patent, in addition to providing an impractical antenna/controller arrangement, uses a vehicle identification method that begins to activate the account when it is determined that the vehicle in proximity to the antenna has stopped moving, and upon such determination, locks out other antennas (and their respective pump controllers) from reading the same customer's transponder. While the foregoing may be adequate in an idealized service station environment with predictable vehicle flow patterns, this method of activation is unreliable in a station with multiple islands of two-sided pumps and can result in improper or problematic customer activation.

What is needed, therefore, is a radio frequency customer identification (RF-CID) system for a service station that reliably and accurately identifies and charges customers for purchases of services or products in an environment having multiple dispensers and/or sale sites.

SUMMARY OF THE INVENTION

A dispensing system and method of the present invention, accordingly, utilizes radio frequency customer identification capabilities in a service station environment to reliably and accurately identify and charge customers for their purchases.

To this end, the dispensing system and method of the present invention determines whether a transponder containing customer identification data is within range of a dispenser, the dispenser requiring activation by the customer to initiate a transaction and the dispenser including a reader associated therewith for emitting radio frequency signals within the dispenser range, and for receiving customer identification data from the transponder responsive to the emitted radio frequency signals received by the transponder. When the transponder is within range of the dispenser, an in-range indication is provided to the customer. A determination is made whether the dispenser has been activated by the customer following a determination that the transponder is within the dispenser range. Upon activation of the dispenser following the determination that the transponder is within the dispenser range, the customer identification data received by the reader is associated with a transaction at the activated dispenser, whereupon the transaction at the activated dispenser is permitted and charged to the customer according to the customer identification data.

In another aspect, the present invention is embodied as a dispensing system that includes a transponder containing customer identification data; a dispenser for providing a customer transaction within a dispensing area; antennas each associated with the dispensing area of the dispenser, the antennas including a long range antenna located relative to the dispenser for use by the transponder of a type mounted to a vehicle, and a short range antenna located relative to the dispenser for use by the transponder of a type that is hand-held; at least one reader connected to the antennas for emitting radio frequency signals from the long range antenna within a selected long range of the dispensing area, and from the short range antenna within a selected short range of the dispensing area, and for receiving customer identification data from the transponder, the customer identification data being received by the reader responsive to the emitted radio frequency signals when the transponder is within its range of the dispensing area; and a processor arrangement connected to the at least one reader and to the dispenser for associating customer identification data received at the dispensing area with a transaction at the dispenser, whereupon the transaction at the dispenser is charged to the customer according to the customer identification data.

The present invention overcomes the above-noted problems with the prior art by providing a reliable, safe, customer-friendly identification system that can automatically identify a customer purchasing services or products at a service station, and bill the customer's account for any purchases made. The system of the present invention interfaces smoothly With existing service station systems to provide overall customer identification, billing, account status, and pump control.

With the customer identification system of the present invention, the customer is provided the flexibility of using either a long-range, vehicle-mounted transponder and/or a short-range, hand-held transponder for automatic customer identification and billing, or may override the use of a transponder and select a more conventional method of payment. Both types of transponders contain personal customer identification data which is broadcast in response to predetermined radio frequency ("RF") waves.

The system can include long-range antennas that are mounted to the tops of the fuel dispensers and short-range antennas that are mounted to the sides of the fuel dispensers. Readers housed in the dispensers send radio frequency power pulses to the antennas which in turn direct the power pulses to create electromagnetic fields. The antennas are optimally positioned so that the electromagnetic fields cover predetermined areas near the dispenser. The frequency, power, and antenna design have been selected to insure a proper read area and to eliminate reflective signals that are present at UHF frequencies. The areas are set so that there is little or no overlap with electromagnetic fields that may be created at adjacent or nearby dispensers. In the case of a long-range antenna, the electromagnetic field may cover an area that extends several feet from the dispenser; whereas in the case of a short-range antenna, the electromagnetic field may extend several inches from the dispenser.

The antennas also pick-up customer identification data that is broadcast by the transponders. In particular, if a vehicle-mounted transponder enters the electromagnetic field created by a long-range antenna, the vehicle-mounted transponder will become activated and broadcast its customer identification ("CID") code. The long-range antenna detects the CID code and sends the code to the associated reader for decoding and processing. Similarly, if a hand-held transponder enters the electromagnetic field created by a short-range antenna such as when a customer waves the transponder in front of the short-range antenna, the hand-held transponder will become activated and broadcast its customer identification ("CID") code. The short-range antenna detects the CID code and sends the code to the associated reader for decoding and processing.

In order to further minimize the potential for interference between antennas of adjacent or nearby dispensers, the system of the present invention coordinates the transmission of the pulse waves from the various readers. In general, the readers selectively send out pulse waves so that only antennas facing the same direction send out pulse waves at the same time. Other pulse timing arrangements could be used for other antenna configurations to eliminate interference from nearby dispensers. The system uses sync pulses and timing to coordinate the transmission of power pulses through the various antennas of the system.

The system of the present invention also provides an alert indication for alerting the customer when a transponder has been detected and the customer is authorized to begin fueling. The alert may be in the form of a light positioned on the dispenser which turns on and off in response to various triggers such as the detection or non-detection of a transponder by an associated antenna, the removal or return of an associated fuel nozzle to its seat, the selection of an alternate payment method (e.g., credit/debit card or cash), the recent detection and use of a transponder at the service station, the approval of credit, or the denial of credit.

A technical advantage of the invention is that it integrates easily with the user interface of existing service station equipment.

Another advantage of the invention is that it provides the customer flexibility in selecting payment methods without eliminating options available with existing payment processing systems.

Another advantage is that it can be safely and unobtrusively installed in a service station.

The present invention also provides a faster, more efficient method of dispensing fuel.

While the present invention enhances the process of serving a customer, it also speeds backroom operations, such as accounting and the taking of inventory.

BRIEF DESCRIPTION OF THE DRAWINGS

FIG. 4A is a side view of a dispenser used with the system of FIG. 1.

FIG. 4B is an end view of the dispenser of FIG. 4A.

FIG. 5A is a side view of another embodiment of a dispenser used with the system of FIG. 1.

FIG. 5B is an end view of the dispenser of FIG. 5A.

FIG. 8 is a schematic representation of a service station environment and the arrangement of dispensers therein illustrating a reader synchronization strategy for the system of FIG. 1.

FIGS. 11A-11I and 12 are flowcharts illustrating the user operation of the system of FIG. 1.

DETAILED DESCRIPTION OF THE PREFERRED EMBODIMENT

Figure 1:
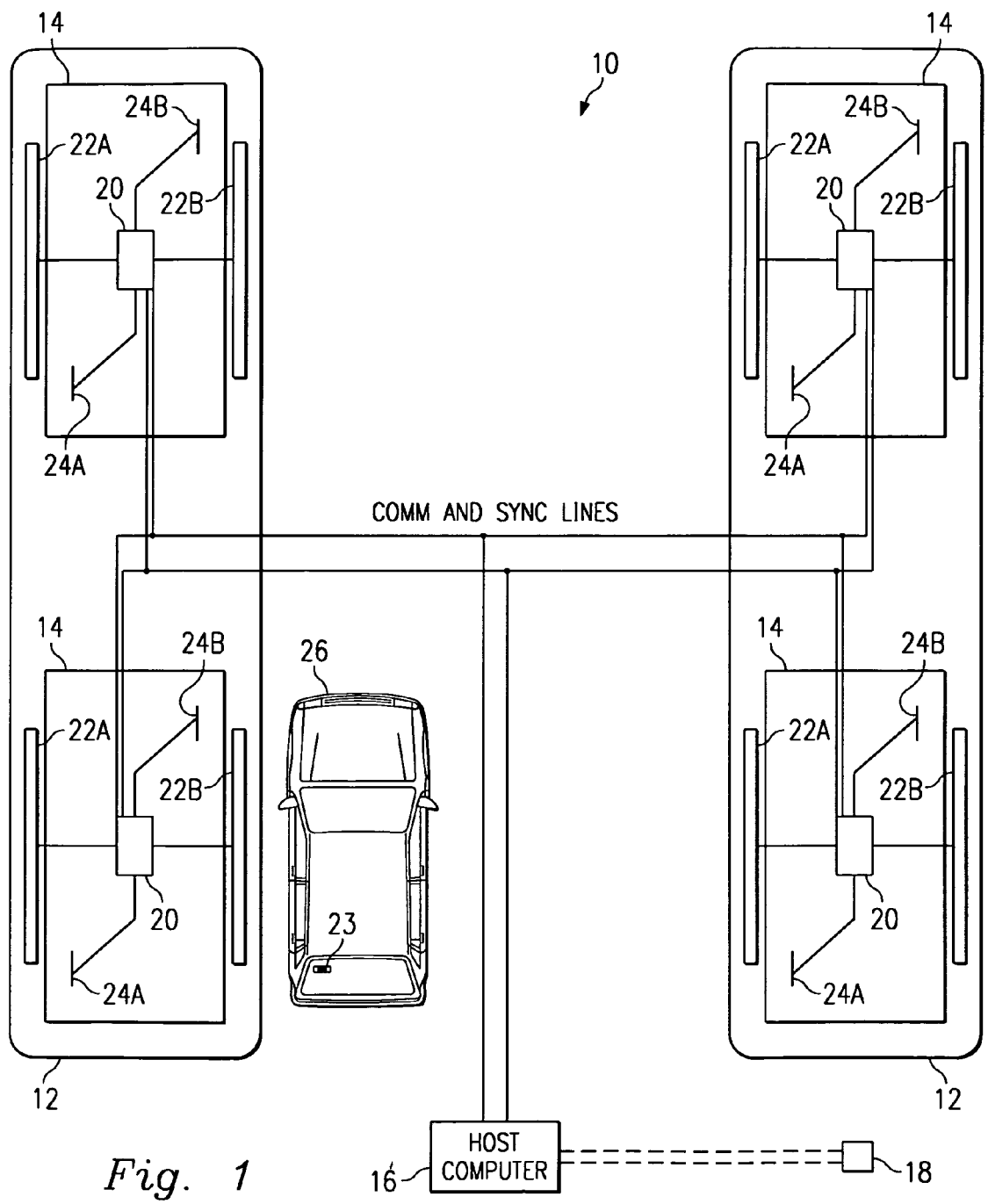
FIG. 1 is a schematic block diagram illustrating an overhead view of a service station equipped with the customer identification system of the present invention.

In FIG. 1, the reference numeral 10 refers to a customer identification (CID) system embodying features of the present invention. The system 10 electronically identifies a customer, authorizing a transaction involving the purchase of goods or services by that customer, and subsequently bills the customer's account for the services. In one embodiment the system 10 identifies, authorizes, and bills customers for services provided at a service station. Generally, the system 10 allows customers to drive up to a fuel dispenser and immediately begin pumping fuel (or have fuel pumped for them) without having to go inside the service station building to pay for the fuel or having to insert a credit card into a card reader at the fuel dispenser. As explained further below, the system 10 may also be used for other services at the station such as a car wash or for making payments inside a convenience store.

I. System Overview

In one embodiment (FIG. 1), the system 10 is implemented in a service station environment that includes two service islands 12, each having two dispensers or fuel pumps 14, it being understood that the number of islands and pumps, as well as their geometry and relationship to one another, may vary according to the requirements of the environment. Communication and synchronization lines, discussed more fully below, connect the dispensers 14 to a host computer 16 for controlling operation of the dispensers. An additional site 18, representing a car wash, food service, payment station or other amenity, is also connected to the computer 16. It is understood that each of the dispensers 14 includes a dispensing area on each of the opposing sides of the dispenser, each of which has at least one fuel nozzle (not shown) and a customer activated terminal (CAT) (shown in FIGS. 4A and 5A) for performing traditional dispensing functions as well as the functions to be described in detail below. It is also understood that the computer 16 may be connected to a network (not shown) for performing functions including, but not limited to, customer billing verification.

Radio frequency customer identification (RF-CID) readers 20 are included with each of the dispensers 12 and with the site 18 (not shown). Connected to each reader 20, and mounted to each fuel dispenser 14, are four antennas: two (2) long-range antennas 22A, 22B mounted to the top of the dispenser 14 (on each opposing side thereof) for detecting vehicle-mounted customer transponders 23, and two (2) short-range antennas 24A, 24B mounted inside the head of the dispenser 14, one on each side of the dispenser, for detecting hand-held customer transponders 25. Further details of the antennas can be found in co-pending U.S. patent application Ser. No. 08/792,644, filed on Jan. 31, 1997, assigned to Texas Instruments, inc., and incorporated herein by reference in its entirety. As discussed in detail below, each reader 20 polls the four antennas 22A, 22B, 24A, 24B of each dispenser 14, sending power pulses to the antennas, reading the customer identification (CID) data detected by the antennas from the transponders (e.g., the transponders 23 or 25) and sending the data to the host computer 16. For example, it is contemplated that a vehicle 26 entering a dispensing area in front of one of the fuel dispensers 14 will include a transponder 23 mounted thereto such that the long-range antenna 22B (as shown in FIG. 1) on the dispenser 14 nearest the vehicle will read the CID data contained in the transponder.

The transponders 23, 25 are radio frequency identification tags (RFID tags) that may either be mounted to the customers' cars or may be hand-held, key ring/chain or credit card style units. These transponders and the low frequency RF-ID system are further detailed in U.S. Pat. No. 5,053,774, issued on Oct. 1, 1991, assigned to Texas Instruments, Inc., and incorporated herein by reference in its entirety. The transponders 23, 25 contain customer identification (CID) data that is broadcast in response to receiving a predetermined radio frequency ("RF") wave (i.e., a power pulse). The RF wave is sent by a reader 20 housed in one or more of the dispensers 14. The antennas 22A, 22B, 24A, 24B mounted to the dispensers 14 read the broadcast data and send the data to the readers 20 for decoding and further transmission to the host computer 16 or also to a network where the data can be verified and the customer billed after completion of the fueling or other purchase.

Suitable transponders 23, 25, antennas 22A, 22B, 24A, 24B, and readers 20 used in the system 10 are available from Texas Instruments Incorporated of Dallas, Tex. under the TIRIS™ (Texas Instruments Registration and Identification Systems) product line. For instance, each of transponders 23, 25 contain an antenna, transponder IC (integrated circuit), and a charge capacitor. Some of the TIRIS™ product line is described in a brochure entitled "Texas Instruments Registration and Identification Systems", Document Number 22-27-008 (1994), which is incorporated herein by reference. Additional information about these components is publicly available from Texas Instruments Incorporated and should enable those of ordinary skill in the art to make and use the system 10, following the description set forth in this specification and the patents and co-pending patent applications assigned to Texas Instruments. Inc., and incorporated herein by reference in their entireties, to achieve desired functionalities.

In one preferred embodiment, the readers are low and high frequency readers that send out periodic power pulses of approximately 134.2 kHz to the antennas 22A, 22B, 24A, 24B and receive signals from antennas 22A and 22B at around 900 MHZ. The system in which a low frequency signal is transmitted from a reader to a transponder and the transponder responds with a high frequency signal is further described in U.S. Pat. No. 5,351,052, issued on Sep. 27, 1994, assigned to Texas Instruments, Inc., and incorporated herein by reference in its entirety. Other suitable parameters are also contemplated. Such a reader may include a Series 2000 Reader System or a Series 5000 Reader System available from Texas Instruments, Inc. of Dallas, Tex. Alternatively, the reader may be a high frequency reader. The long range antennas are preferably gate antennas such as the G03, G02, or G01 model antennas available from Texas Instruments, Inc. The long-range antennas may also be custom antennas that blend with the appearance of the dispenser 14. The short range antennas are preferably ferrite rod antennas available from Texas Instruments or alternatively may be constructed from a printed circuit board that includes a coil having an appropriate inductance.

The readers 20 send out periodic, low frequency, power pulses of approximately 134.2 kHz to the antennas 22A, 22B, 24A, 24B. The antennas 22A, 22B, 24A, 24B in turn direct the electromagnetic fields generated by the power pulses to particular areas adjacent the dispensers. This selectivity in the placement of the fields is further described in the aforementioned co-pending U.S. patent application Ser. No. 08/794,644, filed on Jan. 31, 1997, and assigned to Texas Instruments, Inc. A power pulse lasts approximately 50 milliseconds (ms) and may be generated every 90 ms to 140 ms. When a transponder 23, 25 enters the electromagnetic field, the energy is collected by an antenna (not shown) in the transponder and stored in a small capacitor (also not shown). After the power pulse is completed, the transponder 23, 25 transmits the customer identification data using the energy stored in the capacitor. The antennas 22A, 22B, 24A, 24B mounted to the dispensers 14 read the data broadcast from the transponder 23 or 25 and send the data to the readers 20 for decoding and further transmission to the host computer 16 or a network where the data can be verified and the customer billed after completion of the fueling or other purchase.

Figure 2:
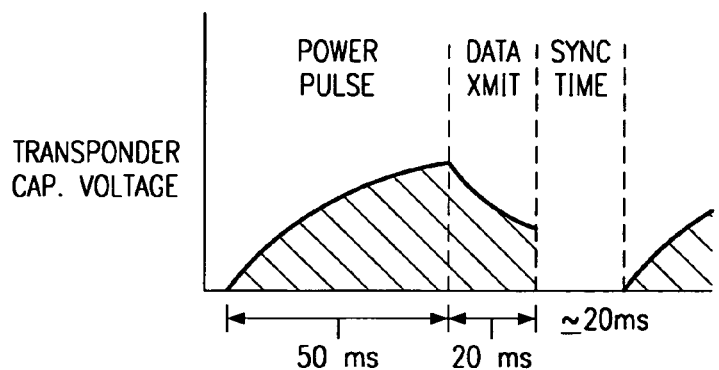
FIG. 2 is a graph plotting transponder capacitor voltage With respect to time for a transponder used with the system of FIG. 1.

FIG. 2 Graphically illustrates the operation of a transponder 23 or 25 in cooperation with a reader 20. Responsive to a reader 20 emitting a power pulse (typically occurring for 50 ms), the transponder 23 or 25 (if within range) will be charged as indicated by the increase in the voltage potential of its capacitor (not shown). Once charged, the transponder 23 or 25 then emits a response signal (lasting about 20 ms) thereby sending its customer identification data to the reader 20. In total about 128 bits are transmitted which are picked up by the antenna (e.g., one of antennas 22A, 22B, 24A, 24B) of the reader 20 and then are decoded. Once the data has been sent, the transponder 23 or 25 continues to discharge its storage capacitor thereby resetting the transponder to make it ready for the next read cycle. The period between the transmission pulses is known as the "sync time" and lasts for about 20 ms, depending upon the chosen criteria. The next power pulse may be transmitted approximately 20 ms to 50 ms after the transponder 23 or 25 has completed transmitting the data. As explained further below, the sync time between pulses is used to coordinate the transmission of the power pulses through the various antennas 22A, 22B, 24A, 24B of the system 10. The synchronization of the multiple readers is detailed further in U.S. Pat. No. 5,748,137, issued on Apr. 5, 1998, assigned to Texas Instruments, Inc., and incorporated herein by reference in its entirety.

According to one embodiment of the invention, it is desirable to transmit the power pulse at a low frequency and charge the capacitor in transponders 23 and 25. The transponders 23 are designed to emit the response signals at a higher frequency, such as Low Ultra High Frequency, such as 902.85 mHz. The transponders 25 are designed to emit the response signals at a lower frequency, such as 134.2 KHz.

Referring again to FIG. 1, it is understood that the illustration is not necessarily drawn to scale. In a typical service station, the width of the dispensers 14 is approximately 48 inches. Furthermore, the distance between the dispensers 14 on a single island 12 is approximately 3.6 to 6 meters, and the distance between facing dispensers 14 of adjacent islands 12 is approximately 8 meters. Each fuel dispenser 14 has two separate dispensing areas, one on each side of the dispenser 14, where the fuel nozzles and registers are located. As indicated above, each dispensing area typically also has a customer activated terminal ("CAT") that a customer uses to make selections such as type of payment and where messages may be displayed to the customer. Other possible arrangements of the system 10 include environments with more than two service islands, not necessarily parallel to one another, or arrangements in which the islands form a circle with inner and outer rows or islands.

Figure 3A:
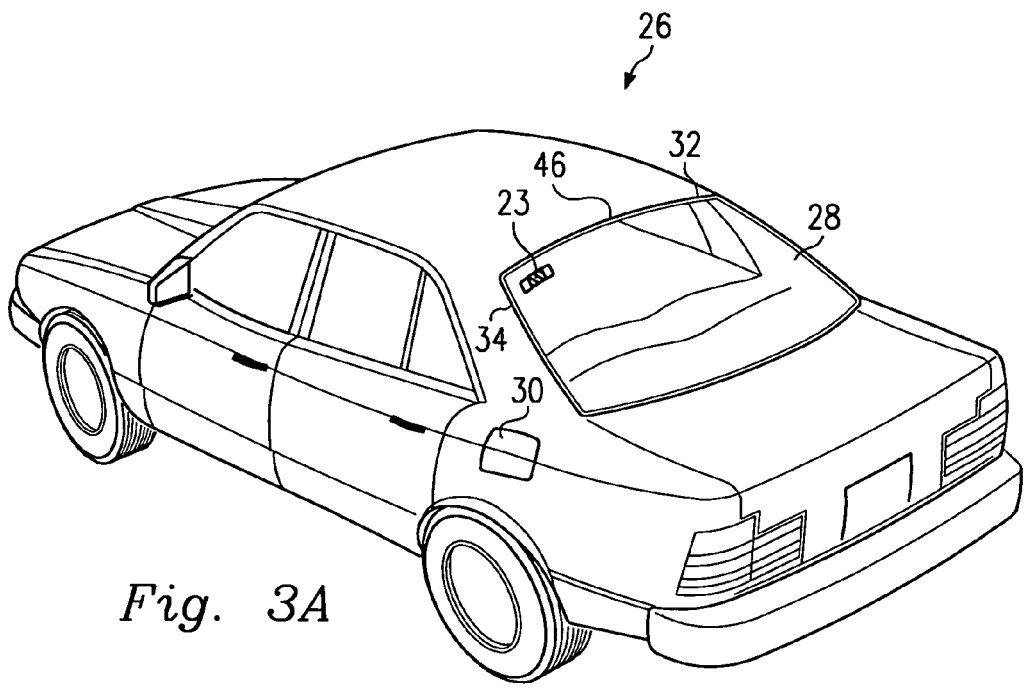
FIG. 3A is a partial rear perspective view of the back end of a vehicle illustrating the placement of a vehicle-mounted transponder used with the system of FIG. 1.

Referring to FIG. 3A, the vehicle-mounted transponder 23 may be mounted to the rear window 28 of the vehicle 26 preferably near the side of the vehicle where the fuel door 30 is located. In FIG. 3A, the vehicle-mounted transponder 23 is positioned approximately two (2) inches from the top 32 and side 34 edges of the rear window glass. The vehicle-mounted transponder 23 may be applied to the window 28 with adhesive-backed VELCRO® pads. One pad is adhered to the transponder 23 and another is adhered to the inside surface of the vehicle window 28. Although the vehicle-mounted transponder 23 has been described herein as being positioned on the rear window 28 of the vehicle 26, other locations such as a side window may be suitable depending upon the particular arrangement of the long-range antennas 22A, 22B. Furthermore, other means for mounting the transponder 23 to the vehicle may be used.

Figure 3B:
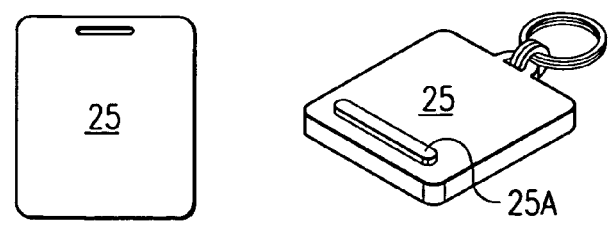
FIG. 3B illustrates a card hand-held transponder and a key ring hand-held transponder used with the system or FIG. 1.

FIG. 3B illustrates two variations of a hand-held transponder 25 which a customer can wave in front of one of the short-range antennas 24A, 24B mounted on the opposing sides of the dispenser 14. The hand-held transponder 25 may be a key ring or chain style unit 25A or a credit card style unit 25B, or have a different suitable hand-held form. Variations in the shape and size of the transponder 25 are contemplated.

FIGS. 4A and 4B illustrate a mounting arrangement for the four antennas 22A, 22B, 24A, 24B on a dispenser 14. The two long-range, or vehicle-mounted, antennas 22A, 22B, are preferably mounted to a top 36 of the dispenser 14. One long-range antenna 22A or 22B extends outwardly from each side 38A or 38B of the dispenser 14 so that the plane of the antenna is substantially perpendicular to the side 38A or 38B of the dispenser 14. The antennas 22A, 22B transmit equally well from either side of the antenna, perpendicular to the plane of the antenna. The antennas 22A, 22B, therefore, are aligned so that the electromagnetic field generated from one side of the antenna is directed toward the dispensing area for a vehicle on the appropriate fueling side of the dispenser 14, and the electromagnetic field from the other side of the antenna is directed up and away from the other side of the dispenser 14 as shown.

The top 36 of the dispenser location provides the optimum performance for reading vehicle-mounted transponders 23. This location and orientation of the long range antennas 22A, 22B also eliminates any problems associated with reading a vehicle-mounted transponder 23 of a vehicle located on the opposite side of the dispenser 14. Furthermore, with this location and orientation, the radio frequency waves are less likely to reach the fueling areas of adjacent service islands 12.

The short-range, or key ring/credit card style transponder antennas 24A, 24B are preferably mounted within the dispenser 14 head behind corresponding authorization tights 45A, 45B. The authorization lights 45A, 45B advise the customer that he or she is authorized to pump fuel. One short-range antenna 24A or 24B is positioned on either side 38A or 38B, respectively, of the dispenser 14 as shown in FIG. 4B. The antennas 24A, 24B are also positioned near opposing ends 46 of the dispenser 14 as shown in FIG. 4A. This positioning of the antennas 24A, 24B helps prevent the reading of transponders from the wrong side of the dispenser 14. In another embodiment, the authorization lights 45A, 45B can be located apart from the dispenser 12 or in different locations on the dispenser.

FIG. 4A also shows the customer-activated-terminal ("CAT") on the dispenser 12. The CAT includes a display 50 where messages may be presented to the customer and a key pad 55 which the customer may use to make various selections discussed further below.

FIGS. 5A and 5B illustrate a second possible arrangement of the antennas on the dispensers. In this embodiment, the long-range antennas 22A', 22B' are mounted to the top of the dispenser 14' and extend outwardly from the sides 38A', 38B' of the dispenser 14' at an upward angle as shown in FIG. 5B. The electromagnetic fields are directed from one side of the antenna toward the appropriate fueling area and are directed up and away from the other side. The short-range antennas 24A', 24B' of this embodiment are arranged in a similar manner as the short-range antennas of the first embodiment.

The transponders 23 and 25 may be read only (R/O), low frequency RFID tags containing a 64-bit customer identification code and are available from Texas Instruments, Inc. For example, the vehicle-mounted transponders may be low frequency transponders available from Texas Instruments' Vehicle and Container Series, and the short-range transponders may be low frequency transponders available from Texas Instruments' Badge & Card Series.

Alternatively, the transponders 23, 25 may be read/write (R/W), low frequency RFID tags with a range of different memory capacities. Such R/W transponders are available from Texas Instruments Incorporated. One type of R/W transponder commercially available from Texas Instruments Incorporated is an "authenticated" transponder. Such transponder receives a 40-bit challenge code from reader 20. Every transponder has a unique algorithm contained therein. The transponder receives the 40-bit code, processes it with the unique algorithm, and returns to the reader 20 a 24-bit answer. Thus the reader 20 receives the transponder number and the 24-bit answer. The reader 20 then sends to the host computer 16 the transponder number, the challenge code and the answer received from the transponder. The host computer 16 then refers to a look-up table for that transponder number, identifies the algorithm for that transponder, and runs the 40-bit code through that algorithm, and gets a 24-bit answer out of its algorithm, then compares that with the answer that came from the transponder. If the answers match, it is an authentic transponder.

The customer identification codes (CIDs) on the R/W transponders may be changed or other data added for business and/or security purposes. For example, the number of times in a day that a vehicle-mounted transponder is used for a fueling transaction at a particular service station or locality can be tracked and written to the transponder 23, 25. This information can be used for various reasons including limiting the number of times that a vehicle-mounted transponder can be used in a day. Furthermore, personal preference information related to the buying experience may be written to the transponder. Likewise, the transponder can be connectable by a suitable interface to microprocessors such as a vehicle's on-board computer so that, in cooperation with the system 10, information can be written to the transponder and then displayed to the customer while fueling (e.g., fuel economy calculations, miles traveled since last fill up, engine conditions and the like).

The actual reading range or distance for the antenna/transponder combinations depends upon such criteria as transponder size and type, antenna size and type, transponder and antenna orientation, and electromagnetic noise. A combination of a long-range antenna 22A or 22B mounted to the top of the dispenser 14 and a vehicle-mounted customer transponder 23 preferably provides a read range of up to approximately seven (7) feet measured from the side face of the dispenser 14. The combination of a short-range antenna 24A, 24B located in the dispenser 14 head and a key-ring or credit card style customer transponder 25 preferably provides a read range of four (4) to six (6) inches.

Table 1 below shows preferred read ranges for the vehicle-mounted transponder/antenna combination and the key chain/credit card transponder/antenna combination in one embodiment. Note that a bezel surface is a side surface of the dispenser proximate a corresponding short range antenna.

TABLE 1

| Transponder Type | Read Range[a] | |
|---|---|---|
| | On Side | Off Side |
| Vehicle Mounted | Depth[b]:<br>Minimum: 60 inches<br>Ideal: 84 inches<br>Width: 42 to 60 inches<br>Height[c]: 39 to 60 inches | 18 inches |

TABLE 1-continued

| Transponder Type | Read Range[a] | |
|---|---|---|
| | On Side | Off Side |
| Key Chain/Credit Card | Bezel surface to 4 to 6 inches[d] | No reads allowed |

Figure 6A:
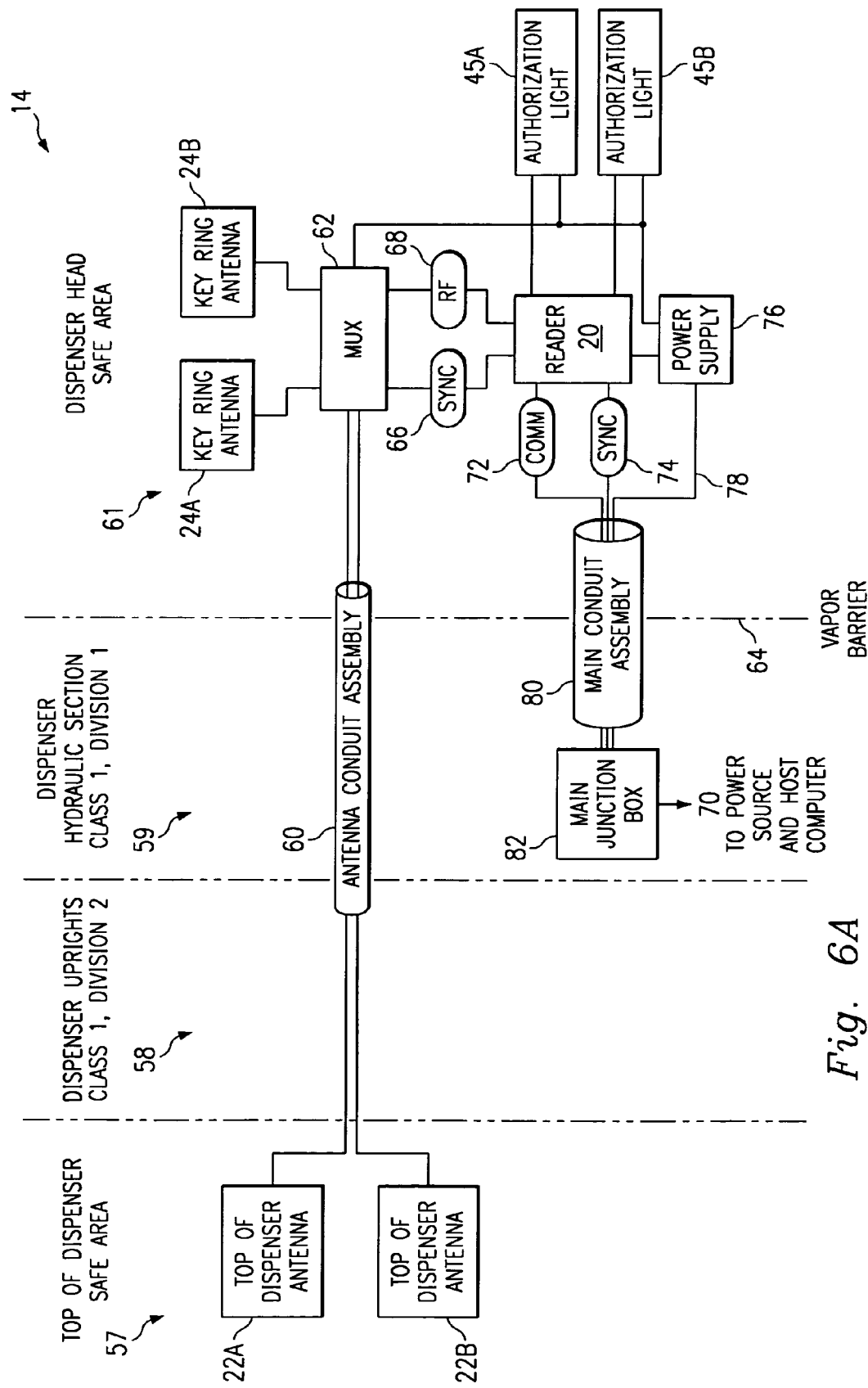
FIGS. 6A and 6B are schematic block diagrams illustrating components of a dispenser for connection to a host computer used with the system of FIG. 1.

[a]Measured from bezel surface
[b]Measured perpendicular to the side of the dispenser
[c]Measured from the base of the dispenser
[d]Measured perpendicular to the side of the dispenser FIG. 6A is a schematic block diagram illustrating hardware details of a dispenser 14 for the system 10. The two long-range antennas 22A, 22B (each labeled as "TOP OF DISPENSER ANTENNA") are mounted to the top 36 (FIG. 4A) of the dispenser 14 in a "safe area" 57. An antenna conduit assembly 60 extends through a "dispenser uprights" section 58 and a "dispenser hydraulic" section 59 to a "dispenser head safe area" 61 for connecting the long-range antennas 22A, 22B to a multiplexer 62 ("MUX"). The multiplexer 62 is housed in the dispenser head safe area 61 along with the reader 20. The dispenser head safe area 61 is separated from the hydraulic section 59 by a vapor barrier 64.

Also housed in the dispenser head safe area 61 and coupled to the multiplexer 62 are the short-range antennas 24A, 24B (each labeled "KEY RING ANTENNA"). The multiplexer 62 controls the transmission of the energy pulses from the antennas 22A, 22B, 24A, 24B. A synchronization ("SYNC") line 66 provides the coordination commands to the multiplexer 62 for transmitting power pulses. A radio frequency ("RF") line 68 provides the low frequency, FM power pulses that are transmitted by the antennas 22A, 22B, 24A, 24B.

The multiplexer 62 and reader 20 are both coupled to the authorization lights 45A, 45B for controlling the activation of the lights. The reader 20 is coupled to the host computer 16 (FIG. 1) via a communications ("COMM") line 72 and to the other readers 20 via a synchronization ("SYNC") line 74. A power supply 76 housed in the dispenser 14 head provides power to the reader 20, the multiplexer 62 and the authorization lights 45A, 45B. The power supply 76 is also coupled to an outside power source via a power line 78. A main conduit assembly 80 (labeled "ASSY") supports and protects the communication line 72, the sync line 74, and the power line 78 which are fed to a main junction box 82 coupled at 70 to the power storage source and the host computer 16.

Figure 6B:
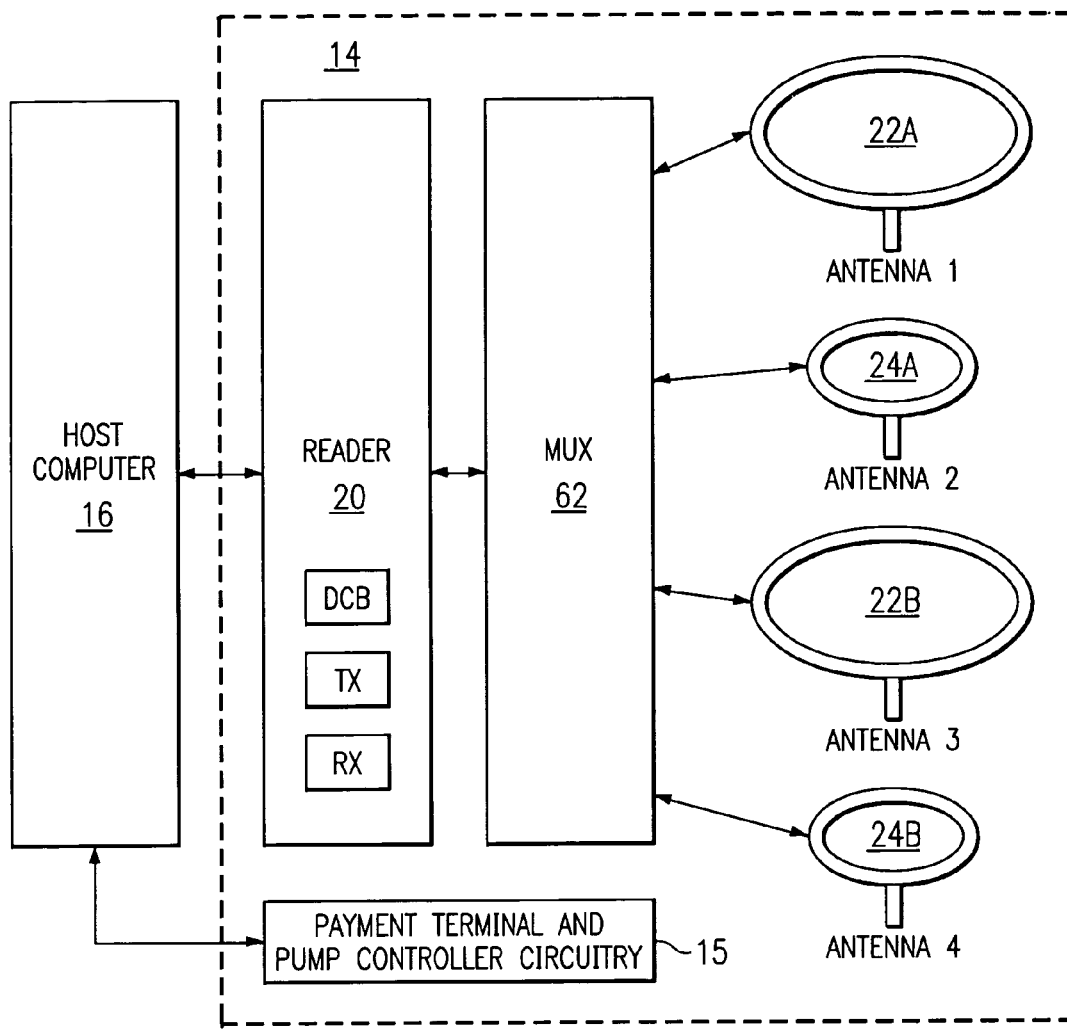

FIG. 6B is a schematic illustrating the signal flow between the host computer 16, the dispenser 14 and the antennas 22A, 22B, 24A, 24B connected to the antennas through the MUX 62. Each reader 20 includes a microprocessor (not shown) and programming instructions (i.e., software, not shown) for causing the power pulses to be generated by the antennas 22A, 24A, 22B, 24B through the channels of the MUX 62 that connect each antenna to the reader. More particularly, reader 20 includes a subsystem having a digital control board (DCB), a transmitter module (Tx), and a receiver module (Rx). The digital control board includes a microprocessor or microcontroller. The DCB processes the receiver module's output, handles communications protocol and the vehicle tag, and communicates with the host computer. The POS system is based on a low frequency (LF) downlink and an ultra-high frequency (UH) uplink. This hybrid L/UHF solution benefits from low battery usage and provides localization to resolve noise interference to the identification signal. The passive transponders emit a signal only when awoken by the appropriate LF signal transmitted via the transmitter module (Tx) when the transponder is within a respective energy field range or localized zone.

Still further, with respect to the digital control board, the DCB is preferably installed within the cabinet of the fuel dispenser. Major functional blocks of the DCB include a microcontroller, a digital signal processor (DSP), and a system timing generator. The microcontroller supervises operation of reader 20. The DSP processes transmitted LF data and received UHF data. The system timing generator synchronizes all of the system events for a given reader. In one embodiment, the DCB interfaces to a LF motherboard, bezel assemblies, a UHF receiver board, and dispenses power supplies.

Referring again to FIG. 6B, to be properly synchronized, for reasons described below, all of the readers 20 in the system 10 must cycle through the MUX 62 channels to activate the antennas 22A, 24A, 22B, 24B attached thereto in a predefined, coordinated sequence. For example, in the illustrated embodiment each reader 20 includes a MUX 62 with four channels wherein each channel 1-4 is connected to a different antenna 1-4 (e.g., antennas 22A, 24A, 22B, 24B). Synchronized operation, as explained below, therefore requires that all of the readers 20 generate a charge pulse on channel 1 at the same time, on channel 2 at the same time, on channel 3 at the same time and on channel 4 at the same time. If one reader generated a charge pulse on channel 1 while another reader 20 generated a charge pulse on channel 3, or if the readers 20 each operated to generate pulses on any of the channels independently of the other readers, then the readers would be out of synchronization. To keep all of the readers 20 in synchronization, the sync line 74 (FIGS. 6A and 7) connected to each of the readers 20 instructs the MUX 62 in each reader (through the sync line 66) when to generate a charge pulse and on what channel to generate it.

FIG. 6B further illustrates the communication between payment terminal and pump controller circuitry 15 and the host computer 16. The payment terminal may be a customer activated terminal (CAT) and the pump controller circuitry responds to instructions from the host computer 16 and the payment terminal for dispensing fuel from the dispenser 14. The payment terminal and pump controller circuitry are conventional and therefore not described in further detail.

Figure 7:
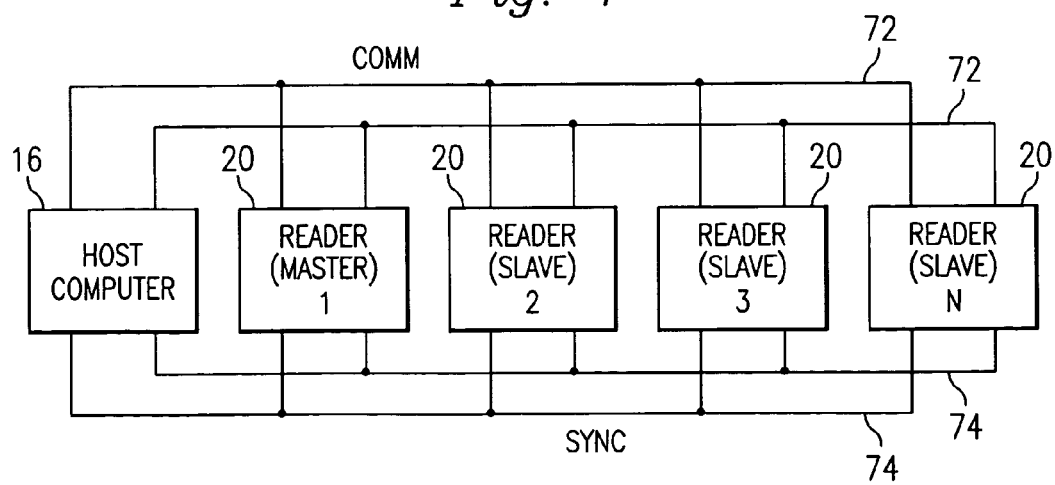
FIG. 7 is a schematic block diagram of the site wiring between readers and the host computer of the system of FIG. 1.

FIG. 7 further illustrates the site wiring for the system 10 showing the communication line 72 and sync line 74 connections among the multiple readers 20. The timing signals for coordinating the transmission of power pulses from readers 20 (labeled with numbers 1, 2, 3 and N) are carried by the sync line 74. The coordination of the transmission of the power pulses from the various readers 20 is discussed further below. Any number of the readers 20 is contemplated. While not shown in great detail, it is understood that each reader 20 includes a radio frequency module (Tx and Rx) and a control module (DCB). The radio frequency module generates the power pulses and receives the data broadcast from the transponders 23, 25. The control module (DCB) has a microprocessor or microcontroller that decodes and processes the transponder data and communicates with the host computer 16.

Preferably, the readers 20 are interconnected on an RS-485 serial data loop to provide synchronization of the transmit/receive cycle. This link ensures that all dispenser 14 locations are activating like antenna positions to minimize interference from each other, as described below. While not shown, RS232-485 converters interconnect the host computer 16 with the readers 20.

II. Synchronization of the Readers

FIGS. 8-10 illustrate details concerning synchronization of the readers 20 within the system 10 to avoid crosstalk among the transponders 23 that could result in erroneously billing a customer for services never received.

In FIG. 8, a simplified schematic of the system 10 is shown in which the dispensers 14 are labeled as pumps 1-4 and have corresponding readers 20-1 to 20-4, each with antennas A and B on opposite sides of the pump. To illustrate the crosstalk problem, the readers in pumps 1 and 3 are unsynchronized thus demonstrating the potential for crosstalk caused by a transponder X being charged by one of the readers when the transponder X is located between the pumps. In contrast, the readers in pumps 2 and 4 are synchronized thus solving the crosstalk problem for a transponder Y located between the pumps.

Pumps 1 and 3 send out power pulses from antennas B and A, respectively, thereby causing the potential for one or both of them to charge the transponder X, even though the transponder X is closer to pump 1. Each of the antennas B and A emitting power pulses generates an energy field extending from the antenna, as represented by lines in the figure. The energy field in front of each antenna includes a "near field" region, a "far field" region, and a "transition zone" therebetween (not shown). There are no sharp dividing lines between the three regions and somewhat arbitrary limits are set for each region based upon the way in which energy spreads as the distance from the antenna increases. In one example, the near field region generally extends out from the antenna to a distance of $\lambda D^2/A\lambda = A/2\lambda$ where D=the diameter of the antenna, A=area of antenna aperture, and $\lambda$=wavelength. The distance of the far field region is about five times the length of the near field region and occurs at a distance of roughly 2D/22. The transition zone is the region therebetween. As shown in FIG. 8, the possibility exists for overlap of the transition zones or far field regions of the antennas B and A for pumps 1 and 3 when the antennas emit power pulses simultaneously.

In looking at the power pulses emitted from pumps 1 and 3, it is most likely that the Transponder X will be charged by antenna B in pump 1, because the transponder is relatively far from pump 3; however, it may end up being charged by the overlap of power pulses from both pumps 1 and 3 even in a situation where the transponder is too far from either pump to be charged by antenna B or antenna A alone. This can occur when the energy in the overlapping transition zone or far field regions of the antennas, by virtue of their combined strength, is sufficiently high. Once the power pulses are completed, if the transponder X receives sufficient energy it will transmit its data in response. Even though pump 1 is closest to the Transponder X, it is possible that pump 3 will also receive the response, thereby resulting in crosstalk. An even worst situation could arise if two transponders were in the center lane between pump 1 and pump 2 and the pumps 1 and 3 receive the responses from the wrong transponders resulting in a customer being charged for services provided for another customer.

Pumps 2 and 4 send out power pulses from their antennas A and A, respectively. Transponder Y is too far away to be charged by the energy field generated by pump 4 alone: and it will not be charged by pump 2, since the power pulse from pump 2 is not in a direction facing the transponder. Transponder Y will only be charged when it receives a power pulse from antenna B on pump 2 (which will then be the only antenna receiving a response). Such a synchronized system provides better separation and higher confidence that the proper response is coming from the correct transponder 23.

Thus synchronization of the system 10 is accomplished when the readers 20 selectively send out power pulses so that all the antennas facing the same general direction (e.g. all antennas facing north, or facing south, or facing east, or facing west) send out a pulse at the same time, and all antennas facing different-directions do not send out pulses at that time. This synchronization is accomplished by the readers 20 transmitting pulses from antennas facing one direction (e.g., antennas A) during the sync time (see FIG. 2) of the transmit/receive cycle of antennas facing a different direction (e.g., antennas B).

Other synchronization arrangements are possible depending upon the number of pumps and their relationship to one another. In one embodiment, the synchronization does not necessarily need to occur for all antennas but instead will occur only in the case of antennas for dispensing areas that face each other where the energy fields in front of the antennas might possibly overlap.

Referring also to FIG. 1, a synchronization strategy that prevents energy fields from the different antennas from overlapping results when each reader 20 pulses antennas 22A at the same time, followed by antennas 24A at the same time, followed by antennas 22B at the same time, followed by antennas 24B at the same time. The foregoing successive sets of antennas are pulsed during the sync time (or thereafter) following the data transmit cycle of transponders charged by the previous antenna set. In the strategy just described, antennas for car mounted transponders 23 and hand-held transponders 25 alternate in their pulsing, and pulsing only occurs on one side of each island 12 at a time so that a vehicle located between the islands is not subject to receiving pulses from opposite directions caused by overlapping energy fields. In this case, each "A" antenna (antenna 22A or 24A) (facing west as viewed in the drawing) sends out a pulse during the sync time of the transmit/receive cycle of the previously pulsed "B" antenna (antenna 22B or 24B) (facing east as viewed in the drawing), and vice-versa. This represents an antenna pulse sequence of: 22A, 24A, 22B, 24B. Alternative sequences include: 22A, 22B, 24A, 24B. Any other combination thereof is appropriate so long as "A" antennas and "B" antennas do not charge in the same cycle.

Another way in which the wrong transponder could be charged for response back to the reader is if a canopy were to exist over the readers of a toll plaza. For example, one reader transmission could possibly bounce off the ceiling of the canopy into another car's transponder's charge range, thereby polling the wrong transponder for the lane transaction and possibly effectively billing the wrong customer. To prevent this situation from occurring, a second antenna is positioned at a point on the ceiling of the canopy from which reflections originate. This second antenna transmits a jamming signal in such a way that it blocks the downlink poll message transmitted by the actual reader system and jams the transponder's poll message reception, in this manner, the transponder fails to respond to rogue reflected reader transmissions. More details about this jamming antenna are disclosed in co-pending U.S. patent application Ser. No. 8/826,913, filed Apr. 9, 1997, assigned to Texas Instruments, Inc., and incorporated herein by reference in its entirety.

Figure 9A:
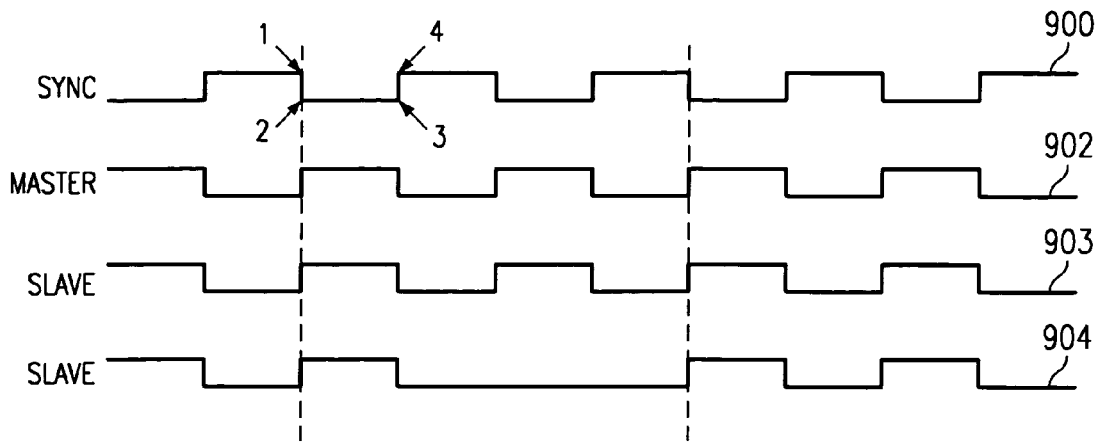
FIGS. 9A-9C are timing diagrams of communications signals on the synchronization line between master and slave readers of the system of FIG. 1.
Figure 9B:
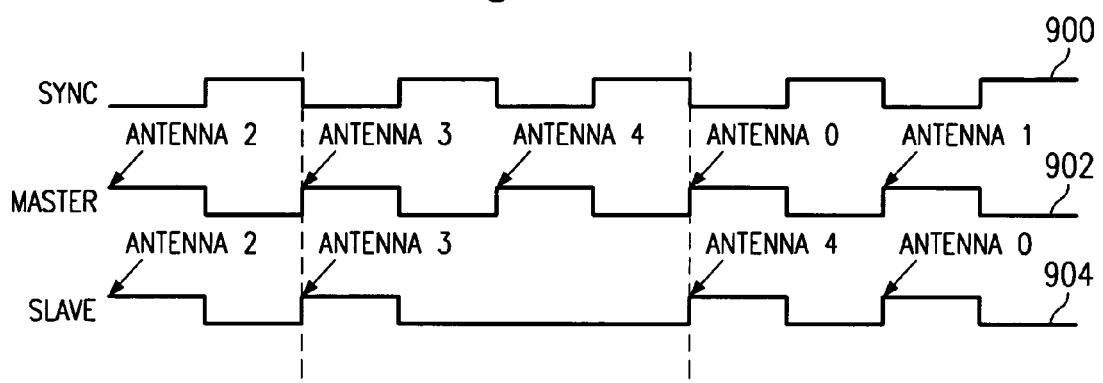
Figure 9C:
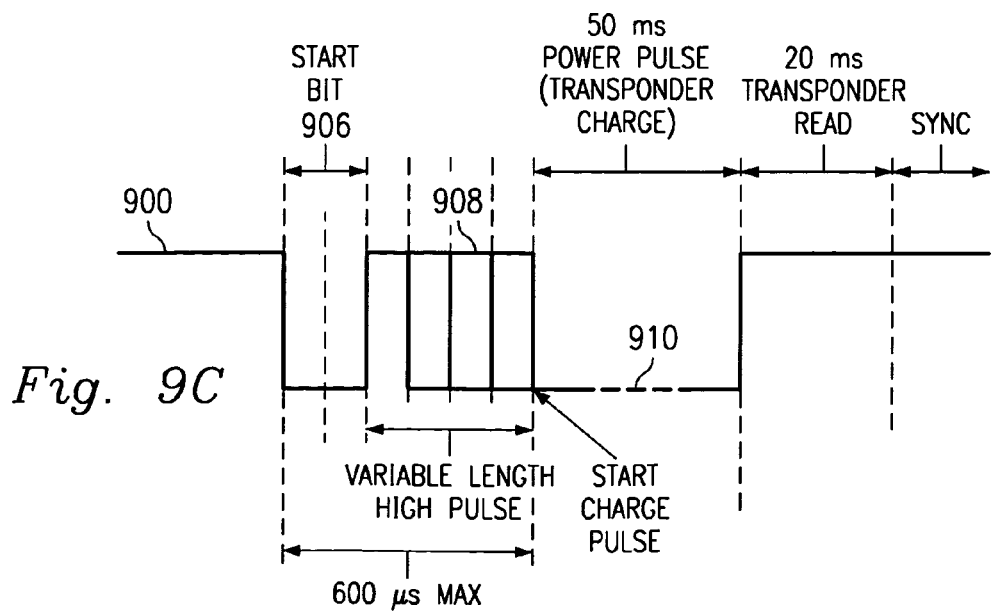

Referring to FIGS. 9A-9C and also to FIGS. 6A, 6B and 7 discussed previously, operation of the readers 20 will now be described in further detail with respect to an implementation of one or more of the synchronization strategies mentioned above.

As indicated previously in FIG. 6B, each reader 20 includes a microprocessor (not shown) and programming instructions (i.e., software, not shown) for causing the power pulses to be generated by the antennas 22A, 24A, 22B, 24B through the MUX 62 channels that connect each antenna to the reader. For example, the Texas Instruments TIRIS™ Series 2000 and 5000 readers are available with standard software known as the S2000 or S5000 software, respectively. The S2000 or S5000 software includes programming instructions for controlling the emission of power pulses, for receiving and processing data from the transponders 23, 25, and for communicating with the host computer. This software may be easily adapted for the presence of the four antennas 22A, 22B, 24A, 24B.

To be properly synchronized, all of the readers 20 in the system (FIG. 7) must cycle through the MUX 62 channels in synchronization. Synchronized operation requires that all of the readers 20 generate a charge pulse on channel 1 at the same time, on channel 2 at the same time, on channel 3 at the same time and on channel 4 at the same time. It is understood that the specific synchronization strategy may be determined based upon which antenna 22A, 22B, 24A, 24B is connected to which channel 1-4. The sync line 74 connected to each of the readers 20 instructs the MUX 62 in each reader (through the sync line 66) when to generate a charge pulse and on what channel to generate it for purposes of synchronization.

FIGS. 7 and 9A illustrate how each reader 20 is instructed on the sync line 74 to generate properly synchronized charge/read cycles. One of the readers 20 is designated as the "master" reader and the remainder are designated as "slaves." The master reader 20 generates a synchronization pulse (represented by sync timing line 900) on the sync line 74 which inversely follows its charge/read cycle (represented by the master timing line 902, wherein a "high" signal is for charge and a "low" signal is for read). The slave readers 20 use the sync pulse to set up their charge/read timing (represented by slave timing line 903). Assuming the charge pulse is fixed at 50 ms and the transponder read is about 20-25 ms, there should be no reason for variance. However, as illustrated the slave timing line 904 may result in a variance from the sync pulse because of message processing occurring in the slave reader 20. This has the unfortunate effect of changing the slave reader 20 processor's timing by lengthening the time it remains low. Hence synchronization can be adversely affected depending upon the loading of the individual reader 20, causing a reader to "drop out" of a charge/read cycle if it is unable to finish its processing in time to catch the sync signal.

FIG. 9B illustrates the effect of a slave reader 20 temporarily dropping out of synchronization with the master reader 20 (master line 902) due to a message processing delay in the slave reader. Once the message processing in the slave reader 20 is complete, the slave synchronizes once again with the sync signal (sync line 900), however the slave reader remains out of antenna synchronization because the master reader 20 is charging an antenna on a different channel (e.g., the master reader is charging antenna channel 0 while the slave is charging antenna channel 4). Thus the MUX 62 channels being charged on all the readers 20 are no longer the same channels at the same time.

FIG. 9C illustrates a solution that corrects the synchronization of a slave reader 20 when it drops out of sync during message processing. The solution is to use the synchronization line 74 to communicate downstream to the slave readers 20 which channel (i.e., which antenna) to use on the next charge cycle. Alternatively, the comm line 72 can be used by the host computer 16 to instruct the readers 20 which channel to use. A disadvantage of the latter approach, however, is that in some implementations the host computer 16 processing time is required for more important tasks.

As shown in FIG. 9C, use of the sync line 74 to communicate the channel number to each of the slave readers 20 is done by encoding the channel number on the sync line. In this manner, the processors in all the readers know which antenna to charge even if they miss a charge cycle. As shown by the sync timing line 900, a variable length pulse 908 indicates to the slave readers 20 which channel to use for the read cycle. The sync line signal includes a 200 microsecond start bit 906 and after that a pulse 908 of varying width is transmitted. The length of the pulse 908 indicates which channel of the MUX 62 is to be used. A pulse of about 1-100 microseconds indicates channel 1, 101-200 microseconds indicates channel 2, and so on.

Interrupts in the readers 20 are enabled until the start bit 906 is detected. At that point the serial interrupts are disabled and remain disabled until the measurement of the variable length mux-sync pulse 908 is completed, whereupon interrupts are again enabled. The interrupts are disabled for a maximum of about 600 microseconds. The reader 20 will not lose any incoming serial data because a character cannot be completely received in 600 microseconds. Any character that is completely received when interrupts are disabled are moved to an internal register and the next character is partially received in the shift register.

It will be appreciated that reliance on the hardware to buffer characters allows the reader to avoid an overrun of a universal asynchronous receiver transmitter (UART), which as explained in more detail below is implemented in the reader software according to the present invention.

The aforementioned synchronization of the readers follows the basic concept that all the slave readers wait until the sync line is pulled low. The slave reader, however, must be able to distinguish between a low that precedes the MUX pulse 908 and a low that indicates that a charge cycle 910 (power pulse) is occurring. This is accomplished by timing the low and knowing that if it exceeds 200 μs the reader is in the middle of a charge pulse. In the case where the sync line 900 is high, there is no confusion since the slave reader will continue to wait for a high to low transition.

In the case where the sync line is low, as at the start bit 906, it can be determined whether the low is preceding a MUX pulse 908 or is a charge cycle 910 by measuring the amount of time the sync line remains low. If the sync line remains low for more than 200 μs (±10%), then it is not actually preceding a MUX pulse, but actually a charge cycle 910, in which case the interrupts are re-enabled and the hunt for the start bit resumes.

It will be also appreciated that processing routines are written such that message processing does not occur in a manner to inordinately slow down the master reader 20. Slowing down the master reader 20 is to be avoided since this will slow down the entire system of readers 20.

Pseudo-code written for storage and processing in the master and slave readers 20 that implements the synchronization of MUX 62 channels using the sync line 62 may be expressed as follows:

Sync Pseudo-Code (Slave Reader)
   Start:
      start timer
      while sync line is high
         wait
         if timer goes off, go to Start
      //test to see if this is the 200 μs low. If not, we were not synced!
      start timer
      while sync line is low
         wait
         if timer had gone off then go to Start
      //okay, we are synced. Time the pulse to determine the mux channel
      disable interrupts
      start timer
      while sync line is high
         wait
      enable interrupts
      if timer is zero go to Start
      if timer is greater than 310 ms
         select antenna-3
      else if timer is greater than 210 ms
         select antenna-2
      else if timer is greater than 110 ms
         select antenna 1
      else if timer is greater than 10 ms
         select antenna 0

Sync Pseudo-code (Master Reader)
   Start:
      //make sure the sync line is high for some period that slave will notice . . .
      force sync line high
      set timer for 15 ms
      while timer has not expired
         wait
      //go low for 200 μs so that the slave will know that
      //this is the start of the mux-sync timing
      force sync line low
      disable interrupts
      loop for approx. 200 μs
      //create the variable width pulse
      force sync line high
      if antenna number=0
         loop for 75 μs
      else if antenna number=2
         loop for 175 μs
      else if antenna number=2
         loop for 275 μs
      else if antenna number=3
         loop for 375 μs
      enable interrupts
      force sync line low
      (all readers should now start their power/charge cycle)
End Sync Pseudo-code
   //this code should be called after we have read the transponder
   //and re-enabled the serial interrupts
   End MuxSync:
      force sync line high Reference is now made to the following section which discusses a slave reader 20 line protocol that may be used in one embodiment of the system 10 for implementing the above described synchronization functions.

1.0 Slave Reader (CPT) Line Protocol 1.1 General

The data link described here is based on a master/slave relationship in which the master (the CPS) sends data or commands to the slave units (the CPTs). The slave units will make appropriate responses to the master-initiated communication. Under no circumstance will a slave initiate communications. The communication is half-duplex and the protocol is transparent and byte-oriented. The protocol allows variable-length.

1.2 Data Format

The serial data format includes asynchronous communication: 9600 baud; 1 start bit; 8 data bits; no parity bit: and 1 stop bit.

1.3 Data Link Hardware

The data link is 2-wire, multi-dropped, RS-485.

1.4 Error-Checking

Error-checking is accomplished via CRC-16 (Cyclic Redundancy Check) on all transmissions. Parity is not required at the byte level since CRC-16 is used on all data bytes transmitted.

1.5 Mode of Transmission

The mode of transmission is preferably half-duplex, asynchronous, start-stop format.

1.6 Buffer Size

Transmit and receive buffers at the Master and the Slave reader devices are variable and application-dependent. However, the maximum size is 251 bytes, excluding protocol control and inserted DLE (Data Link Escape) bytes. "Inserted DLE" bytes are used to achieve data transparency, as explained with respect to Code Transparency as discussed herein below.

1.7 Protocol

The protocol structure consists of a synchronizing byte followed by the slave device address byte, an optional data field, a stop byte and two CRC bytes. The protocol byte-map includes:

| SYNC | ADDR | Data Bytes (251 max) | SF | CRC1 | CRC2 |
|------|------|----------------------|----|----|------|

A description of each byte follows:

SYNC Byte (FE Hex)

The SYNC Byte indicates to the receiving device that the transmission of communication block is starting. It also indicates that the next byte transmitted contains the slave device address.

ADDR Byte (00 to FF Hex)

The ADDR Byte is the address of the slave device.

SF Byte (FD Hex)

The SF Byte (i.e., stop flag) indicates the end of control and data portions of the transmission. SF also indicates that the next two bytes contain the CRC of the transmission.

CRC1 and CRC2 Bytes

CRC1 is the least significant byte of the CRC-16 check work. CRC1 and CRC2 are calculated on the following bytes: SYNC, ADDR, DATA (excluding inserted DLE's), and SF.

The Master reader transmits a message according to the above protocol. The addressed Slave reader responds using the same protocol. After the Master or the Slave reader receives its last data, it waits a minimum of 5 ms before turning on its transmitter. This gives the sender a chance to turn off its transmitter and turn on its receiver. If the Slave reader detects a transmission error, it does not respond.

Alternatively, the protocol structure may include a synchronizing byte followed by the address bytes, a command/response code, an optional data field, a stop byte and two CRC bytes. The address bytes can include a destination address (DEST ADDR) Byte (00 to FF hex) of a transmitting device. In this alternative protocol structure. CRC1 and CRC2 are calculated on the following bytes: SYNC, DEST ADDR, SRC ADDR, DATA (excluding inserted DLE's), and SF.

1.8 Code Transparency

Code transparency for eight-bit data is achieved by Data Link Escape (DLE) insertion. The DLE character byte has a value of OFCH (FC hex). Note that this is not the ASCII value for DLE. The DLE character is inserted before specified data patterns in the protocol to clarify the meaning of those data patterns. Inserted DLE characters are not included in the CRC-16 calculation. The rules for DLE insertion are as follows:

i) DLE is inserted before any byte in the transmission that has a value equal to SYNC except the actual SYNC byte, wherein the any byte includes ADDR, all data bytes, CRC1 and CRC2;

ii) DLE is inserted before any byte in the transmission that has a value equal to SF except the actual SF byte, wherein the any byte includes ADDR, all data bytes, CRC1, and CRC2; and iii) DLE is inserted before any byte in the transmission that has a value equal to DLE to allow the value of DLE to be transmitted to the receiver, wherein the any byte includes ADDR, all data bytes, CRC1, and CRC2.

III. Host Computer Communications

1.0 Overview

Referring again to FIG. 7, communications on the comm line 72 between the readers 20 and the host computer 16 in the present embodiment are limited because the readers are unable to communicate reliably to the host computer during the read cycle, i.e., when the reader is receiving information from the transponders 23, 25. This problem is due, in part, to the lack of hardware resources available in the commercially available readers 20 (i.e., the TIRIS™ Series 2000 reader available from Texas Instruments Incorporated under the TIRIS™ product line).

For example, the TIRIS™ Series 2000 reader 20 lacks a universal asynchronous receiver-transmitter (UART) to transmit/receive transponder data. With the current TIRIS™ Series 2000 reader software, there can be either 100% communications with the host computer (with occasional garbled transponder reads) or 100% transponder reads (with dropouts in host computer communications), but not both 100% communications with the host computer and 100% transponder reads. Accordingly, the present embodiment implements a UART in the reader software (not shown) which is stored and executed within the reader 20. The software causes communications between the host computer 16 and the readers 20 only when a reader 20 is implementing a charge cycle. See FIG. 2 which illustrates the charge cycle ("POWER PULSE") lasting approximately 50 ms and the read cycle ("DATAXMIT") lasting approximately 20 ms. During the charge cycle, the processor (not shown) in the reader is available for communications on the comm line 72 while it is waiting for a 50 ms timer (not shown) to transpire. Subsequently, once the reader 20 has finished charging the transponder 23, 25, it will attempt to read information from the transponder. To do this, serial interrupts must be disabled for at least 20-25 ms. The timer is implemented in hardware and, therefore, is not affected by the serial interrupts. However, this would not be a good time for host computer 16 communications to occur because either the transponder read or the communications with the host computer will be garbled by the interrupt for host computer communications.

According to the present invention, the software within the reader 20 implements the UART function by using the sync line 74 to ensure that the host computer 16 does not communicate with the reader 20 when the reader is reading transponder data (and the interrupts are disabled). In particular, the UART function is implemented by only allowing the host computer 16 to communicate with the reader 20 on the comm line 72 when the sync line 74 is low, and adjusts the logic of the sync line such that a low sync line is a reliable indicator of when charging is occurring. When the sync line 74 transitions from high to low (see FIG. 9A where the sync timing line 900 moves from a high position 1 to a low position 2), the charge cycle for the reader commences. The sync line stays low during charging and the software according to the present invention then instructs the sync line to transition from low to high at the end of the charge cycle (see FIG. 9A where the sync timing line 900 moves from a low position 3 to a high position 4). Thus the sync line is low only when the charge cycle is occurring. By following the rule that the host computer 16 can only communicate on the comm line 72 with the readers 20 when the sync line 74 is low, it is ensured that there will never be a case when information is sent during the read cycle when interrupts are disabled.

In the host computer 16, a clear-to-send (CTS) line (not shown) on corresponding RS-232 ports (not shown) regulates flow of data to and from the readers 20 according to when the line is high or low. The sync line 74 is thus connected to the CTS line through an RS-485 to RS-232 converter (not shown) for preventing the host computer 16 from sending data when the reader 20 is unable to process it.

Reference is now made to the following section which describes a communications protocol between the software within the readers 20 and the host computer 16 for an embodiment in which the host computer is a Wayne Plus system, e.g., a Wayne Plus/2 or Wayne Plus/3 host computer available from Wayne Division, Dresser Industries, Inc. of Austin, Tex., and the reader software is a modified version of TIRIS™ S2000 reader software available from Texas Instruments Incorporated.

2.0 Communications Protocol Between Host Computer and Readers

The TIRIS™ S2000 reader application software available from Texas Instruments Incorporated includes a "Gate function" in which serial interrupts are disabled right before a "Transponder Receive" routine. The TIRIS™ S2000 reader software synchronizes the readers by sending the synchronization line from a high to a low. The S2000 reader software is modified according to the present invention so that at the end of a charge cycle the synchronization line is forced high so that it is always the case that the line is low during the charge cycle.

The original TIRIS™ reader software has what is called an inter-character time-out—if more than three character times went by, the reader 20 would call it a bad request and move on. Although this was adjustable through software, it is unusual and too rigid. This rigidity has the side-effect of forcing the host computer 16 to accommodate the peripheral's timing rather than the other way around.

Cooperative communications requires the host computer 16 only transmit during a charge pulse. If one were to use inter-character time-outs, it is possible that a message could be split between two charge pulses (this has been seen in tests). The result is that the TIRIS™ reader 20 believes that it has received only part of a message (which it throws away). Since timing during communications is so important, if the TIRIS™ reader 20 sees one character, it waits until a whole message has been sent, hanging in a loop until the time-out period has elapsed.

In order to allow reuse of existing Wayne host computer communication libraries, the base level protocol has been redefined to follow the CPT, or slave unit, protocol as discussed herein above, which is also known as the "CAT protocol". Since this protocol is fairly generalized in the way that data is formatted, it has been narrowly defined for the reader 20. This protocol differs from the bus protocol used by the TIRIS™ S2000 Reader, which is also known as the TIRIS™ Bus Protocol available from Texas Instruments Incorporated (for example, see TIRIS™ Bus Protocol (TBP). Chapter 7 in "TIRIS: Series 2000 Reader System Reference Manual", Texas Instruments, (#RI-ACC-D01A), which is incorporated herein by reference) in the following ways:

(i) Start of Header has been changed from 0x01 to 0xFE:
(ii) End of Message has been changed from 0x04 to 0xFD:
(iii) The CRC has been changed from CRC-CCITT to CRC-16 (initialized to 0xFFFF); and
(iv) All responses from readers contain, as their first byte in the data, the command code that initiated the response.

All commands and data sent from the host computer 16 to a reader 20 have the following data packet format:

| Byte 0 | Byte 1 | Byte 2 | Byte 3 | Byte 4 | Byte 5 | ... | Byte len + 5 | Byte len + 6 | Byte len + 7 |
|---|---|---|---|---|---|---|---|---|---|
| Start (0xFE) | Dest Addr | Src Addr | Cmd | Len | Data | ... | Stop (0xFD) | CRC (lsb) | CRC (msb) |

| Byte | Description |
|---|---|
| 0 | Start of Header - always 0xFE |
| 1 | Destination - which reader this message goes to |
| 2 | Source - the Host address (always 0x00) |
| 3 | Command - command reader should execute |
| 4 | Length - length of data (can be 0) |
| 5 | Data - data to send (if any) |
| LEN + 5 | End of Message - always 0xFD |
| LEN + 6 | CRC - most significant byte |
| LEN + 7 | CRC - least significant byte |

Replies (i.e. packets) sent from a Reader 20 to the host computer 16 will include a response code, a command code, and any associated data that may be of interest. Preceding the data is the command that initiated the particular response. The existence of data depends on the response code and the command type. The replies preferably have the following data packet format:

| Byte 0 | Byte 1 | Byte 2 | Byte 3 | Byte 4 | Byte 5 | ... | Byte len + 5 | Byte len + 6 | Byte len + 7 |
|---|---|---|---|---|---|---|---|---|---|
| Start (0xFE) | Dest Addr | Src Addr | Resp Code | Len | Data | ... | Stop (0xFD) | CRC (lsb) | CRC (msb) |

| Byte | Description |
|---|---|
| 0 | Start of Header - always –xFE |
| 1 | Destination - the Host address (always 0x00) |
| 2 | Source - which reader this message came from |
| 3 | Response code - described on pg. 7-8 of the "TIRIS™ Bus Protocol" |
| 4 | Length - length of data (never less than 1) |
| 5 | Data - response. The first byte is always the command that initiated the response. |
| LEN + 5 | End of Message - always 0xFD |
| LEN + 6 | CRC - most significant byte |
| LEN + 7 | CRC - lease significant byte |

The Response Code (alt., the error code) may be defined as shown in the following table:

| BIT 7 | BIT 6 | BIT 5 | BIT 4 | BIT 3 BIT 2 BIT 1 BIT 0 |
|---|---|---|---|---|
| Error Flag | Busy Flag | Data Available Flag | Broadcast Received Flag | Response Code<br>If Error Flag is 0.0 - Command Complete<br>If Error Flag is 1.<br>  0 - Transmission Error<br>  1 - Command Invalid<br>  2 - Task Error<br>  3 - Data Field Length Error<br>  4 - Parameter Error<br>  5 - Parameter/Download Required |

For example, 0x81 indicates the command is invalid.

In addition, as previously mentioned, to allow for "data transparency", the CPT protocol implements a special code called the Data Link Escape or DLE. The DLE is used prior to any character that may for some reason or another be a 0xFE (Start of Header), 0xFD (Stop or End of Message), or 0xFC (DLE). Inserting a DLE prior to any of these three characters informs the receiving unit software to treat the next byte as data instead of a Start of Header, End of Message, or even as another DLE. An exemplary data stream is shown below:

| 03 | 22 | FC | FE | FC | FD | 22 | FD |
|---|---|---|---|---|---|---|---|
| Data | Data | DLE | Data | DLE | Data | Data | End of Message |

Note that DLE characters are not included as part of the CRC computation. The CRC is calculated on the data packet before DLE insertion. Therefore, it is perfectly valid to have DLE characters inserted in the CRC.

Figure 10A:
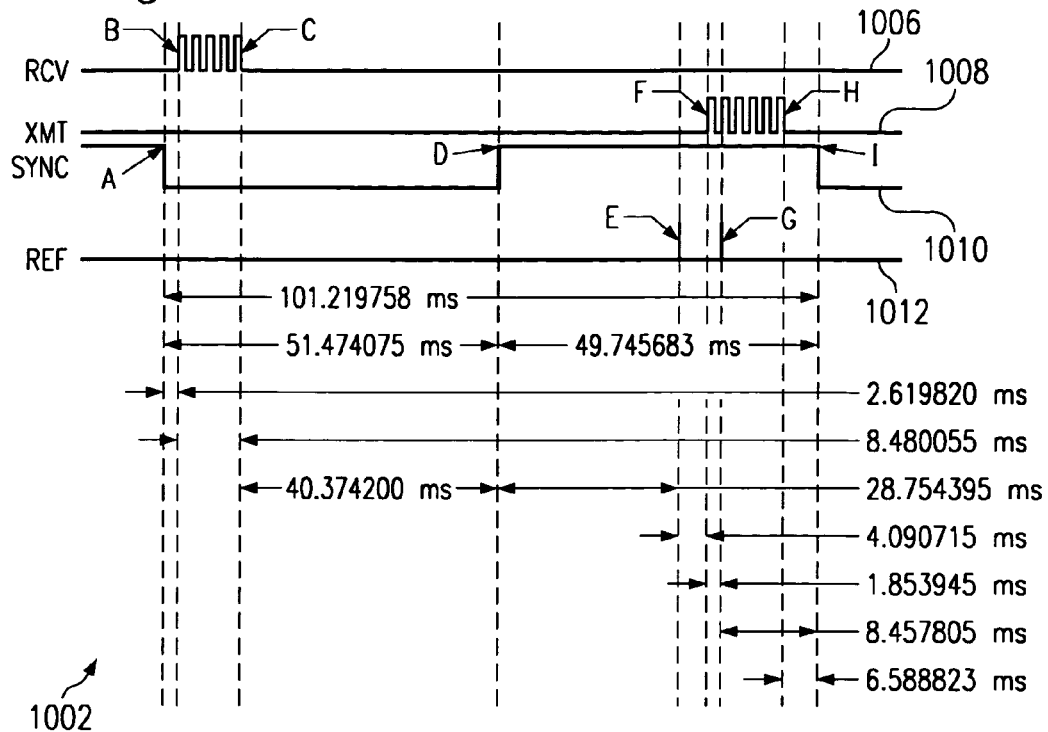
FIGS. 10A and 10B are detailed timing diagrams showing communications to and from a master reader of the system of FIG. 1.
Figure 10B:
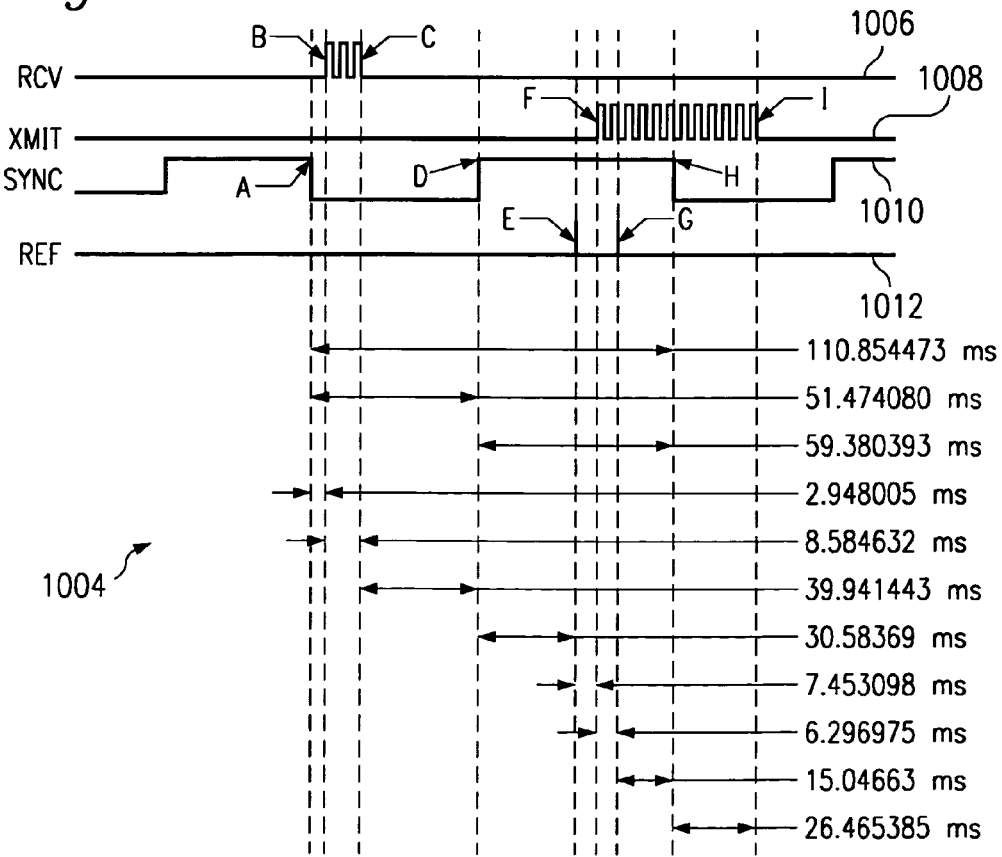

Reference is now made to FIGS. 10A and 10B. FIGS. 10A and 10B are timing diagrams 1002, 1004 illustrating the timing of communications between the host computer 16 and the readers 20 for typical communications to and from a reader running the reader software according to the present invention. The FIG. 10A diagram 1002 represents the timing for a reader with no transponders 23 or 25 within range of any of its antennas 22A, 22B, 24A, 24B. The FIG. 10B diagram 1004 represents the timing for a reader 20 with transponders 23 or 25 at all four of its antennas 22A, 22B, 24A, 24B. FIGS. 10A and 10B thus show the lightest possible load and the heaviest possible load, respectively, on a reader 20 of the system 10.

In both diagrams 1002, 1004, a RCV signal 1006 shows timing of the data received by the reader 20 from host computer 16. A XMT signal 1008 shows timing of the data sent by the reader to the host computer 16. A SYNC signal 1010 shows timing of the sync line 74 data that keeps all of the readers 20 and host computer 16 synchronized. It is also tied to the host computer to indicate when it is safe to send data to any of the readers. A REF signal 1012 shows the timing of a signal generated by the software of the reader 20 for debug and diagnostic purposes. Reference points A through I illustrate events in the timing of the signals for purposes of explanation of the diagrams set forth below. All timing diagrams, FIG. 10A and FIG. 10B, were generated by a Tektronics Prism Logic Analyzer.

In FIG. 10A, the diagram 1002 (illustrating the case of a reader 20 with no transponders 23, 25 in range) is generated by using a "Get Variable Length Antenna Scan Buffer" command as discussed further herein below with respect to the reader software enhancements.

AD—Mux/Sync-Charge Transponder.

Reference is made to the SYNC signal 1010 between points A and D. Prior to setting the sync line 74 low, the master reader (FIG. 7) outputs the mux-sync pulse 908 (FIG. 9C) that tells the slave readers 20 (i.e., their processors) which antenna to use when charging. When this pulse completes, the line 74 goes low and all readers 20 output a charge pulse on the correct antenna until the master reader 20 raises the line 74 high.

The processor of each slave reader 20 searches the sync line 74 for the mux-sync pulse that informs all the slave reader 20 processors which multiplexer channel (i.e., antenna) to use for the next charge-read cycle.

The processor of each slave reader 20 searches for a change in the sync line 74 (from high to low). It then measures that pulse (the start pulse) which should be in the range of about 200 µs (that is why it does not appear in the diagram 1002). Immediately after that, interrupts are disabled so that the reader 20 can determine the length of the following low (75 µs-375 µs). This determines which antenna should be used (a 0-99 µs pulse indicates antenna 1, a 100-199 µs pulse indicates antenna 2, etc. as explained with reference to FIG. 9C).

Once the correct antenna is determined, it is switched and a TIRIS™ reader software function is called that begins charging the transponder 23 or 25. Basically this consists of setting an external flag to let the analog section of the reader 20 begin transmission. This function loops until a timer completes.

BC—Host Transmission.

Reference is made to the RCV signal 1006 between points B and C. This illustrates the dual nature of the sync line 74.

Since the processor of the reader 20 is in essence doing nothing during the time of AD, the sync line 74 indicates to the host computer 16 that it may send data to the reader 20, as indicated by the receive signal at BC. At this point the Reader is executing code in the TIRIS™ reader software function "write sequence( )" and is unable to process any messages received from the host computer until point E.

D—Start Transponder Read.

Reference is made to the SYNC signal 1010 at point D. Both the master and slave readers 20 exit from the function "write sequence( )" after 50-52 milliseconds. At point D the master reader 20 raises the sync line 74 to prevent the host computer 20 from sending any more data. There may be a case where a character has been loaded into the host computer 16 UART shift register and it is too late to stop transmission. To avoid losing this character, the master reader 20 raises the Sync line 74 prematurely for 5 milliseconds. This gives the reader 20 ample time to capture the characters sent by the host computer 20. After the five milliseconds are up, serial interrupts are disabled and another TIRIS™ reader software function is called to read the transponder 23, 25 (which results in an implementation of the software UART function, as previously described).

DE—Transponder Read.

Reference is made to the REF signal 1012 between points D and E. A transponder 23, 25 read by the reader 20 occurs in approximately 20-23 ms (note that DE includes the 5 millisecond delay mentioned above). During this time all interrupts are disabled and there can be no communication from or to the host computer 16.

E—Begin Message Processing.

Reference is made to the REF signal 1012 at point E. This is where the reader 20 actually gets a chance to process the message it received at BC from the host computer 16. In this example it took 77.608650 ms from when the host computer 16 started sending the message to when the reader 20 finally manages to begin processing the message.

EF—Message Processing.

Reference is made to the REF signal 1012 between points E and F. During message processing the reader 20 determines what it is that the host computer 20 requested, acts on this request, and builds the buffers required for a response. This processing varies depending on the type of message as well as the size of the message.

F—Start of Response

Reference is made to the XMT signal 1008 at point F where the reader 20 begins transmission of data to the host computer 16.

FG—Complete Processing

Reference is made to the REF signal 1012 between points F and G. This is the time that it takes to do all the necessary work to store a packet in the serial output buffer.

FH—Reader Transmits Response.

Reference is made to the XMT signal 1008 between points F and H. The data, having been loaded in an output queue, is sent by serial interrupts from the reader 20 to the host computer 16. Readers 20, unlike the host computer 16, are not bound by the "transmit only when sync line is high" rule and can transmit at any time. This is desirable because the worst-case message (as described in diagram 1004 below) is approximately 47.9 ms and the charge time is approximately 51.5 ms. This leaves approximately 3.6 ms, which is far too short a time for the host computer 16 to send another request (ideally one response and one request per cycle). The more bytes the reader 20 transmits during a low sync signal the fewer it must send when the sync line 74 goes high. This permits the host computer 16 to communicate more efficiently with the reader 20.

Point G is where the reader 20 has completed answering a message and is ready to search for the next Mux-Sync pulse. Point H is the end of the reader 20 response. Point I is the beginning of the next Mux-Sync pulse.

In FIG. 10B, the diagram 1004 (illustrating the case of a reader 20 with transponders 23, 25 in range and detected on all antennas) is generated by using the "Get Variable Length Antenna Scan Buffer" command as discussed further herein below with respect to the reader software enhancements.

The description of the diagram 1004 is substantially the same as described above for the diagram 1002, with the differences of the timing of events being noted by reference to FIG. 10B. At reference point E, the reader 20 gets to process the message it received at BC from the host computer 16. In this example, the time from point B to point E is 79.109765 ms. At reference point H, the start of the next Mux-Sync pulse is indicated. The timing shown requires the reader 20 to detect the start bit of the Mux-Sync data while sending data to the host computer 16. This requires that the serial output routine be faster than the Mux-Sync start bit and that the Mux-Sync pulse be short enough not to influence the overall timing.

Point I is the end of the reader 20 response. Since the reader 20 began transmission approximately 21.3 ms prior to the sync line 74 going high (SYNC signal 1010), the host computer 16 has ample time (20-25 ms) to send another request. Since an average request is approximately 8-12 ms (depending on the number of DLE characters inserted), there is plenty of time.

Further details concerning communications between the host computer 16 and the readers 20 is contained in documentation available from Texas Instruments Incorporated for its TIRIS™ product line, for example "TIRIS: Series 2000 Reader System Reference Manual." Texas Instruments, (#RI-ACC-D01A), which is incorporated herein by reference.

Reference is now made to the following section which provides a description of certain functions and enhancements made to the software of the readers 20 specific to implementation of the system 10 consistent with the present specification. In particular, a description of commands used between the Wayne+ POS (RF-CID) System and the CID digital control board is provided. In one embodiment, the software is embedded in an EEPROM on the digital control board. The software (or protocol interface) allows the Wayne+ POS (RF-CID) System to link with the reader system. The software is responsible for accurate and consistent identification of RF signals.

IV. Reader Software Enhancements

The TIRIS™ reader software has been modified and enhanced according to the present invention by adding functions, synchronizing the antennas, and modifying the host computer-reader protocol to make it more robust. The enhancements made to the reader software are designed to add functionality without removing any that currently exists in commercially available TIRIS™ reader software. The enhancements include, new command codes for the TIRIS™ Bus Protocol, controlling the antenna multiplexer, adding an antenna scan buffer, utilizing an on-board DIP switch to set the address of a respective digital control board, and providing a new communications scheme. The enhancements may be implemented by adding command codes to the TIRIS™ Bus Protocol, defined as Group 3 commands (96 to 127), which have been reserved by Texas Instruments specifically for the user. By adding commands in this area, potential future conflicts with the TIRIS™ software functions are avoided.

The protocol interface consists of hexadecimal commands that read the transponder challenge and response data, turn on and off the recognition lights, turn on and off polling for transponders, and set the timing synchronization.

1.0 Scan Buffer

Pivotal to executing these commands is a scan buffer. The scan buffer allows the host to retrieve transponder ID data from the digital control board (DCB) in a single read. Each DCB scans up to four antennas asking for transponder data. Any transponder IDs found are scanned and placed in the scan buffer. For instance, with a handheld or keying, transponder ID placed in the scan buffer will remain there until at least one host read has occurred. This provides a "latching" mechanism for these transponders, thereby avoiding a missed host read if the host does not query in the same antenna cycle that the transponder is presented. The scan buffer also contains the current state of the lights controlled by the DCB of reader 20.

The Scan Buffer is thus designed to allow the host computer 16 to retrieve transponder ID data from the DCB of a reader 20 in a single read. The DCB scans the up to four (4) antennas asking for transponder data. Any transponder IDs scanned are placed in the Scan Buffer. If a transponder ID is placed in the scan buffer, it must remain there until at least one host read has occurred. This provides the "latching" mechanism where any transponder read remains in the Scan Buffer until it is read by the host. The pitfall of the host missing any transponder reads due to where the host read falls within an antenna cycle is thus advantageously avoided.

In other words, the Scan Buffer is designed to allow the host computer 16 to retrieve ID data of up to four antennas at once rather than individually from the DCB. Part of this is accomplished by putting the system in Gate Mode, as discussed above with respect to the "latching" mechanism. Gate Mode indicates that the system will do repetitive charge-read cycles, normally storing any transponder ID that it reads in the reader's queue for later access. This action has been modified so that the data is actually stored in the Scan Buffer using the following algorithm:

Set the reader's multiplexer to antenna N
Charge transponder (send it a Power Pulse)
Read transponder
if received transponder ID
store transponder ID in Scan Buffer (N)
else if Scan Buffer (N) has an ID and it has not been read by Host
do nothing
else
clear Scan Buffer (N)

Later, when the Scan Buffer is read, flags are set indicating that all four antennas have been read. As discussed, this provides a "latching" mechanism where any transponder read remains in the Scan Buffer until it is read by the host computer, thereby avoiding the pitfall of the host computer missing any transponder reads due to where the host computer read falls within the antenna cycle.

2.0 Command Codes

Command codes, which are the most visible part of the software enhancement and DCB protocol interface, consist of the following RS-485 command set.

RS-485 Command Set for the RF-CID System

| RS485 Command | Decimal | Command |
|---|---|---|
| 0x40 | 64 | Get Version (Wayne CID and TIRIS™ Version) |
| 0x62 | 98 | Get Antenna Scan Buffer |
| 0x64 | 100 | Gate Power Pulse |
| 0x65 | 101 | Get Read History |
| 0x66 | 102 | Get Variable Length Antenna Scan Buffer |
| 0x67 | 103 | Echoes Test Data |
| 0x68 | 104 | Enables/Disable Dispenser Lamps |
| 0x69 | 105 | Enables/Disable Dispenser Lamp Control |
| 0x6A | 106 | Gets Transponder Challenge Code |
| 0x6B | 107 | Return Transponder Challenge Data |
| 0x6C | 108 | Resume Polling |
| 0x6D | 109 | Retry Variable Length Antenna Scan Buffer |
| 0x6E | 110 | Set Parameters |
| 0x6F | 111 | Stop Polling |
| 0xFF | 255 | Time Sync |

2.1 Get Version

Command Code: 0x40 (64) Immediate Mode Only

Data Sent: None

Data Returned: Success or failure indication. Success is indicated by the returning of a version number string (bytes 0-24 bytes). Failure is indicated by the standard Error-Response.

Description: The Get Version command returns the following on success:

| 0 1 2 3 4 5 | 6 7 8 9 | 10 11 12 13 14 | 15 16 17 18 19 | 20 21 22 23 24 |
|---|---|---|---|---|
| Wayne | CID | LUHF | TIRIS | x.xx |

This fixed string represents the CID-CAT Node Interface Program version and makes it easy to test the version number of the CID (Customer Identification) software. Alternatively, the version of the TIRIS™ software may also be returned for documentation and maintenance purposes.

2.2 Get Antenna Scan Buffer

Command Code: 0x62 (98) Immediate Mode Only

Data Sent: None

Data Returned: A total of 44 data bytes are returned, 11 bytes per antenna (1 byte status, 1 byte transponder type, 8 bytes transponder ID, and a 1 byte fleet block). Failure is indicated by the standard Error-Response.

Description: The Get Antenna Scan Buffer command returns variable length antenna scan block results. These represent the transponder codes last seen. If no transponder was seen, then 0x0000000000000000 is returned in the status. This function (i.e., each antenna buffer) returns a structure according to the following.

typedef struct TransponderID
{
  Byte Status;
  Byte Type;
  Byte TransponderID [8];
  Byte FB;
} TransponderID;
TransponderID Return Transponders [4];

The type returned will be one of the following:

| Valid Types | |
|---|---|
| 0x00 | Read-only transponder |
| 0x01 | DST transponder |
| 0x02 | Vehicle mounted transponder |
| 0xFF | No transponder |

The status returned will be one of the following:

| Valid Status | |
|---|---|
| 0x11 | Challenge data is available |
| 0x12 | Challenge data could not be read |
| 0x40 | No read |
| 0x41 | Incomplete read |
| 0x0 | Valid read |

The fleet block (FB) returned will be as follows:
Fleet Block
The fleet block is a byte of application-specific data which may be contained in a transponder, such as, fleet data. If the transponder being read does not contain fleet data, then the fleet block is set to 0x00 by the DCB of reader 20. If the transponder has fleet data that has been read by the DCB, then the 0x80 bit of the fleet block is set and the lower order 5 bits of the fleet block contain the fleet block value, which can be zero. The 0x40 and 0x20 bits are not defined, and should always be zero.

Note that all Status bytes are set to NO READ after this command is executed.

2.3 Get Variable Length Antenna Scan Buffer
Command Code: 0x66 (102) Immediate Mode Only
Data Sent: None
Data Returned: A variable length block of data is returned consisting of one (no transponders) to 45 bytes (four transponders); one byte indicates which antenna data is being returned with 11 bytes per antenna (1 byte status, 1 byte transponder type, 8 byte transponder ID, and a 1 byte fleet block). Failure is indicated by the standard Error-Response.
Description: This is a variable length version of the Get Antenna Scan Buffer function. It was designed on the premise that for a majority of the time, there will not be a transponder present. Even the normal case has two transponders being active (one on each side of the pump). The user of this function allows the reader to "waste" less time performing CRC's on empty packets.
This function returns a structure of the following:
struct PacketInfo
{
  Byte ActiveAntenna; //bit 0==antenna 1, etc.
  struct//0-4 of these follow
  [
    Byte Status;
    Byte Type;
    Byte TransponderID [8];
    Byte FB;
  ] Antenna;
} Transponder ID;
The Active Antenna byte uses the 4 least significant bits to indicate which antennas are included in the packet. For example, bits 0, 1, 2, & 3 may indicate antenna data included from antenna 1, 2, 3 and 4, respectively. The Active Antenna byte uses the 4 most significant bits to indicate the state of the lights controlled by the DCB. For example, bits 7 and 8 may indicate light status associated with antenna 3 & 4. Similarly, bits 5 and 6 may indicate light status associated with antenna 1 & 2. The state of the lights controlled by the DCB may include, for example:
  0x00—Light off;
  0x01—Light on; and
  0x02—Light flashing.
The type returned will be one of the following:

| Valid Types | |
|---|---|
| 0x00 | Read only transponder |
| 0x01 | DST transponder |
| 0x02 | Vehicle Mounted transponder |

The status returned will be one of the following:
Valid Status

| | |
|---|---|
| 0x00 | Valid read |
| 0x11 | Challenge Data is Available |
| 0x12 | Challenge Data could not be read |

The fleet block (FB) returned will be as follows:
Fleet Block
The fleet block is a byte of data which may contain the fleet data from a transponder. If the transponder being read does not contain fleet data the fleet block is set to 0x00 by the DCB. If the transponder has fleet data that has been read by the DCB the 0x80 bit of the fleet block is set and the lower order 5 bits contain the fleet block value, which can be zero. The 0x40 and 0x20 bits are not defined, and should always be zero.
Examples may include (excluding packet body):

| | | | | |
|---|---|---|---|---|
| 00 | | | | no antenna. light off |
| 10 | | | | no antenna. light for antenna 1 on |
| 11 | 00 00 41 ... ff | 00 | | antenna 1. light on |
| 04 | 00 00 41 ... ff | 00 | | antenna 3. light off |
| 56 | 00 00 41 ... ff | 00 00 00 41 ... ff | 00 | antenna 2 and 3, lights on |
| 49 | 00 00 41 ... ff | 00 00 00 41 ... ff | 00 | antenna 1 and 4, light for antenna 4 on |

Note that after sending data to the host computer 16, the DCB of reader 20 must be able to retransmit the data if the next message addressed to this DCB is a retry variable length buffer command. In addition, transponder IDs that are only 32 bits in length are stored in the least significant 4 bytes of the 8 byte transponder ID field. The most significant 4 bytes are zero padded. With respect to a hand held transponder, the 32 bit ID of the hand held transponder should be placed in the buffer as soon as it is read even if the remainder of the transponder data has not been retrieved. The corresponding light should not be turned on until all the hand held transponder data has been read. If a new transponder is read at an antenna, the new data should go into the scan buffer as soon as the current transmission is complete. The host computer 16 should always get the transponder being read, even if it has not read or acknowledged the previous transponder. Furthermore, the light status indicator preferably always indicates the current state of the lights. Lastly, all Status bytes in the Scan Buffer are set to NO READ after this command is executed.

2.4 Gate Power Pulse
  Command Code: 0x64 (100) Immediate Mode Only
  Data Sent: Byte 0:
    0x00 turns the Power Pulse off
    0x01 turns the Power Pulse on
  Data Returned: Success is indicated by the standard Command-Completed message. Failure is indicated by the standard Error-Response.
  Description: This function allows the host computer to prevent a reader from emitting a Power Pulse, yet continue to operate. The antenna scan buffers for that reader will eventually be cleared of all values. Turning the Power Pulse on allows the corresponding reader to continue on with a next antenna (i.e., the same one that all the other readers are presently on).

Note that when the power pulse is turned off, a corresponding indicator LED will no longer flash.

2.5 Get Read History
  Command Note: 0x65 (101) Immediate Mode Only
  Data Sent: None
  Data Returned: On success, a total of 80 bytes are returned as 20 four byte unsigned integers. Failure is indicated by the standard Error-Response.
  Description: The Get Read History command returns the read history. This function allows the host computer to read history about the success and/or failure of a reader to read transponder codes. It returns data for each antenna as follows:
    struct
    {
      unsigned long TotalReads;
      unsigned long TotalSuccess;
      unsigned long TotalErrNotRead:
      unsigned long TotalErrIncomplete;
      unsigned long TotalErrOther
    } ReturnedStruct [4]:

Various legends are defined as follows:
  TotalReads—The number of read attempts, basically the number of times the antenna was charged;
  TotalSuccess—The number of times valid transponder data was read;
  TotalErrNotRead—The number of time no transponder data was read;
  TotalErrIncomplete—The number of times some transponder data was read; and
  TotalErrOther—The number of times a bad CRC was detected.

This routine clears the totals immediately after sending them to the host computer.

2.6 Echo Test Data
  Command Code: 0x67 (103) Immediate Mode Only
  Data Sent: Up to 200 bytes of test data.
  Data Returned: On success, the test data is returned correctly. Failure is indicated by the standard Error-Response.
  Description: The Echo Test Data function is designed to validate communication to a CID-DCB board of a reader by allowing a user to send arbitrary data to the DCB of the reader. The DCB of the reader should return the same string it was sent.

As an example, to test DLE in the CRC, one can send one data byte 0xFE to the DCB of reader 1. The transmitted and received data packets should appear as follows:

Host Transmits:

| Start | Dest | Src | Cmd | Len | Data | End | CRC |
|---|---|---|---|---|---|---|---|
| FE | 01 | 00 | 67 | 01 | FC FE | FD | CA 4B |

Host Receives:

| Start | Dest | Src | Resp | Len | Data | End | CRC |
|---|---|---|---|---|---|---|---|
| FE | 00 | 01 | 00 | 02 | 67 FC FE | FD | FC FE 94 |

In the above example, note that the DLE's are not counted in the length of the data.

2.7 Enable/Disable Dispenser Lamps
  Command Code: 0x68 (104) Immediate Mode Only
  Data Sent:
    Byte 0—lamp number (1 or 2)
    Byte 1—light mode (0—off; 1—on: 2—flash)
  Data Returned: Success is indicated by the standard Command-Completed message. Failure is indicated by the standard Error-Response.
  Description: The Enable/Disable Dispenser Lamps function is designed to control the lamps that are on either side of the dispenser (a.k.a. dispenser or authorization lights). This command allows the user to indicate which lamp should be turned on, off, or set to flash without affecting the state of the other lamp. This function is such that a lamp can go to any state from any other state. For example, the lamp can go from on-to-off, on-to-flashing, off-to-on, off-to-flashing, flashing-to-on, and flashing-to-off.

2.8 Enable/Disable Dispenser Lamp Control
  Command Code: 0x69 (105) Immediate Mode Only
  Data Sent:
    Byte 0—lamp number (1 or 2) DCB of
    Byte 1—Light controlled by (0—Reader; 1—Wayne Plus host computer)
    Byte 2—light mode (0—off: 1—on; 2—flash)
  Data Returned: Success is indicated by the standard Command-Completed message. Failure is indicated by the standard Error-Response.
  Description: The Enable/Disable Dispenser Lamp Control function is designed to give or take control of the lamps that are on either side of the dispenser (a.k.a. dispenser or authorization lights). This command allows the Wayne+ (host computer) to indicate which system is controlling the lamp, i.e. the DCB or the Wayne Plus. It also indicates if one lamp should be turned on, off, or set to flash without affecting the state of the other lamp. Furthermore, if lamp control is being given to the DCB, the light mode serves an initial condition only. The DCB may immediately adjust the state of the light based on the operating conditions.

2.9 Get Transponder Challenge Code
  Command Code 0x6A (106) Immediate Mode Only
  Data Sent: Antenna to challenge (1 to 4).
  Date Returned: Success is indicated by the standard Command-Complete message. Failure is indicated by the standard Error-Response.
  Description: The Get transponder challenge code command causes the DCB of the reader to issue a challenge code and receive the response code. This data will be stored in the scan buffer until the Wayne plus (host computer) system requests the data. Successful retrieving of the response code will cause the status byte in the scan buffer for the challenge antenna to be set to 0x11 (i.e., challenge data is available). With respect to this command, after the DCB has retrieved the challenge data from the transponder, the DCB will stop polling that particular fueling point.

2.10 Return Transponder Challenge Data
  Command Code: 0x6B (107) Immediate Mode Only
  Data Sent: Antenna Number (1 to 4)
  Data Returned: On success, a total of 17 bytes are returned which include the transponder ID number, the challenge code and the challenge response. Failure is indicated by the standard Error-Response.
  Description: The Return transponder challenge data function allows the host computer to read the previously retrieved challenge data as follows:
  struct
  {
    unsigned char Type; //transponder type
    unsigned char ID (8); //transponder id
    unsigned char Challenge [5]; //challenge code
    unsigned char Ch_Response [3]; //challenge response
  } ReturnedStruct;

Note that with respect to the Return transponder challenge data command, if the DCB does not have challenge data for the specified antenna and this command is not received out of sequence, the DCB should return the standard error response with error indicating data not available.
  The type returned will be one of the following:
  Valid Types

| | |
|---|---|
| 0x00 | Read only transponder |
| 0x01 | DST transponder |
| 0x02 | Vehicle Mounted transponder |

2.11 Resume Polling
  Command Code 0x6C (108) Immediate Mode Only
  Data Sent:
    Byte 0—Antenna set to resume polling (1 or 3)
    Byte 1—Wait Mode
      (0—Resume immediately)
      (1—Wait for blank read before resuming)
      (2—Issue one short poll).
  Data Returned: Success is indicated by the standard Command-Completed message. Failure is indicated by the standard Error-Response.
  Description: The Resume polling command causes the reader to resume polling an antenna set. If byte 1 is set to 1, the antenna will resume polling, but it must get a blank read (i.e., no transponder present) before it will report a transponder at that antenna set. If byte 1 is set to 2, the DCB will perform a single poll of the transponder and update the scan buffers with that data. Antenna set 1 includes antennas 1 and 2 whereas antenna set 2 includes antennas 3 and 4. Because the DCB does not have an indication that a sale is complete, this command is needed so that the DCB can resume looking for transponders after the sale is complete.

2.12 Retry Variable Length Antenna Scan Buffer
  Command Code: 0x6D (109) Immediate Mode Only
  Data Sent: None
  Data Returned: The DCB should return the same data sent to the Wayne+ host computer on the previous Get Variable Length Antenna Scan Buffer command.
  Description: The Retry variable length antenna scan buffer is a retry mechanism should the host computer not receive a response due to a communication line error. Note that this command can also be received by a DCB after receiving a Retry Variable length Antenna Scan buffer or Return transponder challenge data command.

2.13 Set Parameters
  Command Code: 0x6E (110) Immediate Mode Only
  Data Sent:
    Byte 0—Customer page identifier to use in vehicle transponder polls.
    Byte 1—Station Identifier used in polling vehicle transponders.
    Byte 3—number of successful reads required to turn on the light.
    Byte 4—number of unsuccessful reads required to turn off the light.
  Data Returned Success is indicated by the standard Command-Completed message. Failure is indicated by the standard Error-Response.
  Description: The Set parameters function allows the host computer to set the identifier used when polling a vehicle transponder. Different system customers will use different key numbers for their transponders. Note that this identifier value must be downloaded to the DCB before it can function.

2.14 Stop Polling
  Command Code: 0x6F (111) Immediate Mode Only
  Data Sent: Byte 0—Antenna set to quit polling 1 or 3
  Data Returned: Success is indicated by the standard Command-Completed message. Failure is indicated by the standard Error-Response.
  Description: The Stop polling function allows the host computer to stop the polling of an antenna pair when needed, for example, while dispensing fuel in a cash or credit card sale.

2.15 Time Sync
  Command Code: 0xFF (255) Immediate Mode Only
  Data Sent: 3 bytes (0xFF, 0xFF, 0x00).
  Data Returned: None
  Description: The Time sync function is a broadcast command that is addressed to device 0xFF. For example, a message which is transmitted by the Wavne+ host computer approximately once every 10 seconds may include the message as follows:
  FE FF 00 FF 3 FF FF 00 FD 9C 3A.

3.0 Scan Buffer Structure
  During the scan of the antennas, the ID of any transponder found will be stored in the eight bytes corresponding to that antenna. The antennas may be defined, for example, as follows:

Antenna 1: large antenna on side 1
Antenna 2: small antenna on side 1
Antenna 3: large antenna on side 2
Antenna 4: small antenna on side 2

The data is stored in a structure according to the following:
```
typedef struct TransponderID
{
    unsigned char Status; //antenna status
    unsigned char ID [8]; //transponder id
    unsigned char fleet_block; //fleet data
    unsigned char Challenge [5]; //challenge code issued
    unsigned char Ch_Response [3]; //response to challenge
        code
} TransponderID;
TransponderID ScanBuffer [4]; //four antennas
```
Note that the Challenge and Ch_Response fields will not be valid for vehicle transponders that have not been issued a get transponder challenge code command from the host computer 16. The DCB will automatically request challenge codes from key ring transponders 25 that support that feature.

When the DCB is interacting with a vehicle transponder, the DCB will quit polling the transponder after retrieving the challenge code. At a later time the host computer commands the DCB to perform one or more poll of the transponder using a form of the "resuming polling" command. During this period, when the transponder is not being polled, the DCB returns scan buffer contents it had at the time the challenge code was retrieved. When the DCB issues the single shot poll, the scan buffer is updated at that time. If the transponder could not be read, then the buffer is cleared and the host computer is sent to a poll response indicating that the antenna is not active. If the transponder could be read and the transponder ID has not changed, then the scan buffer contents are left unchanged.

4.0 Dip Switch Addressing

With respect to the TIRIS™ Reader System, a program is normally required to be connected to the TIRIS™ configuration port of the reader to set the address port (as well as other parameters). This presents a problem in the field, where technicians need to swap parts quickly with a minimum of set-up. To overcome such a problem, a DIP switch that resides on a TIRIS™ assembly or board has been co-opted for this task for simplifying the addressing of the reader. For instance, the DIP switch can connect to the reader via ribbon cable or other suitable cable, thereby allowing the reader to be easily swapped out without requiring any other set-up. In one embodiment, the DIP switch includes four switches. Four switches give a total of 16 unique addresses. Readers will have addresses that range from 0x01 through 0x10 (i.e., 1-16). The master reader, in particular, will always have address 1 (0x01) which will be represented by setting the master reader DIP switches, numbered 1, 2, 3, and 4, to the ON, OFF, OFF, and OFF positions, respectively. Similarly, the DIP switches of a slave reader with address 15 (0x0F) will all be set to the ON position; and the DIP switches of a slave reader with address 16 (0x10) will all be set to the OFF position. In view of the manner of how the DIP switches are used, the readers should never be set to have an address of 0x00, which corresponds to the host address. In addition, the configuration is fixed at 9600 baud, 8 bits, 1 stop bit, no parity, enhanced TIRIS™ Bus Protocol (as discussed herein), and Mux-Sync synchronization.

5.0 Tuning Antennas

Tuning of the antennas is important for error-free reception of transponder data. One method of tuning is to unplug the multiplexer line coming out of a particular reader, whereby the multiplexer defaults to antenna 1. In addition, an antenna tuning board (ATB) (not shown) is preferably provided for use with the overhead LF and UHF antennas. The ATB allows for the resonance tuning of the low frequency downlink antenna to match with the transmitter module to achieve a desired maximum field strength. The antenna circuit is tuned to resonance by adjusting a ferrite core of an on-board coil.

6.0 CID System Test Plug

A verification lamp on the dispenser is normally controlled by the host software which issues a command to the reader. There are some instances when it is handy to have a reader turn associated verification lamps on when a valid transponder is detected. The later can be accomplished with the use of a "test plug". For example, the test plug may include a four pin Phoenix plug with one or more jumper wires connecting predetermined pins. When the test plug is inserted into a prescribed socket of the DCB and the reader is reset (either by cycling power or pressing a reset switch), the CID software will turn on the appropriate verification lamp when it "sees" a transponder. Normal operation can be resumed with removal of the test plug and resetting of the reader.

V. System Operation and User Interface 1.0 System Overview

The following is an overview of the operation and customer user interface of the CID system. A more detailed description of the operation and customer user interface is described further below with reference to FIGS. 11A-11I, 12-16 and 17A-17O. It is understood that the operation of the system 10 is controlled by programming instructions executed by the host computer 16, and by the reader 20 software described previously. The system 10 is integrated with a suitable fuel dispensing system that, in one embodiment, may be the Wayne Plus/2 or Wayne Plus/3 system available from the Wayne Division, Dresser Industries, Inc. of Austin, Tex., although other dispensing systems and software are contemplated. The system 10 may be integrated into the Nucleus control system also available from the Wayne Division, Dresser Industries, Inc., for example. The foregoing commercially available intelligent dispenser systems, or other commercially available dispenser arrangements, in cooperation with the CID system 10 of the present invention, integrate pump control, cash register, card processing and customer identification into a complete and operative system for a service station environment.

When a customer enters a service station and a transponder 23, 25 is detected at a fuel dispenser 14, the corresponding authorization light 45A or 45B, or other in-range indicator as discussed further below, is turned on to inform the customer that the transponder is in read range. After the dispenser is activated, for example by lifting the dispenser nozzle or lever or by commencing fueling, the system 10 sends an authorization request containing the transponder CID data to the computer network. Prior to actual fueling, however, the customer can press a cancel key on the customer-activated-terminal (CAT) or select a different payment method in order to override the use of the transponder CID code for payment of the transaction.

If a transponder is read for the first time at a dispenser where the dispenser nozzle has already been removed, the dispenser will not be authorized to use the CID code from the transponder for a sale. For example, if a first customer removes the nozzle at a pump and a second customer's transponder is subsequently read by the reader at that pump, the sale will not be charged to the second customer's transponder CID account.

1.1 Overview of Scenario for Window-Mounted Transponders

When a customer with a vehicle-mounted transponder 23 passes a fuel dispenser 14, the CID data is read from the transponder 23 by the long-range antenna 22A or 22B that is facing the vehicle. After the CID data is read, the authorization light 45A or 45B on the side closest the vehicle and corresponding to the long-range antenna turns on. If the customer proceeds to drive past the fuel dispenser without fueling, the light will remain on until the vehicle-mounted transponder 23 moves out of the read range for that pump. The light 45A or 45B preferably turns off after a programmable amount of blank reads have been made after the transponder 23 leaves the pump's read range. Accordingly, as the vehicle passes dispensers 14 without fueling, the corresponding authorization lights on the dispensers will turn on while the vehicle is within the read range and turn off when the car leaves the read range.

If the customer chooses to use a vehicle-mounted transponder 23 to pay for a transaction, the customer can check to see that the authorization light 45A or 45B has turned on when the car stops at the dispenser. When the customer lifts the dispenser nozzle (or begins fueling), the dispenser is "authorized" and a request for CID account authorization is sent through the host computer 16 to a network for billing purposes. The authorization light 45A or 45B preferably remains on throughout the transaction. After the customer replaces the nozzle, the sale is finalized with the host computer 16, and a receipt may be printed at the CAT. After the sale is completed, the authorization light 45A or 45B turns off and remains off as long as the transponder is continuously read by the antenna. A blank or "empty" transponder read (or predetermined number of blank reads) occurring after the sale is completed will reset the system to allow subsequent transponder reads to turn on the authorization light. Alternatively, the authorization light 45A or 45B remains on after the transaction is over until the customer's vehicles leaves the read range.

Once a sale or transaction is completed at a dispenser using a vehicle-mounted transponder 23, the vehicle-mounted transponder 23 preferably cannot be used at another dispenser for a predetermined interval of time. It is understood, however, that a vehicle-mounted transponder 23 may be used at the same time at more than one dispenser provided a sale has not been completed at one dispenser before the transponder 23 is used at another dispenser. Furthermore, it is understood that the system can be programmed so that although a vehicle-mounted transponder 23 has recently been used to complete a sale at a dispenser, the vehicle-mounted transponder could still be used for a different service, for example at a car wash or drive-up window of a convenience store.

1.2 Overview of Scenario for Hand-Held Transponders

If a customer has a hand-held transponder 25, such as a key ring or credit card style transponder, it must be presented to the short range antenna 24A, 24B by waving the transponder in front of the short-range antenna located at the authorization light (see FIGS. 4A and 5A). The short-range antenna 24A, 24B reads the CID data from the transponder and the corresponding authorization light is turned on.

A request for CID account authorization is sent to the network through the host computer 16 when the customer lifts the nozzle (or begins fueling). When the customer replaces the nozzle, the authorization light turns off, the sale is finalized, and a receipt may be printed at the CAT. Preferably, the hand-held transponders 25 can work at more than one customer-activated terminal (CAT) (whether at a dispenser, car wash, or convenience store area). In other words, the handheld transponders 25 can work at a particular CAT even if it is currently being used as the payment method for a transaction at another CAT.

1.3 Overview of Authorization Light Operation

When a customer identification (CID) is read at a dispenser 14 where a fueling transaction is not already in progress, the authorization light 45A, 45B turns on.

When CID data from a passing vehicle-mounted transponder 23 is read at the dispenser 14, the authorization light 45A, 45B at that dispenser turns on and remains on until the transponder is out of read range. As the vehicle passes the first dispenser and proceeds to the read range of a second dispenser, the CID data is read at the second dispenser and the authorization light of the second dispenser is turned on.

For vehicle-mounted transponder 23 transactions, the authorization light 45A, 45B turns off when the nozzle is replaced at the end of the sale or, alternatively, remains lit until the vehicle-mounted transponder is out of read range. If a hand-held transponder 25 is used, the authorization light turns off when the nozzle is replaced at the end of a sale.

If a customer overrides a CID transaction and selects a different method of payment, the authorization tight 45A, 45B will turn off.

After fueling is complete and the nozzle is returned, the system 10 can be programmed to prevent an authorization light from being turned on at any other dispenser (or alternatively, anywhere) in the service station for a predetermined interval of time by the CID transponder 23, 25 that had been used for the recently completed fueling transaction. Thus, the vehicle can leave the station without turning on any more authorization lights.

1.4. Customer Override

A customer can override the use of the transponder 23, 25 for a transaction by pressing the cancel key at the customer activated terminal (CAT) provided the dispenser 14 has not been activated (e.g., the nozzle has not been lifted) or fueling has not begun. A prompt such as "Cancel use of CID System? (Y/N)" is displayed at the CAT of the dispenser 14 once the cancel key is pressed. The customer can verify the override of the CID transaction by pressing the "Yes" key at the CAT. If the "No" key is selected at this time, the sale will continue as a CID transaction, i.e., a transaction where the customer's CID code is used for billing. A customer can also override a CID transaction before fueling by inserting a bill or credit card or by selecting another payment type such as cash. When the customer overrides a CID transaction, the light 45A, 45B is turned off.

Once a transaction or sale using a CID code is in the fueling stage, a different payment method cannot be selected at that dispenser 14, nor can the CID transaction be canceled.

1.5 Authorization is Denied or Times Out

If an authorization is denied, i.e., a CID code has been sent to the network and the network returns a signal indicating that the customer is denied authorization to use the system 10, i.e., the CID code, for payment, the transaction is treated like a denied pre-authorization sale. The dispenser 14 is stopped and the customer is informed to see the inside attendant for payment. If a vehicle-mounted transponder 23 is used, the authorization light turns off and remains off until the nozzle is replaced. Similarly, if an authorization response is not received from the network for a CID sale within a predetermined time (e.g., 60 seconds), the sale will be treated like a denied pre-authorization sale.

1.6 Network Communications Problems

If the computer network is down when a customer lifts a nozzle at a dispenser 14 that has an authorization light on, the dispenser will not start. Instead, the CAT display notifies the customer that the network is down and asks the customer to cancel the CID transaction before selecting another pay method. When the customer completes the fueling, but the sale cannot be paid through the CID system due to network problems, the CID "sale" is considered an unpaid CAT sale and may be logged and saved for reporting purposes.

2.0 Customer Identification (CID) Operation and User Interface Flowcharts

FIGS. 11A-11I and FIG. 12 are flowcharts describing the processes that occur when a customer uses the system 10 in a vehicle mounted transponder 23 scenario and in a hand-held transponder 25 scenario, respectively.

FIGS. 13-16 are flow diagrams illustrating the relationships between tasks and subsystems involved in handling customer transactions.

Figure 17A:
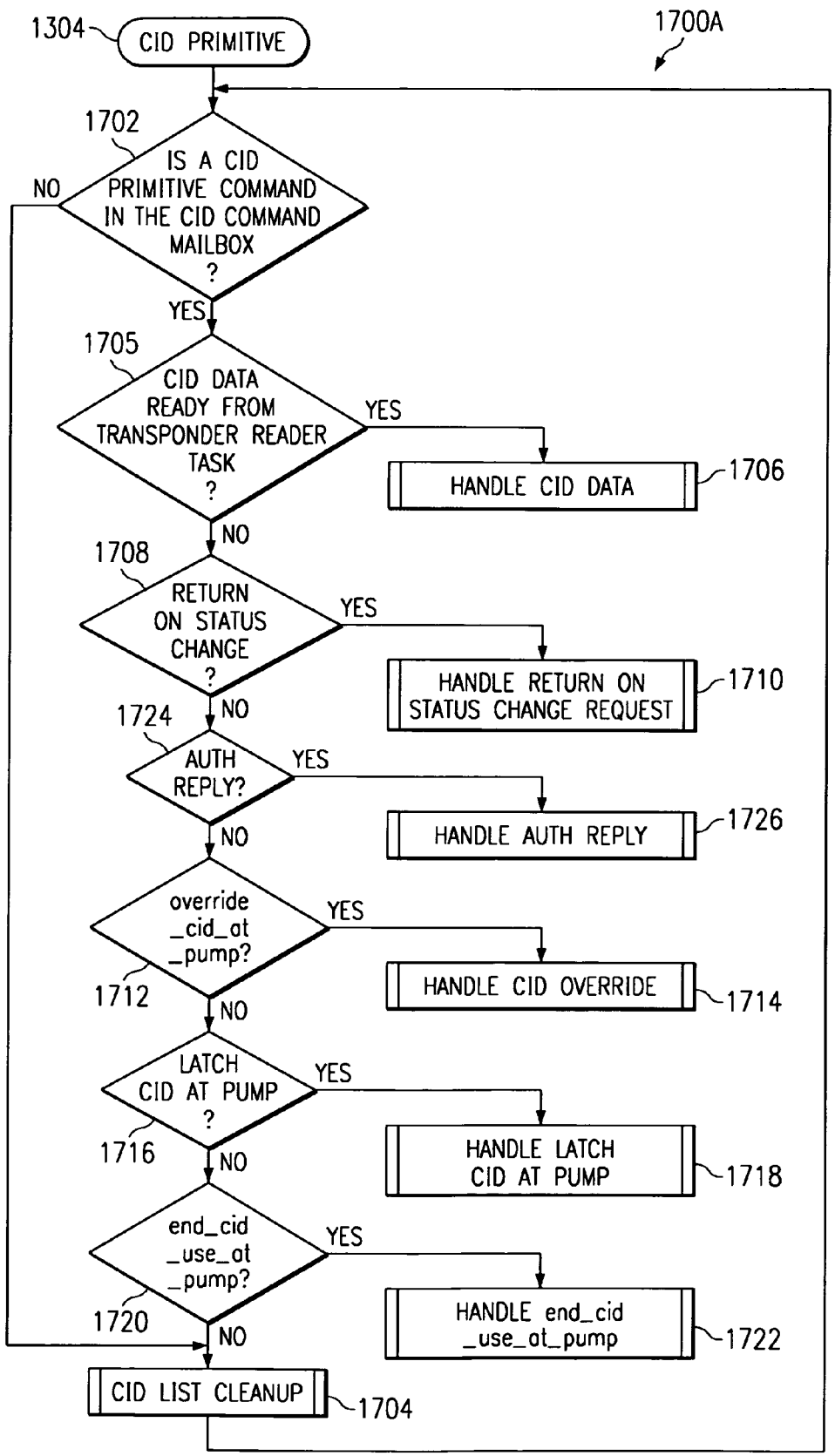
FIGS. 17A-17O are flowcharts illustrating the customer identification primitive tasks of the system of FIG. 1
Figure 17B:
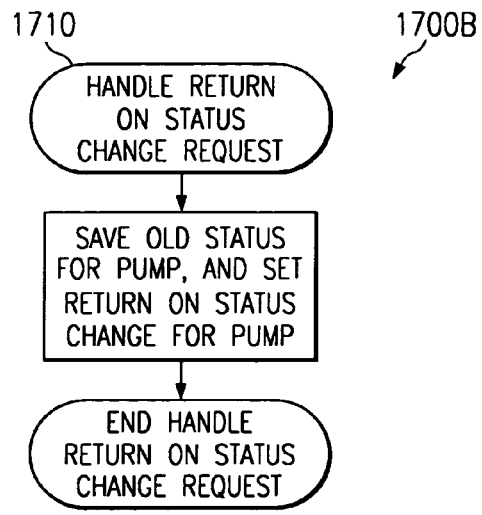
Figure 17C:
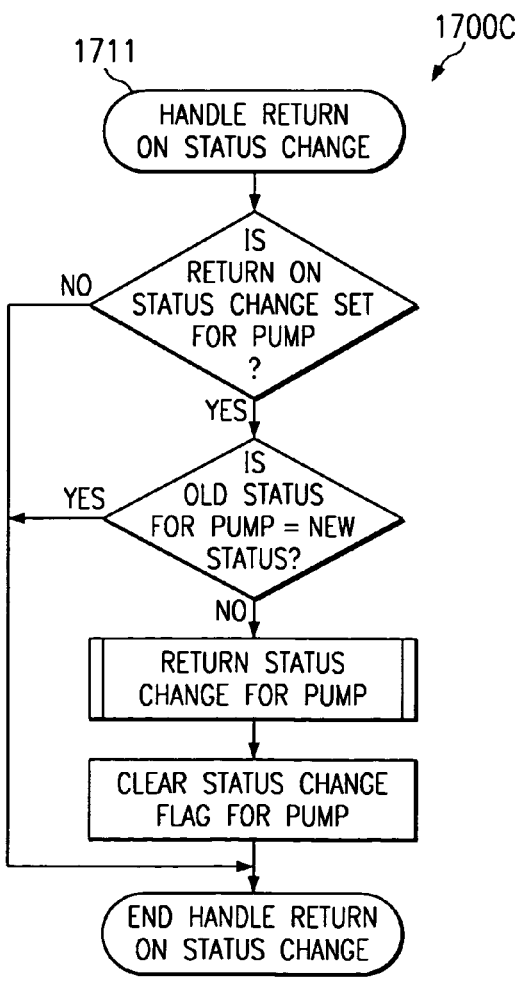
Figure 17D:
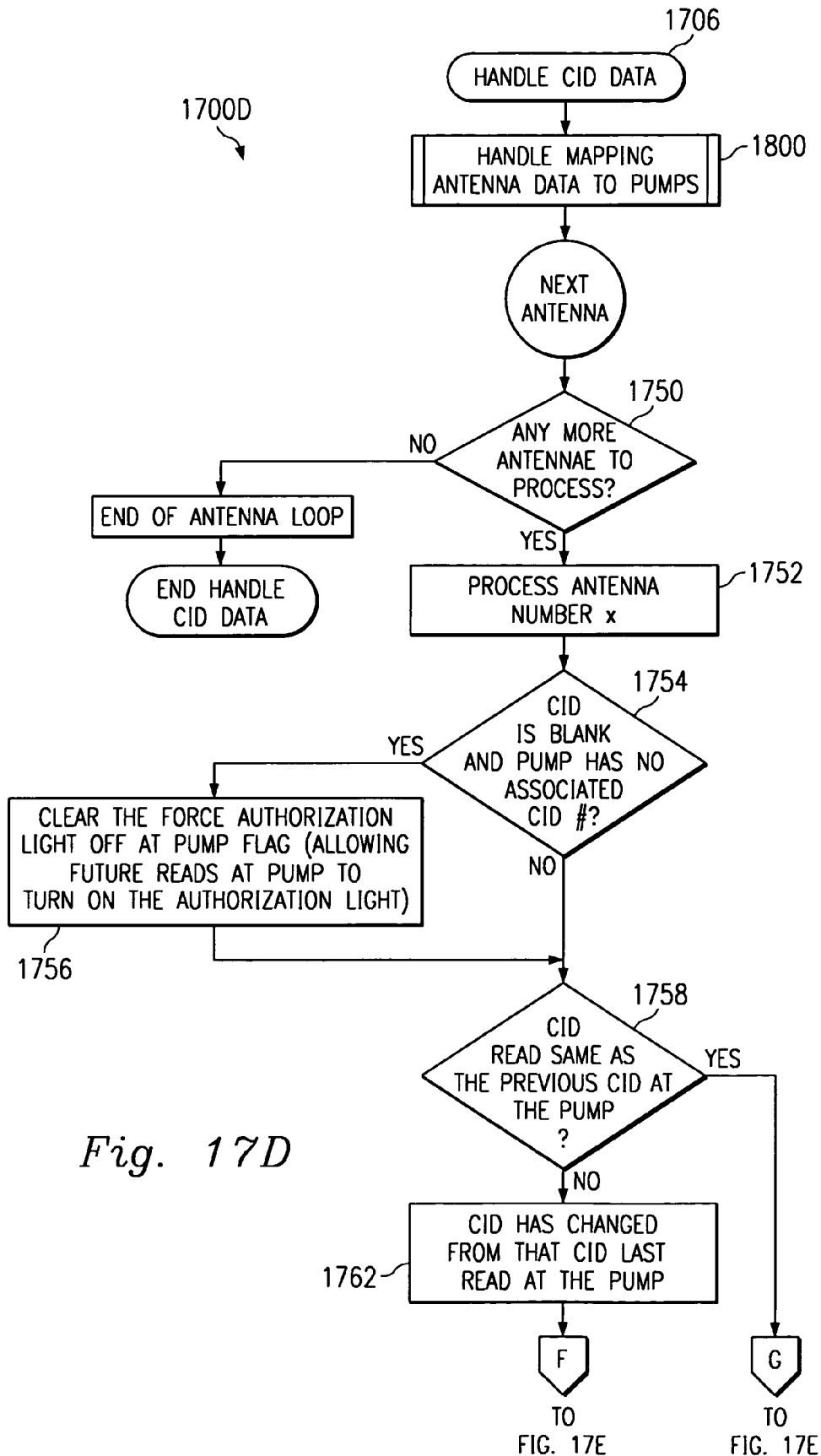
Figure 17F:
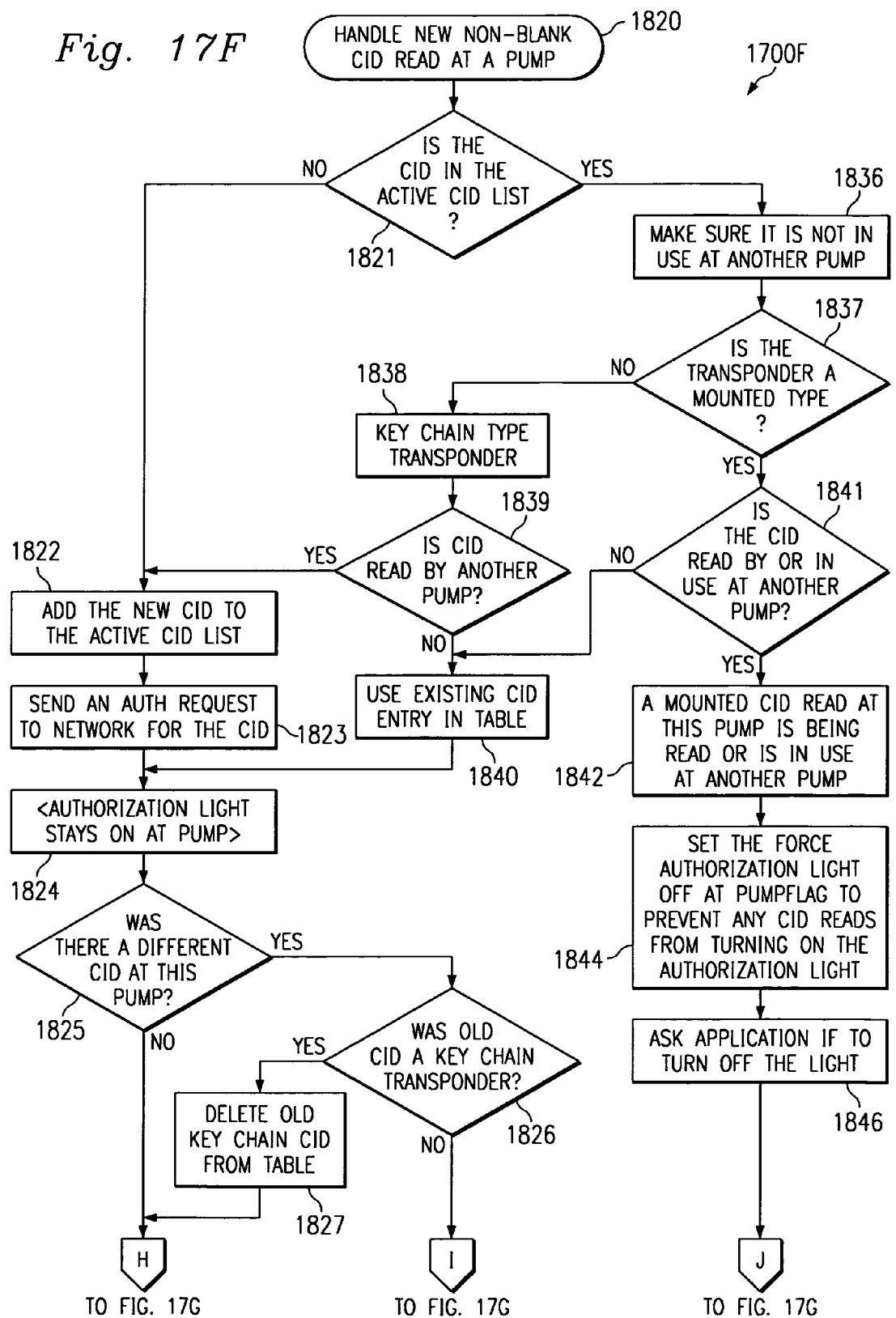
Figure 17G:
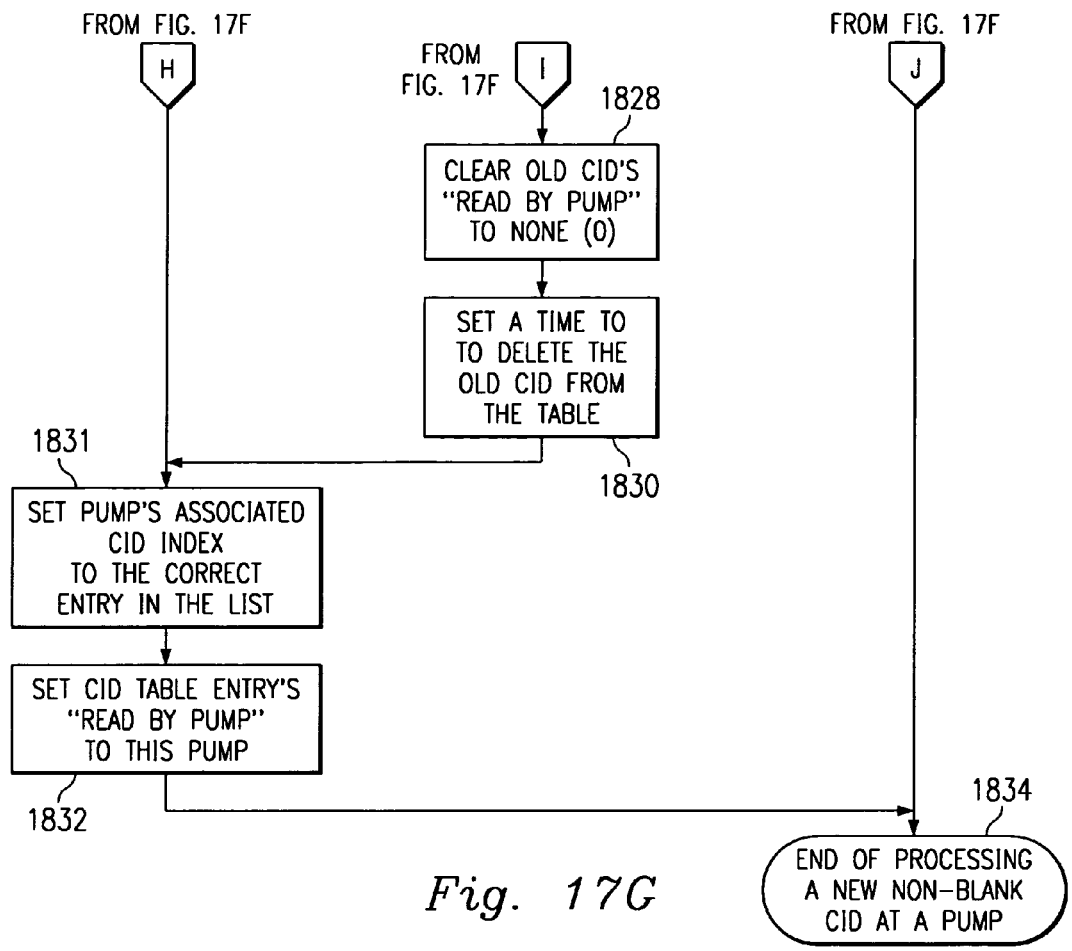
Figure 17H:
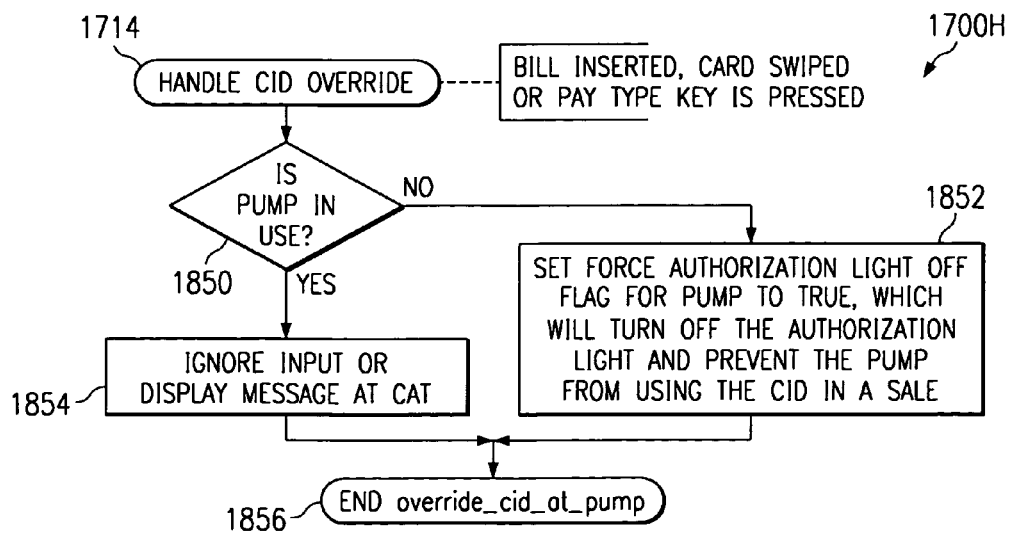
Figure 17I:
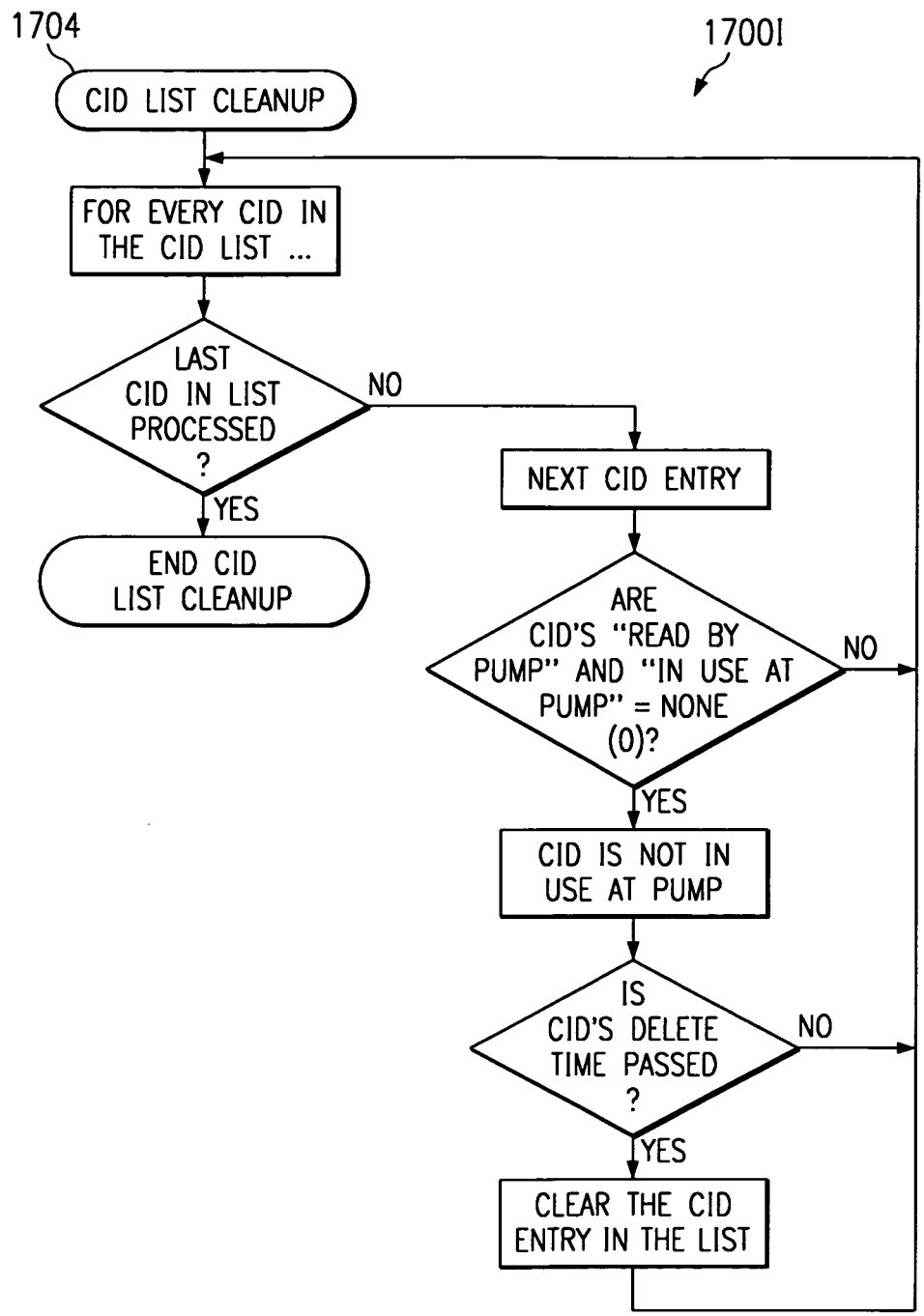
Figure 17J:
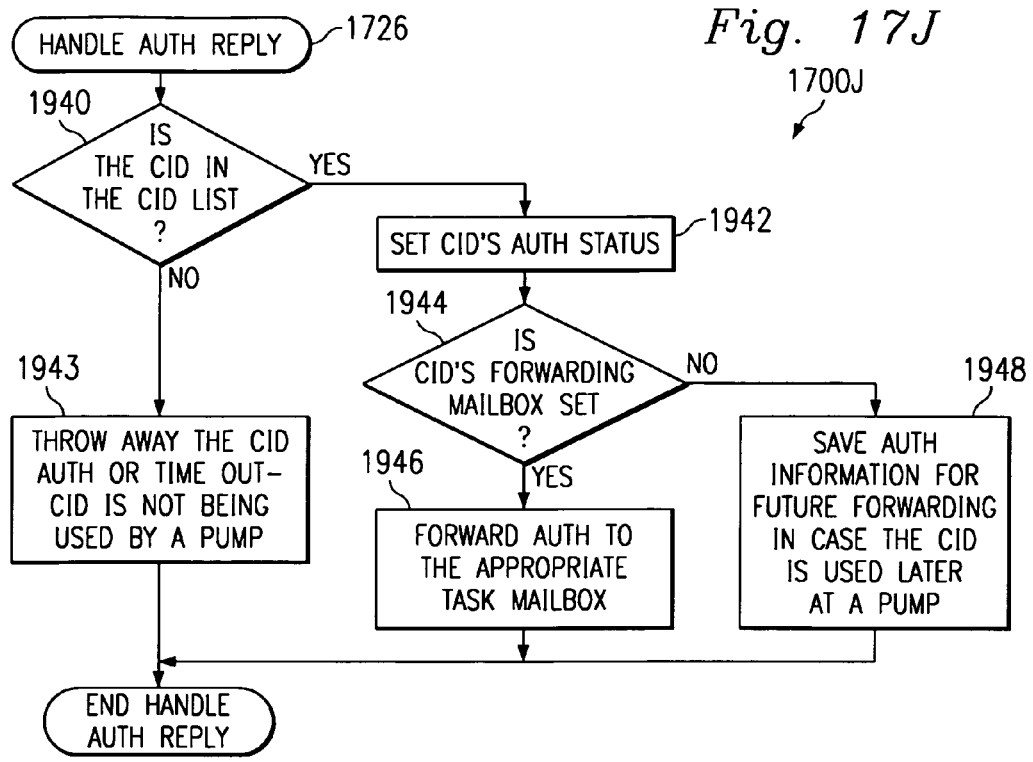
Figure 17L:
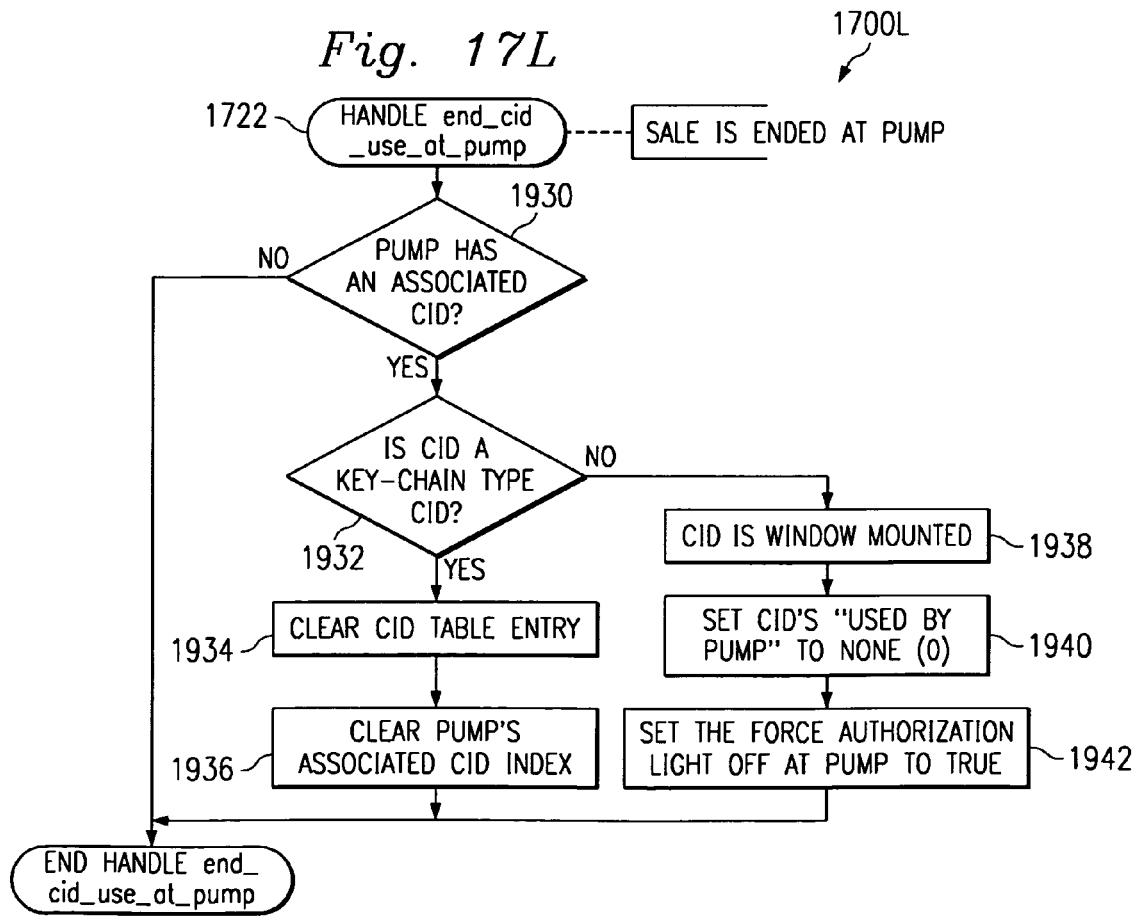
Figure 17K:
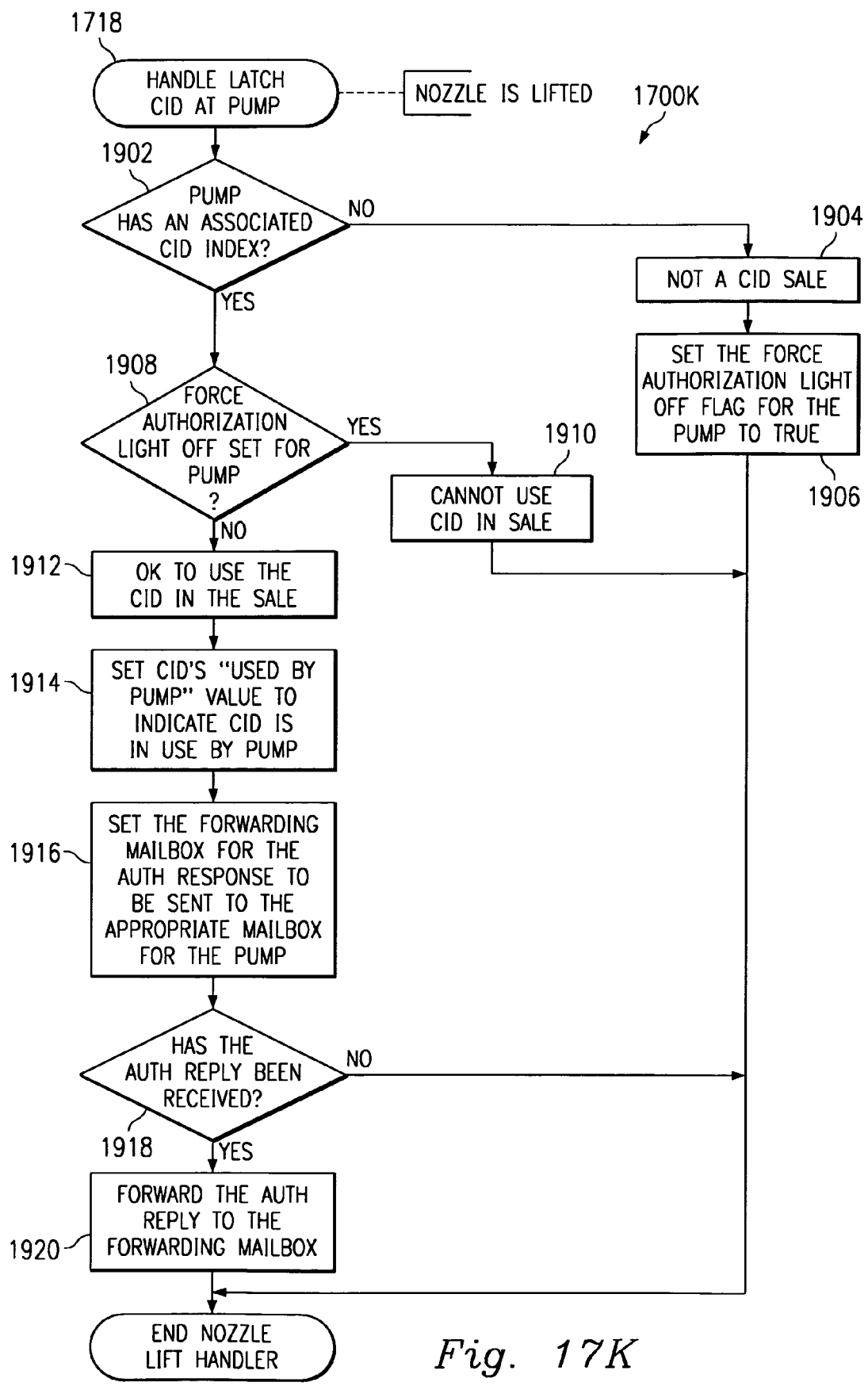
Figure 17M:
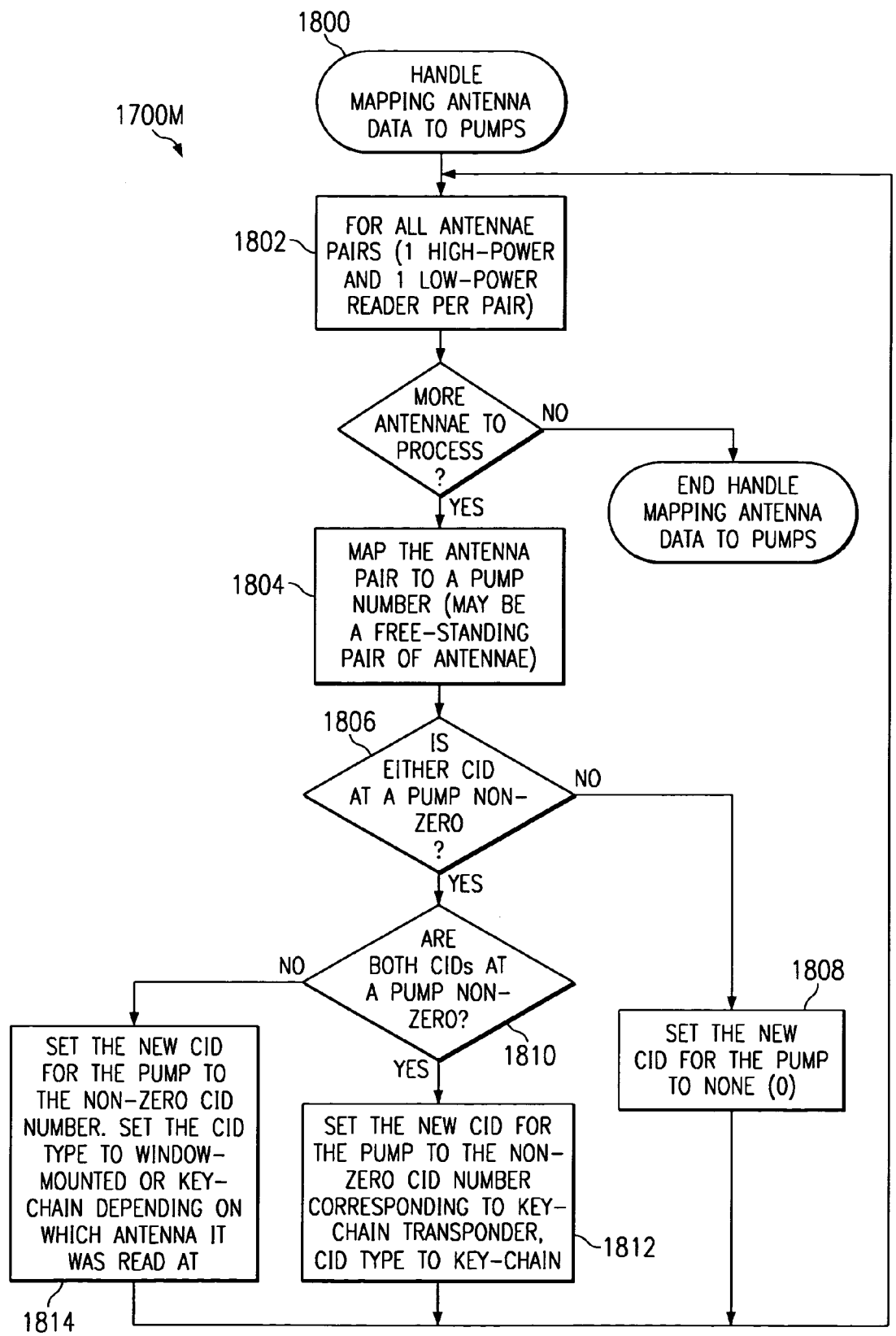
Figure 17O:
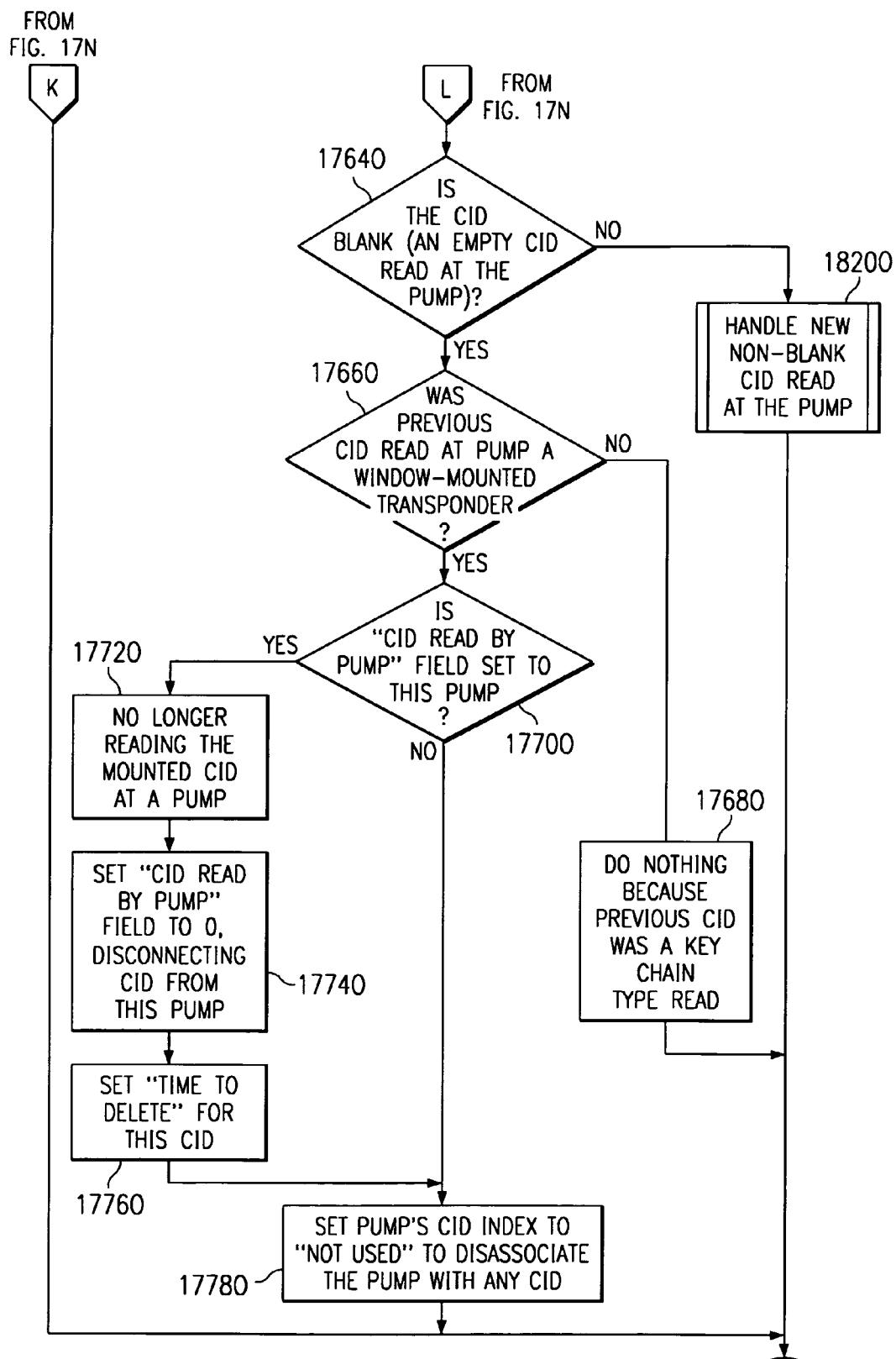

FIGS. 17A-17O are flow charts describing the processes performed by the CID primitive, i.e., the software routine written to manage performance of the customer identification functions.

2.1. Scenario for Vehicle-Mounted Transponder

Figure 11A:
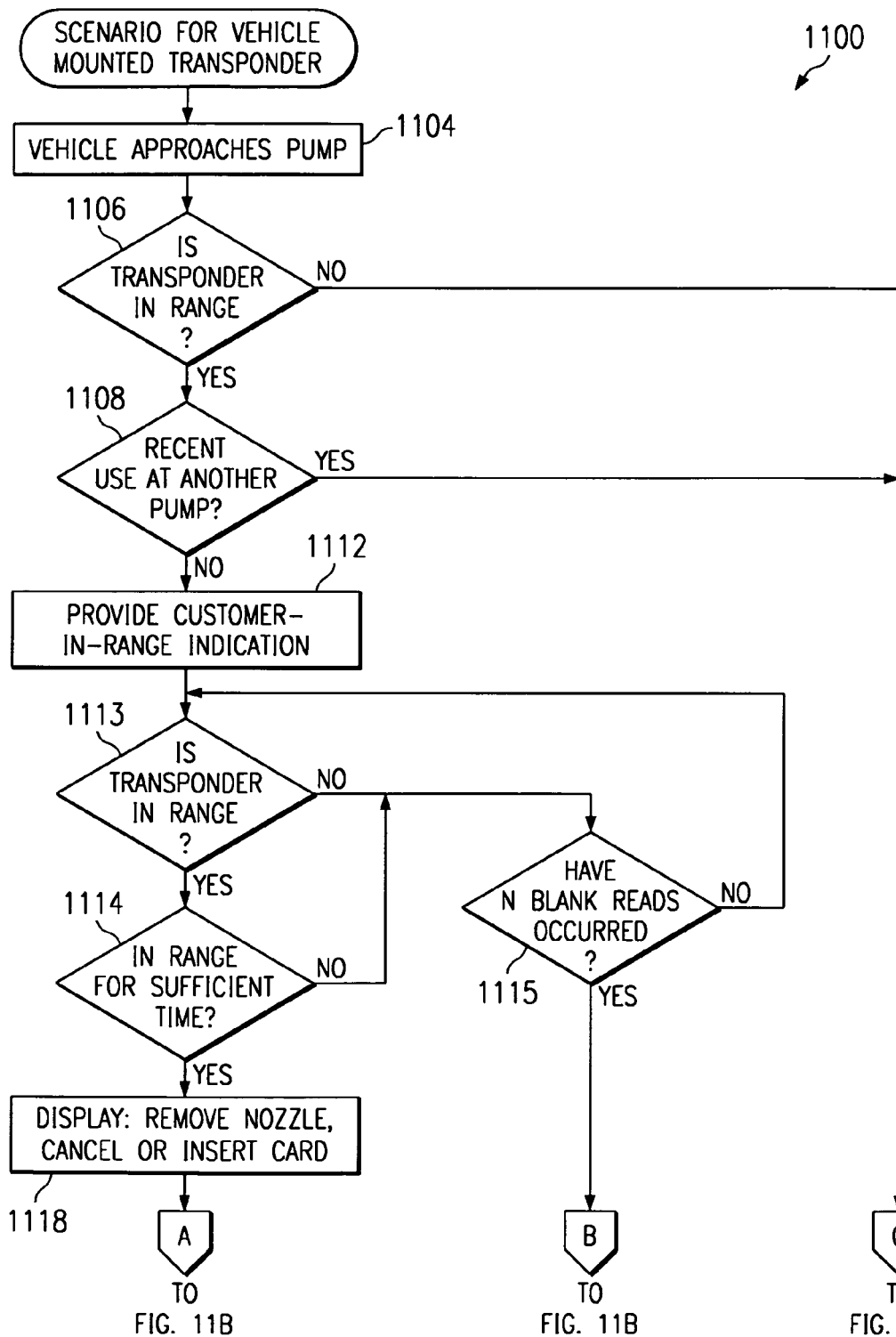
Figure 11B:
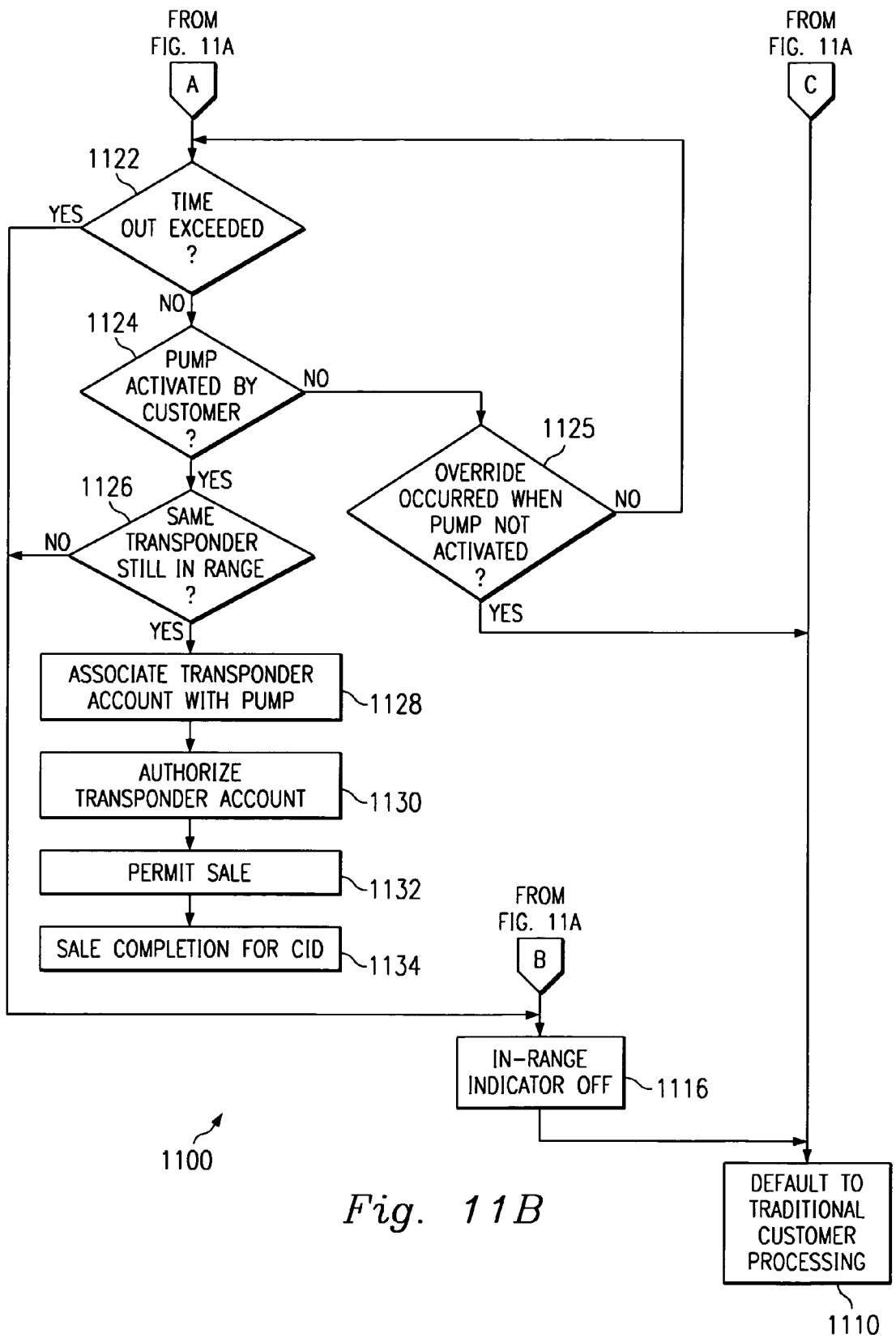

FIGS. 11A and 11B depicts a flow chart 1100 illustrating operation of the system 10 in a scenario that involves a vehicle Mounted transponder 23. In step 1104 a vehicle approaches a pump, i.e., a dispensing area, within the service station environment. In step 1106 a determination is made whether the transponder 23 is in range of the pump. As previously discussed with reference to FIGS. 1 and 8, this determination involves a reader 20 receiving data from a vehicle-mounted transponder 23 after the transponder is first charged by the antenna 22A or 22B. If the approaching vehicle does not have a vehicle-mounted transponder 23, i.e., there is no vehicle-mounted transponder 23 in range, then the system 10 proceeds with traditional customer processing, step 1110, where payment is not made using the CID code. With traditional customer processing, the customer makes payment using a traditional method, such as inserting a credit/debit card into the customer-activated terminal (CAT) or paying the station attendant directly. With traditional customer processing, the CAT may display payment instructions, such as "insert credit/debit card or pay attendant", followed by fueling instructions, such as "lift nozzle".

If a vehicle-mounted transponder 23 is in range, then in step 1108, the CID system 10 determines whether or not the detected CID has been used recently (for, example, in the last five to ten (5-10) minutes) to complete a sale at another dispenser at the service station. If yes, then the system 10 defaults to traditional customer processing, as indicated in step 1110, and the corresponding authorization light will not be activated (see step 1112, below). The customer will be required to select another form of payment, and the transaction will be processed without using the CID code. This helps avoid fraud and prevents the uneasy feeling a customer might otherwise have driving away from a pump after completing a sale only to see each successive pump he or she drives by "light up" as if being activated. The customer is given ample time after fueling to leave the service area without activating authorization lights at any of the other pumps. As an option, the foregoing default to traditional customer processing can be eliminated when it is not objectionable to see other pumps "light up" after completing a sale on a different pump.

In step 1108 if the transponder 23 was not recently used to complete a sale, then in step 1112 a "customer in range" indication is provided at the pump. In one embodiment, when the transponder 23 is in range of the pump dispensing area, the authorization light 45A, 45B turns on to provide the indication. The light 45A, 45B may be at any suitable location on or near the dispenser 14. While in one embodiment the in-range indicator is the light 45A, 45B, it will be appreciated that the indication can alternatively be provided by an audible sound (e.g., music, tone or voice), a mechanical movement, a video or multimedia presentation, or any combination thereof or other activity that can be sensed by the customer.

After the in-range indicator light 45A, 45B comes on, the system next determines whether the vehicle-mounted transponder 23 may have moved out of read range as would happen it the vehicle was merely passing a fuel dispenser. In step 1113, the system checks to see if the vehicle-mounted transponder 23 is still in read range. If yes, then in step 1114 (discussed in more detail further below), the system tests to see if the transponder 23 has been in range a sufficient predetermined length of time. If, however, the vehicle-mounted transponder 23 is no longer in range, then in step 1115 the system tests to see if a predetermined number (N) of blank reads, i.e., reads where no transponders are detected, has occurred. If yes, this is an indication that the vehicle may have driven on, and the in-range indicator is accordingly turned off in step 1116. The system 10 returns to a default condition in step 1110. It is understood that if the customer then approaches, and the transponder comes within range of, another pump, then the light 45A, 45B for that pump will turn on. It is still further understood that the in-range indication provided in step 1112 does not mean that the customer's identification (i.e., account number) has yet been associated with the pump for purposes of completing a sale. This avoids the potential for fraud or accidental customer charges when a transponder merely enters the range of the pump. If in step 1115 the predetermined number of blank reads does not occur, this is an indication that the vehicle may still be within range of the pump, and the system returns to step 1113 again to check for transponder reads.

As mentioned above, in step 1114 a determination is made whether the transponder 23 is in range of the pump for a sufficient length of time. If not, the system determines in step 1115 if a predetermined number of blank reads has occurred. Should the transponder remain out of range, the in-range indicator will be turned off in step 1116, and the system will default to traditional customer processing in step 1110. If the vehicle-mounted transponder 23 is in range for a sufficient time (e.g., about 4 seconds, for example) then in step 1118 the pump's customer activated terminal allows the sale to proceed by displaying to the customer an indication that the pump handle may be removed for immediate fueling, or alternatively that another form of payment (e.g., "insert card"), or cancellation of the pending sale (e.g., "cancel") may be made. The purpose of the step 1114 time delay before the sale can proceed is to give the customer sufficient time to get out of the vehicle to operate the pump, thereby avoiding fraudulent or accidental activation of the pump by someone other than the customer.

In step 1122 a determination is made whether a time limit has been exceeded. If too much time has passed since the vehicle came in range without the customer proceeding with the sale. i.e., without the customer lifting the nozzle or commencing fueling, then the in-range indicator goes off (step 1116) and the system defaults to traditional customer processing (step 1110). The step 1122 time limit may be several seconds to a minute or two, for example. The purpose of the step 1122 time limit is to avoid fraudulent or accidental use of the customer's identification should the customer leave the vehicle (e.g., to go in to the service facility) or otherwise be inattentive to performing a sale completion. As an option, the time limit step 1122 may be omitted.

If in step 1122 the time limit is not exceeded, then in step 1124 a determination is made whether the customer has activated the pump. In step 1124 the customer may activate the pump by lifting the pump nozzle from the dispenser 14, or by a combination of lifting the pump nozzle and commencing fueling. In a dispenser 14 that is not equipped with a nozzle-lift detector, the pump may be activated by other techniques, such as, by lifting a pump lever, sliding an element, or perhaps by pressing a grade select button to start the pump. For purposes of the present disclosure, any of the foregoing techniques, or any combination thereof, or any other techniques utilized to start the pump, are considered a pump "activation."

If, in step 1124, it is determined that the pump 14 has not been activated, then the system tests in step 1125 for an override of the use of the CID code. An override may occur when the customer cancels the transaction or selects another form of payment, e.g., a credit card. If an override does not occur, the process returns to step 1122 whereby the system again determines whether the time out period has been exceeded. If an override does occur, the system proceeds with traditional customer processing, with the type of processing being dependent upon the type of override selected. The details of the test for an override when the pump has not yet been activated are discussed further below with reference to FIG. 11C. Alternatively, the test for an override can be made before the time out step 1122; however, since the signal processing is so quick, the time out in step 1122 will not likely to have been exceeded when the system first performs step 1122. Consequently, any subsequent tests for a time out being exceeded in step 1122 will be preceded by the test for an override (step 1125).

If, in step 1124, it is determined that the pump 14 has been activated, then, in step 1126, a determination is made whether the transponder 23, previously determined to be within range of the pump, is still within range. In order to mitigate the effect of any spurious signals that may be picked up by the antennas and to verify that the same CID code is being detected both before and after pump activation, the CID system 10 preferably compares a sampling of readings made before pump activation with a sampling of readings made after pump activation. The CID system verifies that the readings before and after pump activation are the same or nearly the same. For example, the CID system may take five readings before activation and five readings after activation. If all, two or three of the five readings made prior to activation match all, two or three of the five readings made after activation, then the CID code is verified. More readings could be made if desired. For example, ten readings made prior to activation could be compared with ten readings made after activation. An acceptable comparison may be if five of the readings made before the lift match five of the readings made after the lift.

The purpose of the foregoing determination made in step 1126 is to make sure that the customer's vehicle is the one being fueled. This avoids the potential for a pump to be activated fraudulently or by accident by someone standing near the pump when the vehicle drives by, during the brief instant when the transponder 23 is in range of the pump. It will be appreciated that in some embodiments step 1126 is optional when step 1114 has already been used to determine whether the transponder is in range for a sufficient length of time. It is contemplated that both steps 1126 and 1114 may be performed, or that if one is performed the other might not be needed. Both steps in a sense are optional, depending upon the level of customer security desired for the system 10.

If in step 1126 the same transponder 23 is not still in range, then in step 1116 the in-range indicator goes off and in step 1110 the pump defaults to traditional customer processing. If still in range, then in step 1128 the transponder 23 data (e.g., the customer account information) is associated with the pump so that a sale (e.g., fueling or other purchase) will be permitted. Pump/transponder 23 association in step 1128 only occurs once the pump is activated in step 1124. In step 1130 authorization of the transponder data (e.g., customer account information) is performed. For example, the host computer 16 in combination with a network is used to determine whether the customer account number is valid for purchases. Alternatively, the host computer 16 may instead review data stored in a local negative file of bad accounts and authorize the customer account so long as it does not match a bad account number. The authorization process of step 1130 can be performed prior to, or as part of, the step 1128 of associating the transponder 23 with the pump. In some embodiments the association process is all that is needed, and no additional authorization process is required. The authorization might consist only of recognizing that the customer identification is a valid identification or of the correct number of characters. However, in most applications of the system 10, some form of database credit authorization will be desired.

Figure 11C:
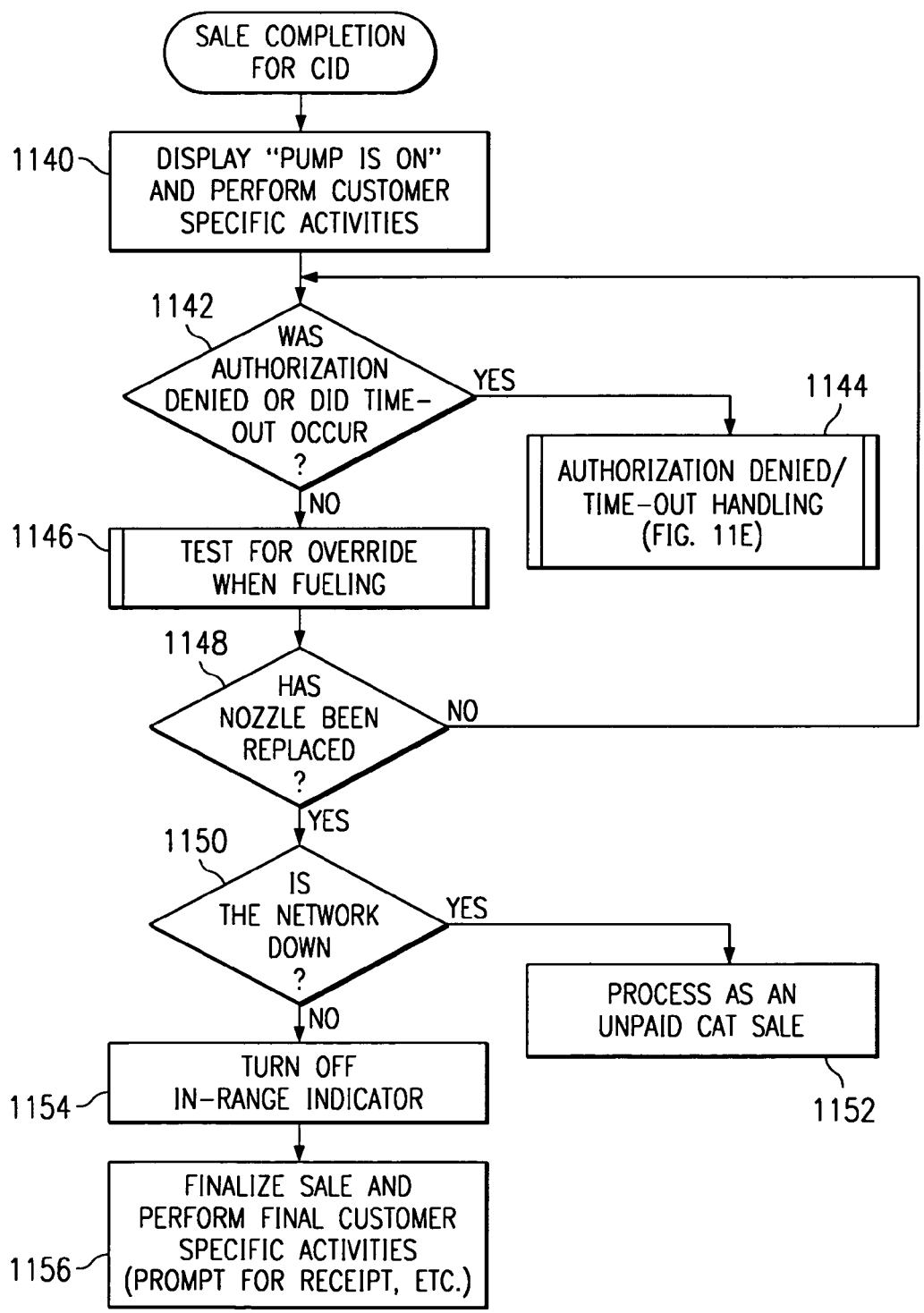

In other embodiments, the authorization step 1130 can be performed as soon as the transponder 23 is within range of any pump or other reader (perhaps even at the entrance to the service station environment). However, a sale will not be permitted (step 1132) unless and until the pump is activated in step 1124. The authorization step 1128 may also include a "time-out" determination (not to be confused with the time out discussed with reference to step 1122). A "time-out" occurs when the CID code has been sent to the host computer 16 or network for authorization, but no confirmation or denial has been received after a predetermined amount of time. FIG. 11E, described in more detail further below, illustrates how a denial of authorization or a "time-out" may be handled when occurring before or after fueling or before or after the nozzle has been lifted.

In step 1132 a sale is permitted whereupon, for example, the customer can dispense fuel and perhaps order goods (e.g., food) or services (e.g., a car wash) at the pump, all of which is charged to the customer account identified by the transponder 23 data.

In step 1134, the sale is completed using the customer's CID data. FIG. 11C illustrates in more detail the steps taken to complete a CID transaction. With reference to FIG. 11C, while the customer is fueling, the customer-activated-terminal indicates that the "Pump is on" (step 1140), and the system 10 performs certain customer specific activities. For example, the system may offer (by displaying a message on the CAT) the customer a car wash if the customer has purchased fuel a certain number of times. Or, the system may remind the customer it is time for a car wash where the customer desires a car wash at certain times. Other customer specific activities may include offering desired food or beverages to be charged against the customer's account. The customer specific information may come from a database that is up-dated regularly and which is in or accessible by the host computer 16. Or, the information may be included in the data broadcast from the customer's transponder 23, 25. If the transponder is a read/write (R/W) transponder, then the host computer can periodically update the information on the transponder based on the customer's preferences.

In step 1142 the system determines whether the customer is authorized to use the CID code for payment or whether a time-out has occurred. Step 1142 may be included if the "authorization" step 1130 (FIG. 11B) is omitted before the "permit sale" step 1132 (FIG. 11B). It can be appreciated that the "authorization" step can be included either before or after the "permit sale" step 1132 (FIG. 11B) or both. If in step 1144 (FIG. 11C) authorization is denied or a time-out occurs, it is handled as illustrated in FIG. 11E.

During fueling, the system again tests for an override in step 1146. FIG. 11F, which is discussed further below, illustrates in more detail the test for an override during fueling. If an override has not occurred then in step 1148, the system determines whether or not the nozzle has been replaced in its seat. If the nozzle has not been replaced in its seat, the system continues to determine whether authorization has been denied or a time-out has occurred (if step 1142 is included) and whether an override has occurred.

Once the nozzle has been replaced indicating that fueling has been completed, the CID system determines in step 1150 whether the network is down, i.e. whether the host computer 16 can access the network. FIG. 11G illustrates in more detail the scenario for determining if the network is down. It should be understood that the network can be checked at a number of different times during the customer transaction. For example, the network can be checked before and after fueling has begun. With reference to FIG. 11C, if the network is down, the transaction is processed as an unpaid CAT sale (step 1152) and the sales information may be stored in the host's computer's memory for forwarding to the network at a later time when the network is operational. If the network is not down, the authorization light or other in-range indicator is turned off in step 1154. The sale is finalized and any final customer specific activities such as displaying a prompt for receipt are performed in step 1156.

2.2 Scenario for Hand-Held Transponder

Figure 12:
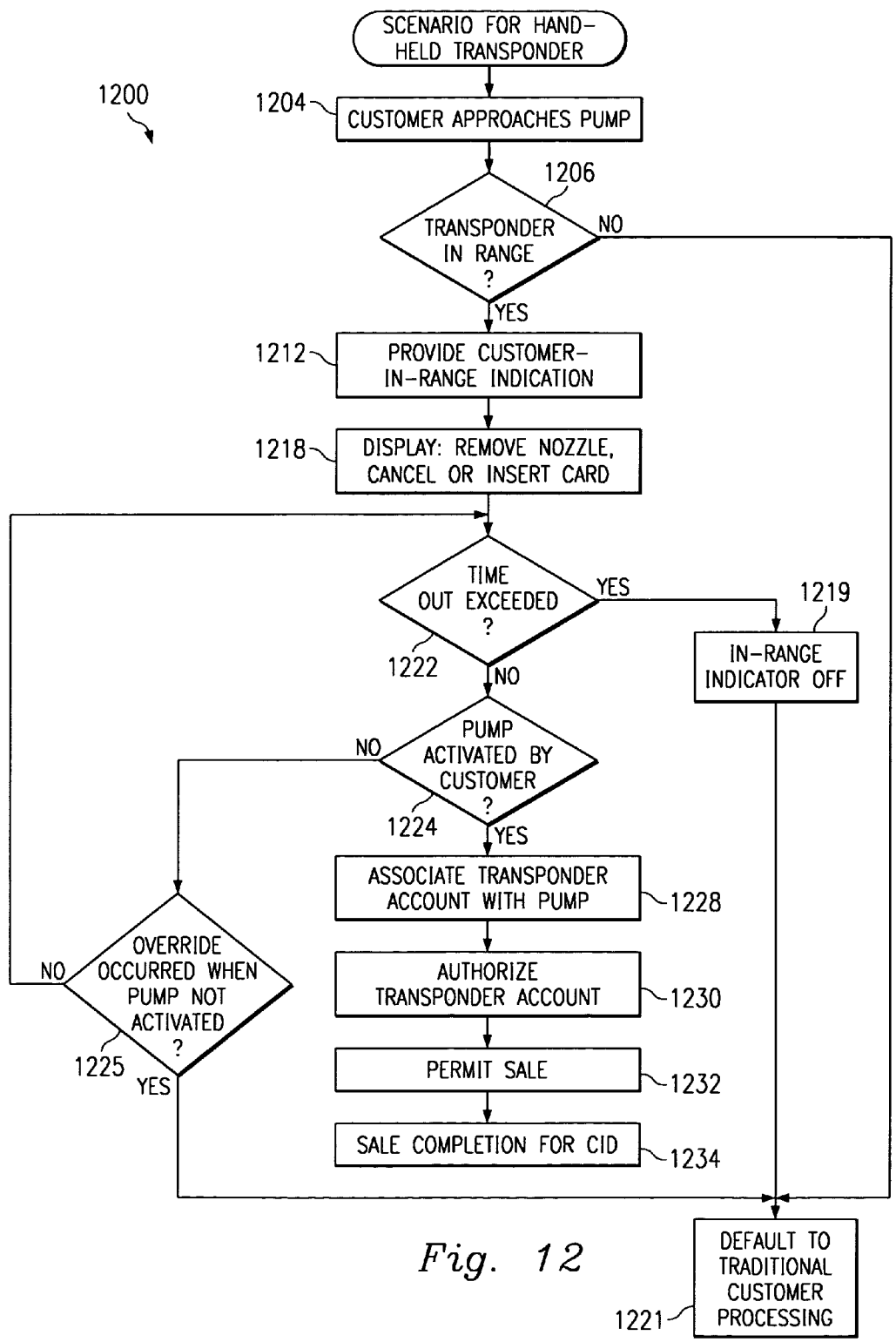

FIG. 12 depicts a flow chart 1200 illustrating operation of the system 10 in a scenario that involves a hand-held transponder 25. The transponder 25 may be used even in situations where a customer with a vehicle mounted transponder 23 approaches the pump, whereupon the transponder 25 may be used to override or cancel a possible transaction involving the transponder 23. This might occur, for example, when the customer wishes to charge the sale at the pump to an account different than the account associated with the vehicle mounted transponder 23.

Referring now to FIG. 12, in step 1204 a customer approaches a pump, i.e., a dispensing area, within the service station environment. In step 1206 a determination is made whether the hand-held transponder 25 is in range of the pump. As previously discussed with reference to FIGS. 1 and 8, this determination involves a reader 20 receiving data from a transponder 25 after the transponder is first charged by the antenna 24A or 24B. To be in range, typically the customer must place the transponder 25 up next to the dispenser 14 or in some other designated location up close to the antenna 24A or 24B.

If the approaching customer does not present a hand-held transponder 25, then the system defaults to traditional customer processing in step 1221. It should be understood that if a vehicle-mounted transponder is detected, then the process as described with reference to FIGS. 11A and 11B occurs. In step 1206 if the hand-held transponder 25 is in range, then in step 1212 a "customer in range" indication is provided at the pump. In one embodiment, when the transponder 25 is in range of the pump dispensing area, the authorization light 45A, 45B turns on to provide the indication. The light 45A, 45B may be at any suitable location on or near the dispenser 14. In one embodiment, it is in the location of the antenna 24A or 24B, where the customer presents the transponder 25. Separate in-range indicators may be provided for the hand-held transponders and the vehicle-mounted transponders if desired. Once the indication is activated, if the indication is in the form of a light, for example, upon moving the transponder 25 away from the light the light remains illuminated until a time out occurs, as explained below.

Once an in-range indication occurs at a pump responsive to the customer presenting the transponder 25 in range, if the customer then approaches another pump so that the transponder is in range, the indication for that other pump will also be provided, and subsequent activation and sale is allowed, as explained below, at both pumps. In one embodiment, when two indications and activations occur concurrently that involve the same hand-held transponder 25, an indication is provided to the service attendant to alert the attendant of the fact, so that if a fraudulent or unintentional use of more than one pump by the customer transponder 25 is occurring, it can be terminated.

While in one embodiment the in-range indicator is the light 45A, 45B, it will be appreciated that the indication can alternatively be provided by an audible sound (e.g., music, tone or voice), a mechanical movement, a video or multimedia presentation, or any combination thereof or other activity that can be sensed by the customer.

In step 1218 the pump's customer activated terminal allows the sale to proceed by displaying to the customer an indication that the pump handle may be removed for immediate fueling, or alternatively that another form of payment (e.g., "insert card") or cancellation of the imminent sale (e.g., "cancel") may be made. In step 1222, a determination is made whether a time limit has been exceeded. If too much time has passed since the transponder 25 came in range without the customer proceeding with the sale, then the in-range indicator goes off (step 1219) and the system defaults to traditional customer processing (step 1221). The step 1222 time limit may be several seconds to a minute or two, for example. The purpose of the step 1222 time limit is to avoid fraudulent or accidental use of the customer's identification should the customer leave the dispenser area (e.g., to go in to the service facility) or otherwise be inattentive to performing a sale completion. As an option, the time limit step 1222 may be omitted.

If, in step 1222, the time limit is not exceeded, then in step 1224 a determination is made whether the customer has activated the pump. In step 1224, the customer may activate the pump by lifting the pump nozzle from the dispenser 14, or by a combination of lifting the pump nozzle and commencing fueling. In a dispenser 14 that is not equipped with a nozzle-lift detector, the activation occurs, for example, by lifting a pump lever, sliding an element, or perhaps by pressing a grade select button to start the pump. For purposes of the present disclosure, any of the foregoing techniques, or any combination thereof, or other techniques utilized to start the pump, are considered a pump "activation."

If the pump 14 has not yet been activated, the system tests in step 1225 for an override of the use of the CID code. An override may occur when the customer cancels the transaction or selects another form of payment, e.g., a credit card. If an override does not occur, the process returns to step 1222 whereby the system again determines whether the time out period has been exceeded. If an override does occur, the system proceeds with traditional customer processing, step 1221, with the type of processing being dependent upon the type of override selected. The details of the test for an override when the pump has not yet been activated are discussed further below with reference to FIG. 11C.

Once the pump is activated in step 1224, then in step 1228 the transponder 25 data (e.g., the customer account information) is associated with the pump so that a sale (e.g., fueling or other purchase) will be permitted. Pump/transponder 25 association in step 1228 only occurs once the pump is activated in step 1124.

In step 1230 authorization of the transponder data (e.g., customer account information) and a test for a time-out are performed. FIG. 11E illustrates how a denial of authorization or a "time-out" may be handled. In step 1232 a sale is permitted and in step 1234 the sale is completed using the customer's CID data. FIG. 11C illustrates in more detail the steps taken to complete a CID transaction. The foregoing steps 1230-1234 are performed, respectively, substantially the same way as are steps 1130-1134, described previously. Note that if a customer overrides a CID transaction and selects a different method of payment, the indication Light 45A or 45B will turn off.

2.3 Test for Override when Pump not Activated

Figure 11D:
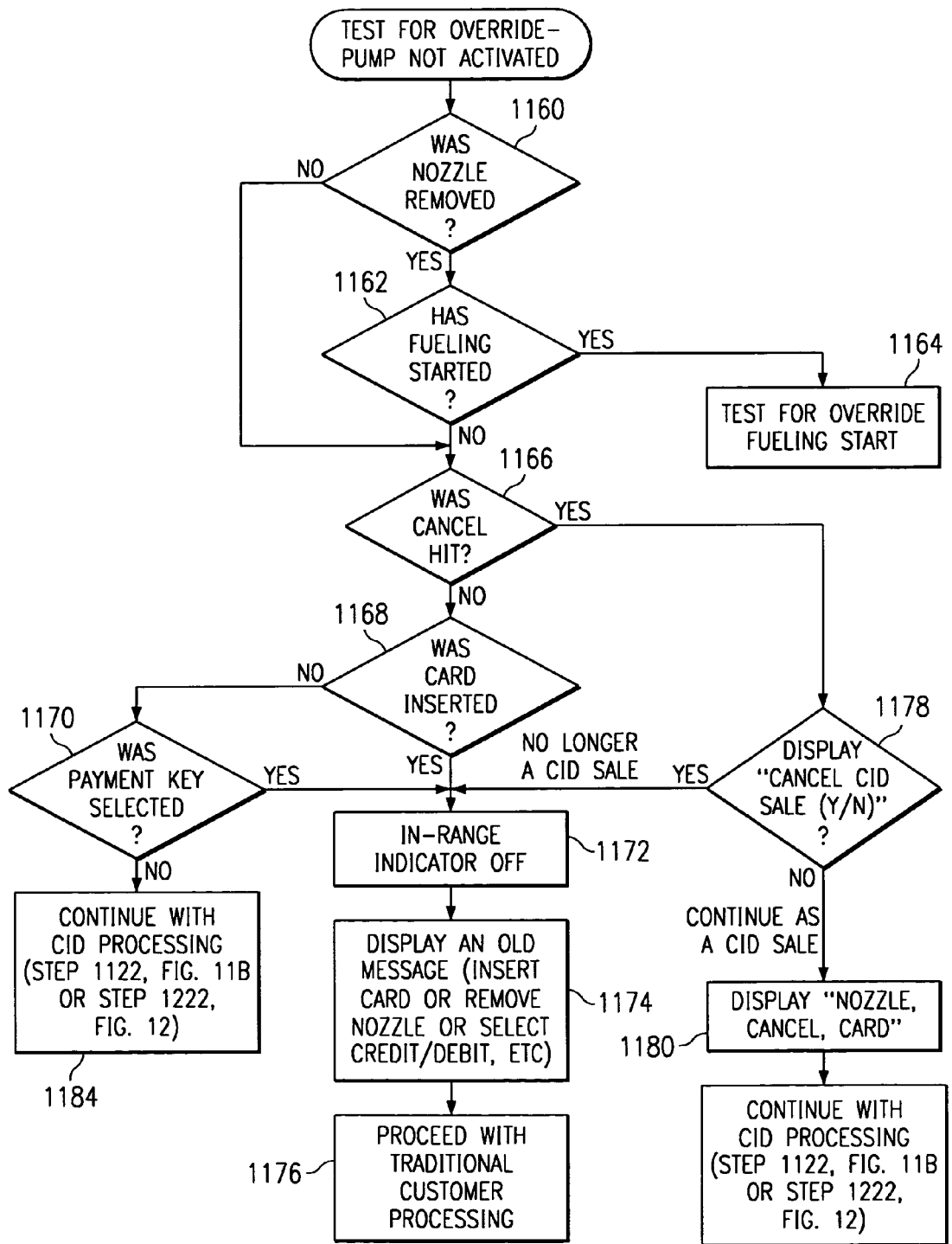
Figure 11E:
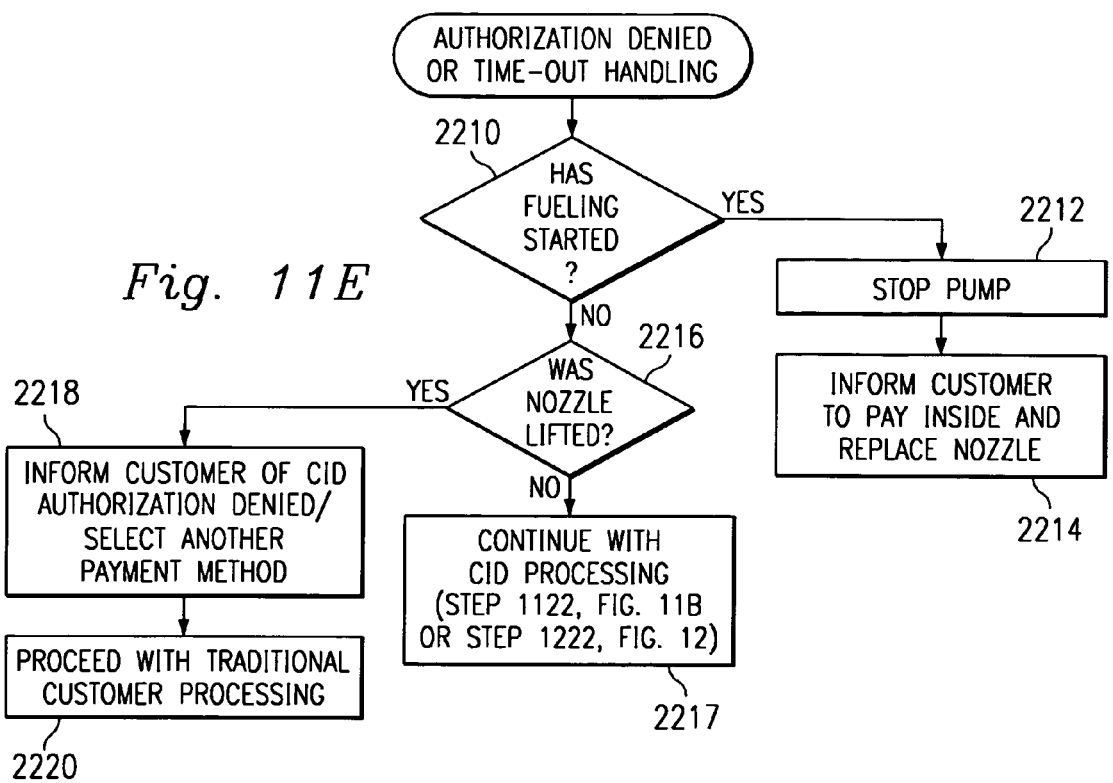
Figure 11G:
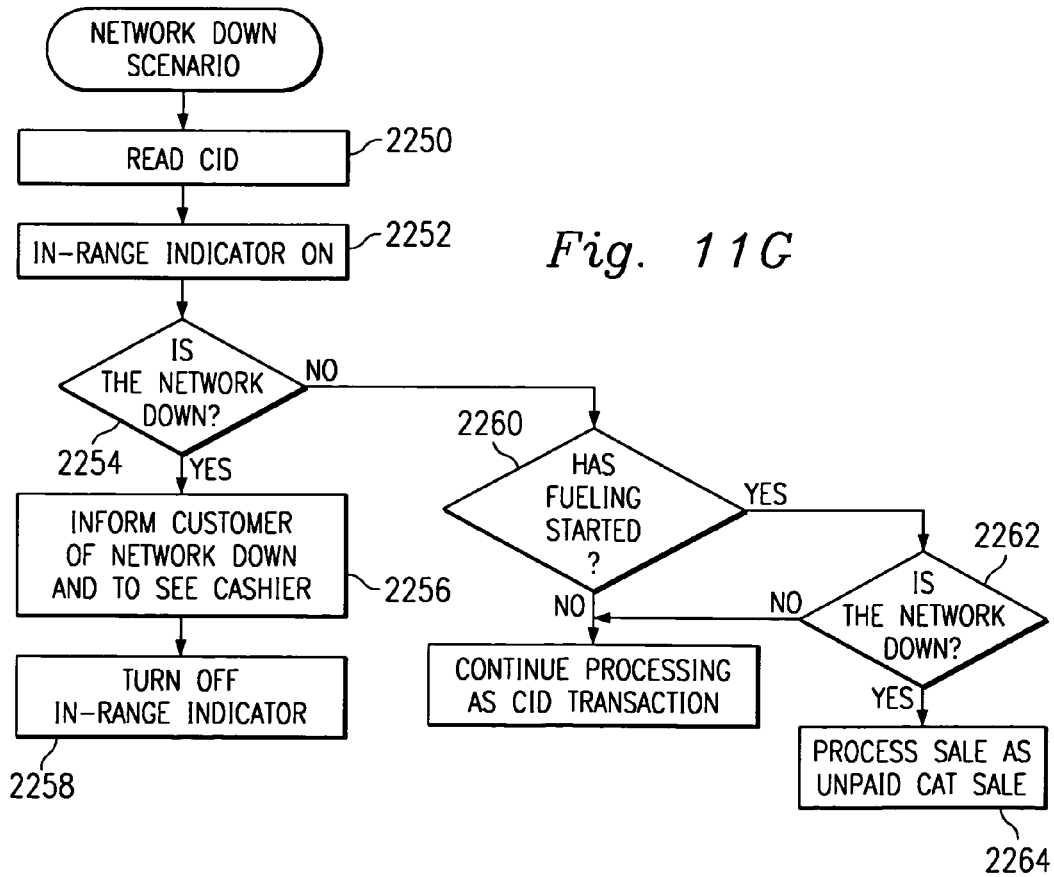
Figure 11F:
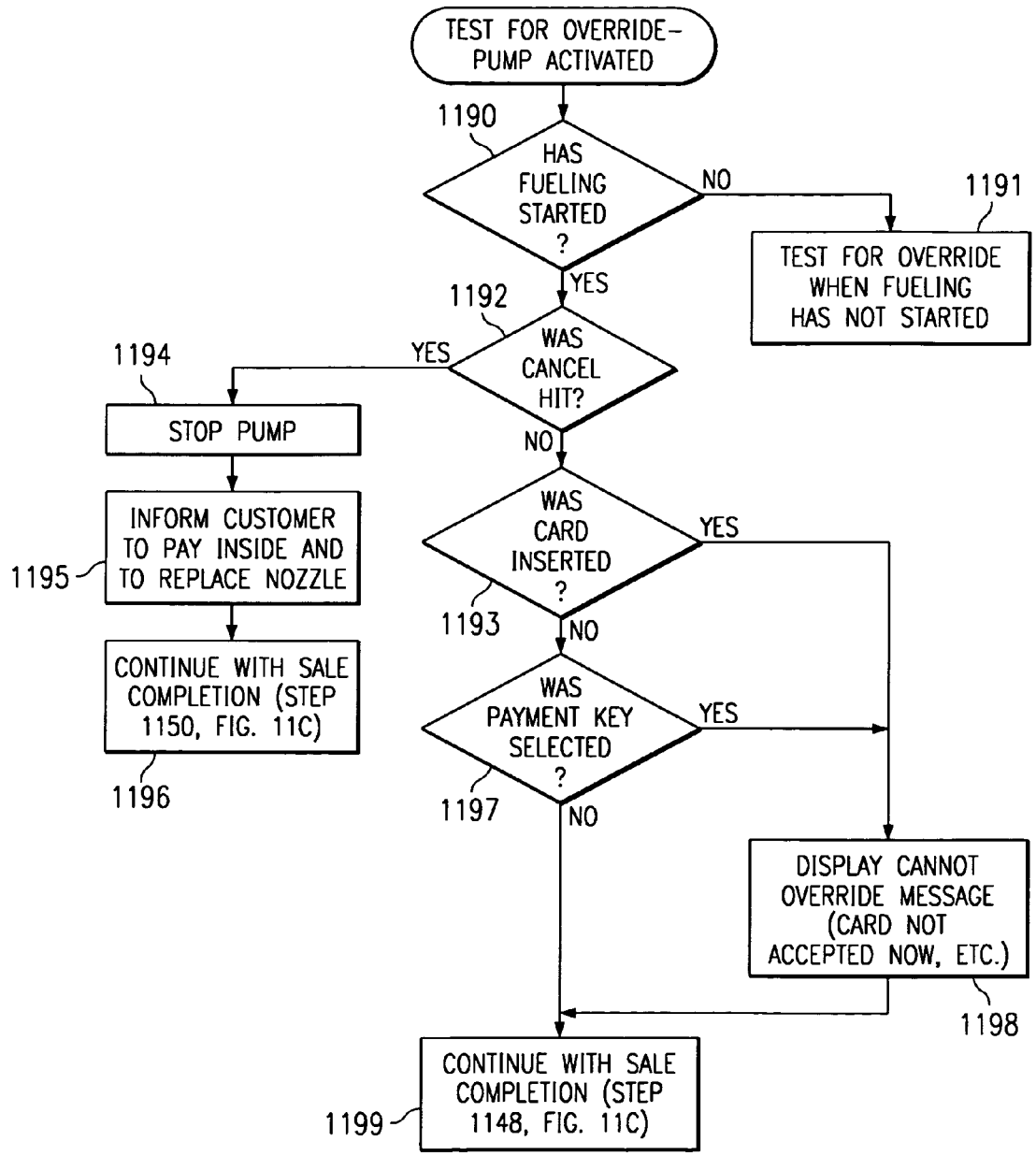

FIG. 11D, describes the process that occurs when the CID system tests 10 for an override of the system when the pump has not yet been activated. The process applies whether the transponder detected is a vehicle-mounted transponder 23 or a hand-held transponder 25. As discussed above, such an override may happen when the customer chooses a different method of payment other than the use of the CID code or the customer decides to cancel the transaction.

Initially, the CID system verifies that fueling has not started by determining whether the dispenser nozzle has been removed from its seat and whether actual fueling has started (steps 1160 and 1162). If the nozzle has been removed and fueling has started, then the system tests for an override when the fueling has started, in step 1164. FIG. 11F describes the process for testing for an override when the fueling has started.

If the nozzle has not been removed and/or fueling has not started, then the CID system determines whether the customer has: (1) canceled the transaction by hitting the "CANCEL" button on the customer-activated-terminal (CAT) (step 1166), (2) inserted a credit/debit card into the CAT as payment (step 1168), or (3) selected a different method of payment (such as cash) (1170). If yes, the in-range indicator is turned off (step 1172), the display on the CAT is changed to read "Insert card or remove nozzle" or some similar message (step 1174), and the transaction is processed using traditional customer processing methods, i.e., without using the CID code (step 1176).

Note, if the customer hits the "Cancel" button, he or she is given the opportunity to undo the cancel. After the "Cancel" button is selected, the display will read "Y/N" (step 1178). If the customer selects "N" for no, the CAT will display a message such as "Nozzle, Cancel, Card" (step 1180), and the transaction continues to be processed as a CID transaction (step 1182). Similarly, if neither a card in inserted (step 1168) or another payment key is selected (step 1170), then the transaction continues to be processed as a CID transaction (step 1184). In steps 1182 and 1184, if the transponder is a vehicle-mounted transponder 23, the process continues with the time out step 1122 of FIG. 11C. If the transponder is a hand-held transponder 25, then the process continues with the time-out step 1222 of FIG. 12.

2.4 Test for Override when Pump Activated

FIG. 11F describes the process that occurs when the CID system tests for an override of the system that has been attempted after fueling has started. The CID system verifies that fueling has started (step 1190). If fueling has not started, then the system in step 1191 tests for an override when fueling has not started. FIG. 11D, discussed above, describes the process that occurs when testing for an override before fueling begins.

If fueling has started, the CID system determines whether or not the "Cancel" button was hit on the customer-activated-terminal (CAT) (step 1192). If yes, the pump in the dispenser is stopped (step 1194) and the customer is instructed by the display on the CAT to replace the nozzle and pay the attendant inside the service station building (step 1195). The system then continues to complete the sale (step 1196) by testing the network (step 1150 of FIG. 11C). If the "Cancel" button was not hit in step 1192, the CID system determines whether or not a credit/debit card was inserted into the CAT (Step 1193) or if a different payment key on the CAT was selected (step 1197). If yes, the display on the CAT is changed to read that an override of the system cannot be accomplished—for example, saying that a credit/debit card cannot be accepted (step 1198). The process then continues processing the sale to completion in step 1199 by determining whether the nozzle has been replaced (step 1148, FIG. 11C). If a credit/debit card has not been inserted and a different payment has not been selected, the message of step 1198 is not displayed, but the system continues to process the sale to completion in step 1199.

2.5 Authorization Denied or Time-Out Handling

FIG. 11E describes the process that occurs when customer authorization has been denied or there is a system time-out due to the failure of the network to provide customer authorization confirmation or denial for the use of the CID code. If fueling has already started (step 2210), then the CID system 10 stops the fuel pump (step 2212) and informs the customer to replace the nozzle and pay the attendant inside the service station building (step 2214). If the fueling has not started (step 2210), then the CID system 10 determines whether the nozzle has been lifted (step 2216).

If the nozzle has not yet been lifted then, then the CID process continues (step 2217) with the time out step 1122, FIG. 11B, if a vehicle-mounted transponder is involved or with the time out step 1222, FIG. 11C, if a hand-held transponder is involved. Another opportunity to authorize the CID use (for example if there had been a system time-out) is provided again in step 1130, FIG. 11A, and step 1230, FIG. 12. If the nozzle has been lifted, the customer is informed through the CAT display that the CID authorization has been denied and is requested to select another method of payment (step 2218). The transaction then proceeds with traditional customer processing, i.e., without using the CID code for payment (step 2220).

2.6 Authorization Light (In-Range Indicator) Operation

Figure 11I:
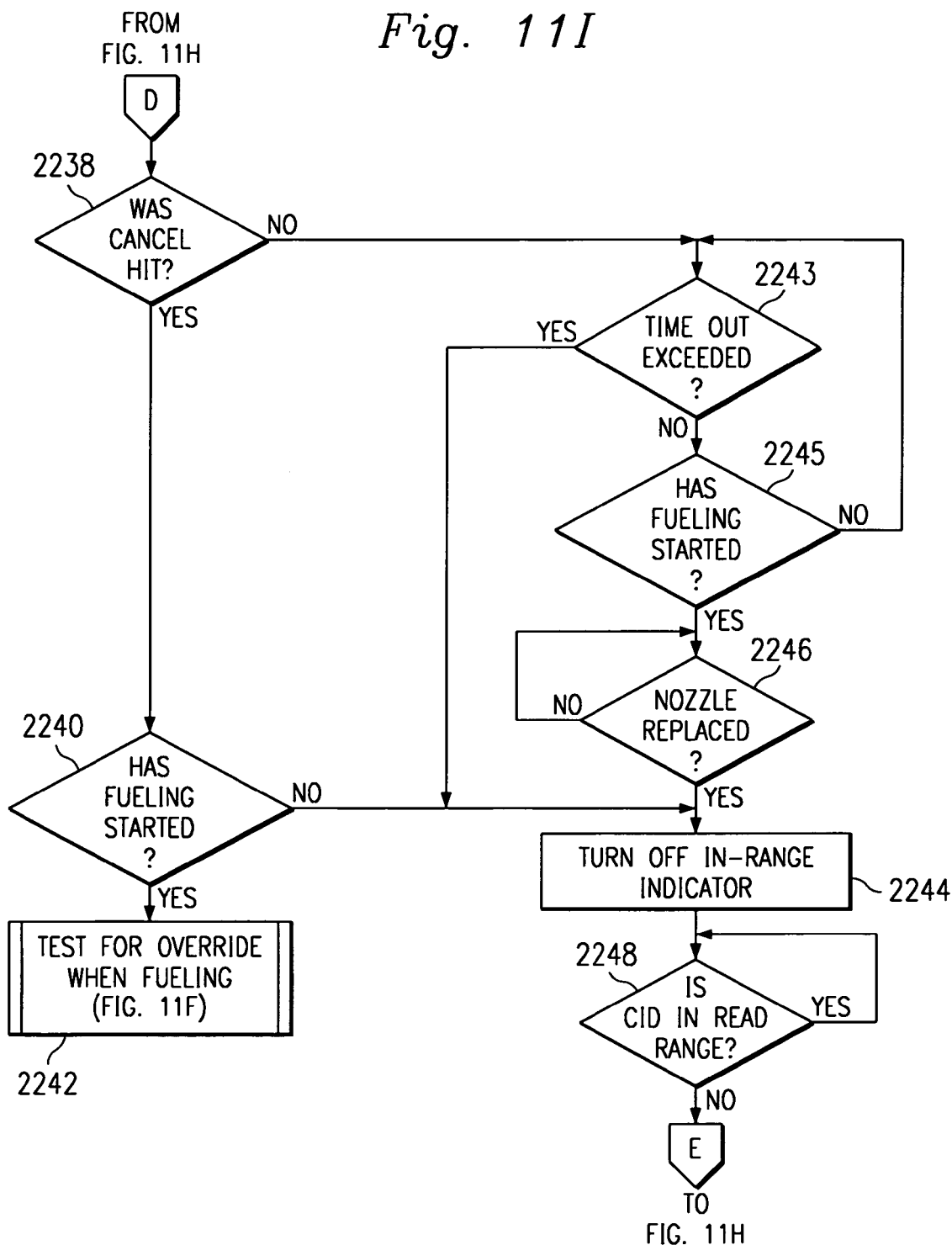

FIGS. 11H and 11I illustrate the general operation of the authorization tights 45A, 45B (or other in-range indicator) of the dispenser 14. Not every trigger for turning the in-range indicators on or off is included in FIGS. 11H and 11I. It should be understood that other figures and discussions herein may describe additional or modified scenarios for activating or deactivating the in-range indicators. With reference to FIGS. 11H and 11I, the CID system 10 continually takes readings to determine if a CID transponder 23, 25 is present or in read range in step 2230. If a vehicle-mounted transponder 23 is in range, the CID system 10 in step 2232 determines whether the detected CID code has been used recently at another pump at the service station. Step 2232 is similar to step 1108 of FIG. 11A. If yes, the transaction is processed as though no CID is present and the sale is processed using traditional customer methods in step 2234. As discussed previously with reference to FIGS. 11A and 11B, during step 2232, the CID system 10 is checking to see if a transaction using the vehicle-mounted CID code has been completed recently at another pump, i.e., completed in the last five to ten (5-10) minutes. If a transaction has been completed using the vehicle-mounted CID code in the last five to ten (5-10) minutes, then the CID system will not turn on the in-range indicator and the dispenser will not operate unless another form of payment is selected. As mentioned further, this helps avoid fraud by providing the customer ample time after fueling to leave the service area without activating authorization lights at any other dispensers in the service area. Note, if a hand-held transponder is detected in step 2230, then the system 10 does not check for recent use in step 2232.

If the detected CID code has not been used recently at another pump or the detected CID code originated from a hand-held transponder 25, then the CID system turns the in-range indicator on in step 2236. While the in-range indicator 45A, 45B is on, the CID system 10 determines in steps 2237, 2239, and 2241 whether the transponder is still in read range and whether a time out has exceeded. These steps (2237, 2239, and 2241) are similar to steps 1113, 1114, and 1115, respectively, of FIG. 11A.

In step 2238, the system determines whether the "Cancel" button on the CAT has been hit. If yes, the system then determines in step 2240 whether fueling has started, and if fueling has started, the system tests for an override in step 2242 (see FIG. 11F). If the "Cancel" button has been hit and fueling has not been started, then in step 2244, the in-range indicator is turned off.

If the "Cancel" button has not been activated in step 2238, the CID system 10 determines whether a time out has been exceeded in step 2243 and, if not, determines if fueling has started in step 2245. Steps 2243 and 2245 are similar to steps 1122 and 1124, respectively, of FIG. 11B, and the description for steps 1122 and 1124 accordingly apply for steps 2243 and 2245, respectively. Note, if a time out is exceeded in step 2243, then the in-range indicator is turned off in step 2244. Once fueling has started, the system 10 then continually checks to see if the nozzle has been replaced (step 2246). Once the nozzle has been replaced, the in-range indicator is turned off in step 2244.

After the in-range indicator is turned off, the CID system continues to check to see if the detected CID transponder is still in read range in step 2248. The in-range indicator remains off as long as the transponder is continuously read by the antenna on the dispenser. The in-range indicator 45A, 45B, therefore, is prevented from coming on again as soon as the sale is completed but before the customer has driven away from the dispenser. Once the CID transponder is out of read range, i.e., the antenna gets an "empty" transponder read, the system is essentially reset and the authorization light will come on in response to a subsequent transponder read. However, as discussed above, the dispenser authorization lights will not come on before a period of five to ten (5-10) minutes after the completion of the sale with respect to the current transponder 23.

2.7 Network Down Scenario

FIG. 11G describes the process that occurs if there is a computer network failure. After either a vehicle-mounted 23 or hand-held CID transponder is read (step 2250) and the authorization light is turned on (step 2252), the CID system 10 determines whether the computer network is down (step 2254) and, therefore, whether the customer's CID code can be verified and/or any final sales information can be forwarded from the host computer to the network for processing and. If the network is down, the customer is informed of the network failure and is asked to see the cashier (step 2256), and the authorization light 45A, 45B (in-range indicator) is turned off (step 2258).

If the network is not down, the CID system then determines if fueling has started (step 2260). If fueling has not started and the network is up and running, then the system continues to process the transaction as a CID transaction. Once fueling has started, however, the CID system continually checks to see if the network is down (step 2262). If at anytime during fueling the network fails or goes down, the sale will be processed as an unpaid CAT sale (step 2264) and the sales information is stored for future forwarding to the network. If no network failure occurs during fueling, then the transaction continues to be processed as a CID transaction.

3.0 Software Tasks and Subsystems

The following is a description of the specific tasks carried out by software and subsystems of the CID system in one embodiment. Other arrangements are contemplated.

3.1 Overview of Software Tasks/Subsystems

Figure 13:
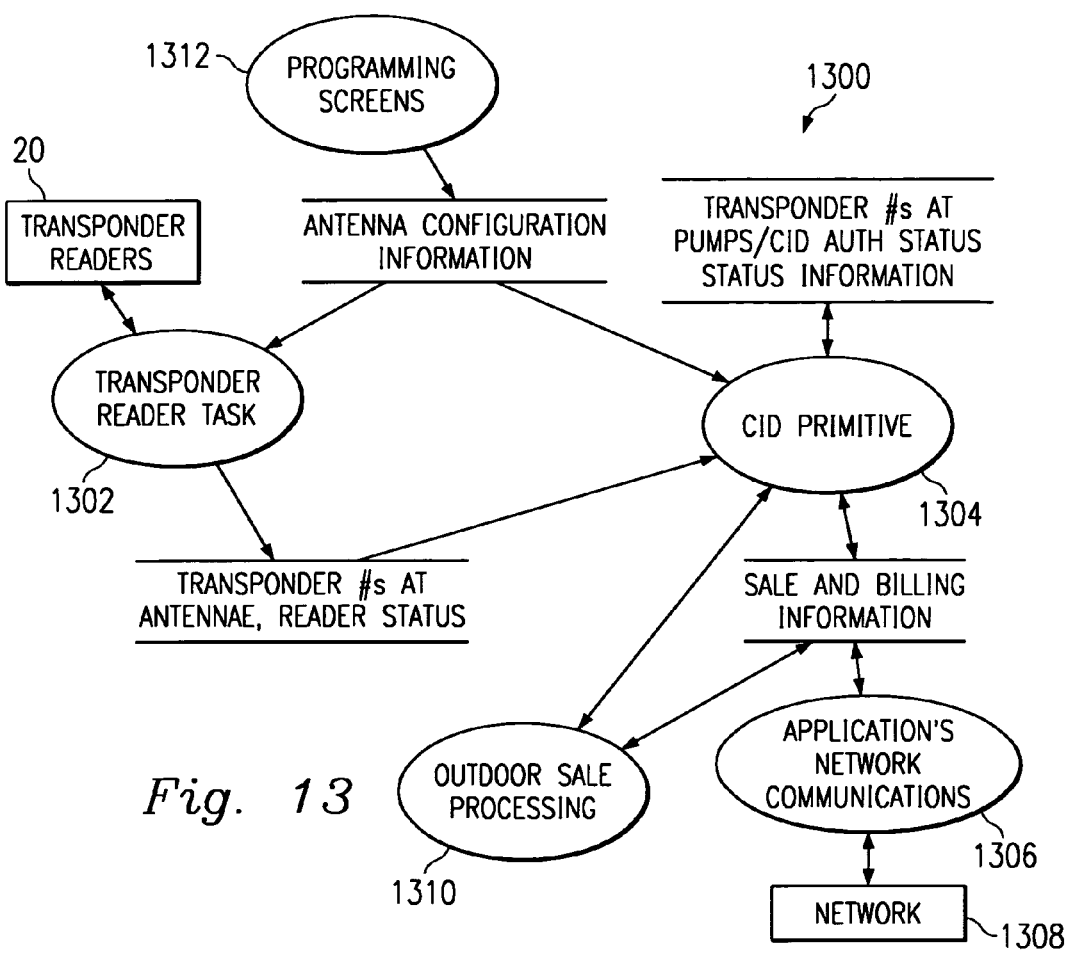
FIG. 13 is a diagram illustrating the major software tasks and subsystems involved in the handling of a customer identification (CID) transaction for the system of FIG. 1.

FIG. 13 is a diagram 1300 illustrating the relationship between the major software tasks and subsystems involved in handling a CID transaction. The software tasks and subsystems needed to process the customer identification (CID) feature generally fall into the following areas:

A. Reading the transponder 23, 25 numbers ("CIDs"). This is performed by a low-level Transponder Reader Task 1302.

B. Handling the CIDs, getting auths (authorizations), turning on authorization lights (or other in-range indicator), etc. This is performed by the CID Primitive software routine 1304.

C. Handling the CID information in a sale by, for example, making changes to the Base and Application customer platform service ("CPS") code; note that the Base and Application CPS code refers to the service station software that controls the fuel pumps and handles non-CID transactions.

D. Handling CID authorization requests, authorization returns and time outs. This is performed by the CID application's Network Communications 1306, which is in communication with the outside network 1308.

E. Processing outdoor sales activities 1310, i.e., customer activities that occur at the dispenser 14, such as a new CID read, the insertion of a credit/debit card into the customer-activated-terminal (CAT), the customer pressing the cancel key of a different Pay Type key, nozzle lift or return, and the end of the sale.

F. Handling command input at programming screens 1312. Through programming screens (discussed in more detail herein below) the service attendant (or other authorized personnel) is given the ability, for example, to turn CID functions on or off for individual dispensers 14 or for the entire service station; turn individual readers on or off; map antennae to particular CATs, and perform CID system diagnostics.

3.2. The Transponder Reader Task

Figure 14:
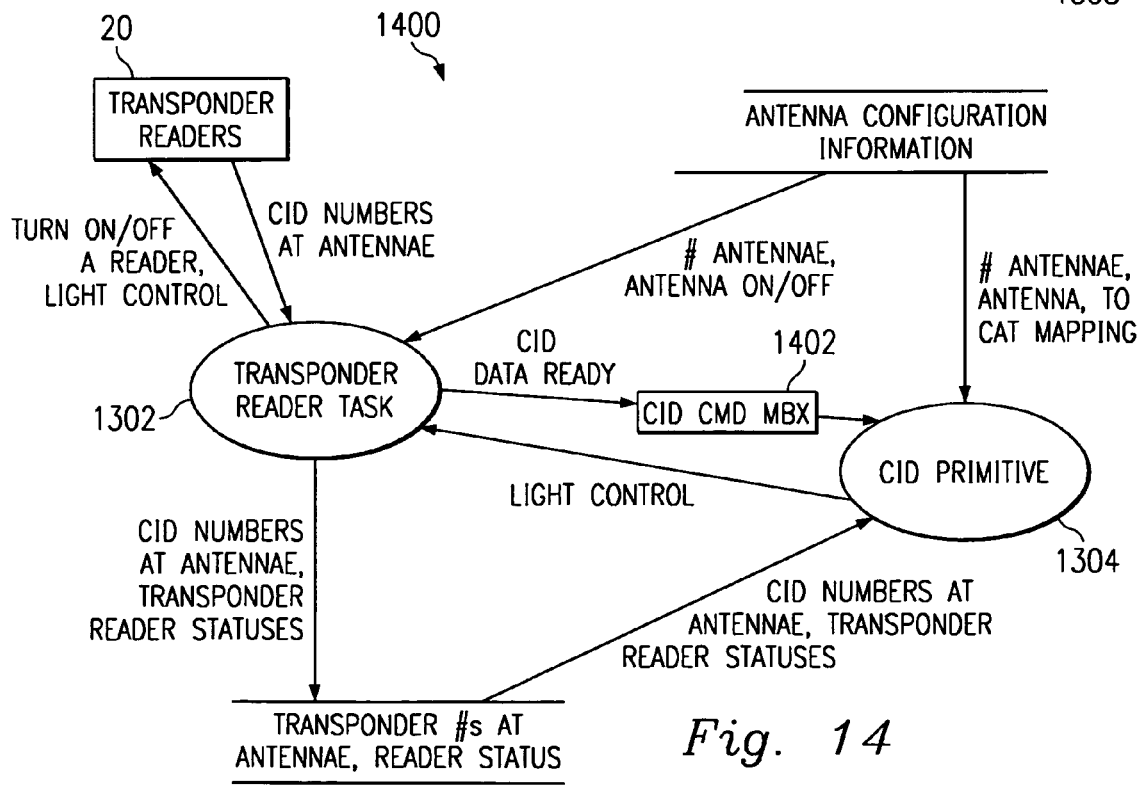
FIG. 14 is a diagram illustrating the Transponder Reader Task's Data Flow for the system of FIG. 1.

FIG. 14 is a diagram 1400 which more particularly illustrates the flow of data and commands between the Transponder Reader Task 1302 and the CID Primitive software routine 1304. The Transponder Reader Task 1302 selectively sends commands signals to the transponder readers 20 in order to turn the readers 20 on or off (i.e., activate) and forwards authorization light control commands from the CID Primitive 1304 to the readers 20 as well. The Transponder Reader Task 1302 furthermore receives the CID numbers read at all the antennas in the service station. In a typical-sized service station there may be eight (8) readers 20 in the system, with each reader handling up to four (4) antennas. Consequently, there may be up to thirty-two (32) antennas in a typical system.

After receiving the CID numbers, the Transponder Reader Task writes the transponder CID number data to a table illustrated by Table 2 below. The table contains CID numbers or values for all the antennas. The antennas are grouped in pairs of a high-power (long-range) antenna and a low-power (short-range) antenna. The first antenna pair provides the first two values in the array of CIDs, one for a high-power antenna and one for a low-power antenna. The CID values may be eight (8) bytes so that there would be two (2) pairs of eight (8) byte values per reader 20. Note that the reader and antenna columns in Table 2 below are exemplary only.

TABLE 2

Transponder Reader Task's Data Structure

| Reader | Antenna | CID Read at Antenna |
|---|---|---|
| 1 | 1 | xxxxxxxx |
| 1 | 2 | yyyyyyyy |
| 1 | 3 | zzzzzzzz |
| 1 | 4 | ... |
| 2 | 5 | ... |
| 2 | 6 | ... |
| 2 | 7 | ... |
| 2 | 8 | ... |
| 3 | 9 | ... |
| etc. | | |

A typical reader, in one embodiment, is able to handle two (2) pairs of antennas (e.g., antennas 22A, 22B, 24A, 24B). This means that each reader 20 provides thirty-two (32) bytes of CID data, or as mentioned above two (2) pairs of eight (8) byte values. When no transponder number is read at an antenna, the value zero (0) is placed in the table as the transponder number for that antenna. When all the transponder values have been read for all antennas, a signal is sent to the CID Primitive 1304 to process the new transponder numbers. This signal is in the form of a command packet sent to the CID Primitive's Command Mailbox 1402. Either the CID numbers or a pointer to the CID numbers may be sent in the command packet.

Authorization light control is decided at a higher software level than the Transponder Reader Task 1302 and is passed to the Transponder Reader Task 1302 as commands to turn on or turn off individual fights.

3.3 The CID Primitive

Figure 15:
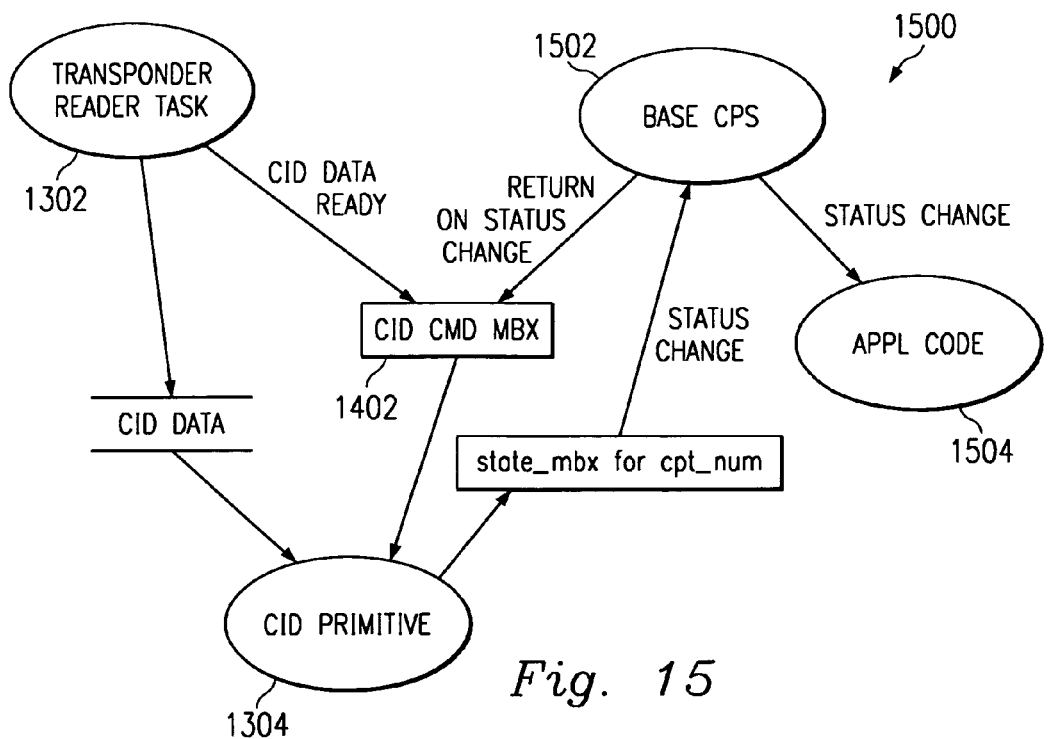
FIG. 15 is a diagram illustrating the Return on Status Change interface for the system of FIG. 1.
Figure 16:
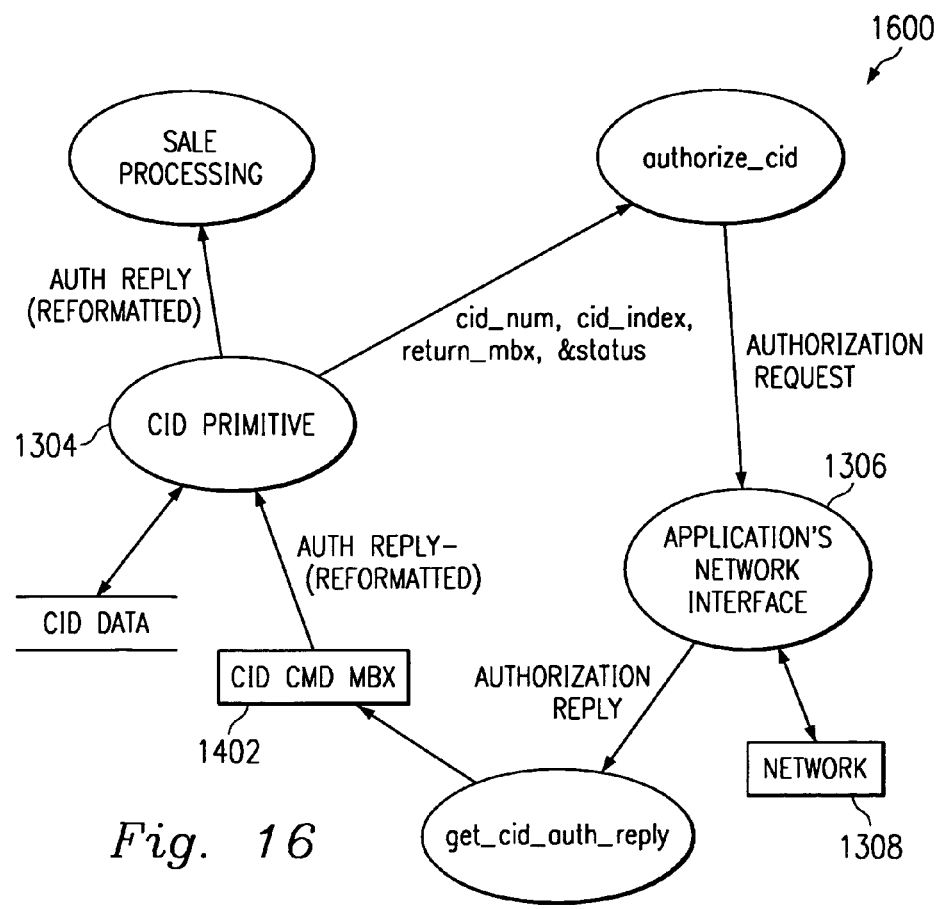
FIG. 16 is a diagram illustrating the Authorization Request and Reply Handling for the system of FIG. 1.

With reference to FIGS. 15 and 16, the CID Primitive 1304 receives commands in its command mailbox 1402. These commands include:

1) Process the ready CID numbers (data) from the Transponder Reader task 1302.

2) Turn on or turn off the transponder light (authorization light).

3) Override CID use at a pump (originated from the Base CPS 1502 or Application code 1504).

4) Latch CID use at a pump (from the Base CPS 1502 at nozzle lift).

5) Handle CID Auths (authorization replies) returned from the network 1308 through the Application's Network Interface (or Communications) 1306.

6) End CID use in a sale (from the Base CPS 1502 or Application code 1504 at the end of a sale).

7) Return CID use status for a pump (from the Base CPS or Application code)

8) Return CID revision information (from Base CPS report generation code)

The CID Primitive 1304 will receive a command to process a new batch of CID numbers read at the pumps or dispensers 14 from the Transponder Reader Task 1302. During processing, the CID Primitive 1304 maps the antennae data to specific pumps 14 for use in determining CID use at the pumps. Each antenna pair provides two (2) CID values (one per antenna). As discussed in more detail below, the CID Primitive 1304 utilizes the non-zero CID if one is read at either antenna of a pair. This non-zero CID value is used for the pump that is mapped to the antenna pair (if any). The CID Primitive 1304 is able to determine whether the CID value came from a vehicle-mounted transponder 23 or a key ring/chain transponder 25 by which antenna read the transponder. For example, if the transponder was read by a low-level antenna 24A, 24B, the transponder is considered to be a key ring/chain transponder 25. If the CID was read by a high-level antenna 22A, 22B, it is considered to be a vehicle-mounted transponder 23.

If both antennas of a CID pair are non-zero, i.e. where the high-level antenna 22A, 22B of a pump 14 reads a vehicle-mounted transponder 23, and the low-level antenna 24A, 24B of the same pump 14 reads a key ring/chain type transponder 25, the low-level read takes precedence and is used by the CID Primitive 1304. In this way, the key ring/chain type transponder 25 is able to override a vehicle-mounted transponder 23 at pump 14, and the transaction is charged against the key ring/chain transponder 25 account. This override measure is discussed further below with reference to FIG. 17M.

The CID Primitive 1304 maintains two lists of data structure. One list, as shown by Table 3 below, provides the status of the pump 14 and includes the following information for each pump: (a) the type of transponder that was detected by the pump—either the vehicle-mounted (window) 23 or key chain/credit card 25 type; (b) an index to the CID list (the second data list (Table 4) maintained by the CID Primitive 1304); (c) whether there has been an override of CID use at the pump and the authorization light has been forced off; (d) whether there has been a return on status change; and (e) the previous status.

TABLE 3

Pump List Data Structure

| Pump No. | Transp. Type (Window or Key) | Index into CID list | Override CID/ Force Off Light | Ret. on Status Change Mask | Previous Status |
|---|---|---|---|---|---|
| 1 | | | | | |
| 2 | | | | | |
| 3 | | | | | |
| ... | | | | | |
| n | | | | | |

The second list maintained by the CID Primitive is another structure for CID numbers that are being processed by the system as shown in Table 4 below. This list includes the following information for each CID number: (a) the type of transponder the CID number came from—either the vehicle-mounted (window) 23 or key chain/credit card 25 type; (b) which pump 14 read the CID number; (c) which pump 14 is using the CID number; (d) the status of the CID authorization; (e) billing information; (f) delete time; and (f) a forwarding mailbox. Different functions change or query the two data structures (Table 3 and Table 4) in different ways.

TABLE 4

CID List Data Structure

| CID # | Type: Win/Key | Read by Pump # | In Use at Pump # | Auth Status | Billing Info | Delete Time | Forwarding Mailbox |
| --- | --- | --- | --- | --- | --- | --- | --- |

FIGS. 17A-17O are flowcharts describing the CID Primitive and the various commands it handles. FIG. 17A describes the overall command processes of the CID Primitive. The CID Primitive continually checks for commands in its CID Command Mailbox (CID Cmd Mbx) 1402 (step 1702). If there is no command, the CID Primitive proceeds with a CID list Cleanup (step 1704; see flowchart 1700I of FIG. 17I) where the CID List Data Structure (Table 4) is cleared of CID numbers no longer read by a pump or in use at a pump after the CID's delete time has passed. After completing the CID list cleanup, the CID Primitive again checks its CID Command Mailbox 1402 for commands (step 1702 of FIG. 17A).

In flowchart 1700A, if there is a command in the mailbox 1402, the CID Primitive determines if the mailbox contains CID data from the Transponder Reader Task 1302, (step 1705). If yes, the CID Primitive processes the CID data using a "Handle CID Data" subroutine in step 1706. The flowchart 1700D, "Handle CID Data", of FIGS. 17D and 17E describes in more detail how the CID data is processed.

With reference to FIGS. 17D and 17E, handling of the CID data involves, among other things, updating the Pump List Data Structure (Table 3 above) and CID List Data Structure (Table 4 above) based on the CID data received from the Transponder Reader Task 1302. In step 1800 of FIG. 17E, the CID Primitive maps the antenna data to the pumps 14. Flowchart 1700M of FIG. 17M describes in more detail the process by which the CID Primitive handles the mapping of antenna data to the pumps. With reference to FIG. 17M, the system checks all antenna data and matches antenna pairs to appropriate pump numbers or free-standing reader in steps 1802 and 1804). Then for each pair of antenna readings (one high-power and one low-power reading per pair), the system determines if either CID number is non-zero (meaning at least one transponder has been read) (step 1806). If neither antenna reading is non-zero, i.e. neither antenna detected a transponder, then system sets the new CID for the pump to none (0) (Step 1808).

If at least one CID is non-zero then in step 1810, the CID Primitive determines whether both CIDs at a pump are non-zero. If both CIDs at a pump are non-zero, i.e., a the high-power antenna detects a vehicle-mounted transponder 23 and the low-power antenna detects a hand-held transponder 25, then the low-power antenna data takes precedence so that the new CID for the pump is set to the non-zero CID number corresponding to the hand-held or key chain type transponder (step 1812). If it is not desired to allow an override by the hand-held transponder 25, then alternatively the system can maintain an error condition and set the new CID for the pump to none (0) (such as in step 1808).

If both CIDs at a pump are not non-zero in step 1810, then in step 1814 the new CID for the pump is set to the non-zero CID number, and the CID type is set to either window-mounted or key chain depending upon which antenna it was read the new non-zero CID.

Returning to flowchart 1700D of FIGS. 17D, 17E, after the antenna data has been mapped to the pumps (step 1800), individually begins processing the antennas (steps 1750, 1752). If in step 1754 the CID value for an antenna is blank (zero) and the pump has no associated CID number, the CID Primitive clears the flag that forces the authorization light off at the pump so that future CID reads will be able to turn on the authorization light (step 1756). Whether or not the force authorization light flag has been cleared, the CID Primitive in step 1758 next compares the current CID read with the previous CID read. If there has been no change, i.e., the current CID read is the same as the previous CID read, then the CID Primitive does nothing (step 1760).

If the current CID is different than the previous CID (step 1762), then the system again determines in step 1764 whether the current CID is blank. If no, then in steps 1820, and 1711, the system performs subroutines to handle new non-blank CID read at the pump and to handle return on status change, respectively. The subroutine for handling new non-blank CID reads is described in more detail in flowchart 1700F of FIGS. 17F, 17G, and the subroutine for handling return on status changes is described in more detail in flowchart 1700C of FIG. 17C. These subroutines are discussed in more detail further below.

If in step 1764, FIG. 17E, the current CID is blank, the system determines whether the previous CID was from a window-mounted (vehicle-mounted) transponder 23 in step 1766. If no, the system does nothing in step 1768 since this means that the previous CID was from a key chain type transponder 25. If the previous CID was a vehicle-mounted transponder 23, the CID Primitive performs steps (steps 1770, 1772, 1711, 1774, 1776, and 1778) to update the Pump List Data Structure (Table 3) and the CID List Data Structure (Table 4) in order to "disconnect" the CID from the pump (step 1774) and disassociate the pump with any CID (step 1778). In step 1776 the vehicle-mounted CID is not immediately deleted, but rather a time is set for later deletion. That way the vehicle-mounted transponder 23 will not turn on authorization lights as it passes other pumps for a predetermined period of time.

With reference to FIGS. 17F, 17G, the steps taken by the CID Primitive to handle a new non-blank CID read at a pump (step 1820 of FIG. 17E) will now be described. First, the CID Primitive determines in step 1821 whether the new CID is in the active CID list (Table 4). If no, the new CID is added to the active list in step 1822, and an authorization request is sent to the network for the new CID (step 1823). The authorization light stays on at the pump (step 1824), and the system next determines whether a different CID had previously be associated with the pump (step 1825). If yes, and the previous (old) CID was from a key chain transponder 25, then the old key chain CID is deleted from the tables (steps 1826 and 1827). If yes, but the previous CID was not from a key chain transponder 25, i.e., it was from a vehicle-mounted transponder 23, then in steps 1828 and 1830, the old CID's entry for "Read by Pump #" column of Table 4 is cleared (set to zero (0)) and a time to delete the old CID from the table is set, respectively. Next, in steps 1831 and 1832 the pump's associated CID index (Table 3) is set and the present pump is set as the entry for the "Read by Pump" column (Table 4), respectively. In step 1834 the processing of the new non-blank CID is completed.

If in step 1821, the new non-blank CID is already on the active CID list, the CID Primitive checks to for whether the new non-blank CID is in use at another pump (steps 1836-1842). If the new CID is from a key chain transponder 25 and is currently being used by another the pump (steps 1837, 1838 and 1839), then the new CID is added to the active CID list in 1822. In this way, the key chain transponder 25 may be used at more than one pump at a time. If the new CID is from a key chain transponder 25 and is not currently being used by another the pump (steps 1837, 1838 and 1839), then in step 1840, the existing CID entry on the table is used, i.e., the a new entry is not made.

If the new CID is from a vehicle-mounted transponder 23 which is not in use by another pump (steps 1837, 1840), then in step 1840, the existing CID entry on the table is used, i.e., the a new entry is not made. If, however, the new CID is from a vehicle-mounted transponder 23 that is in use by another pump (steps 1837, 1840, 1842), then the force light off flag is set so that the new CID read will not turn the authorization light on. Accordingly, the vehicle-mounted transponder is prevented from being used at more than one pump at a time. The processing then ends in step 1834.

Other commands handled by the CID Primitive are discussed further below.

3.4 The CID Primitive/Sale Processing Interface

Outdoor sales processing, i.e., where the customer does not go through a cashier or attendant but makes payment at the dispenser 14 by using either the CAT or the CID code, requires interfacing at a number of steps in the sale process as described below. The various steps include:

1. A new CID is first read at a pump or is first no longer read (goes to a zero CID);
2. Bill Insertion, Card Insertion or Pay Type Key Pressed;
3. Nozzle Lift;
4. Authorization Approval, Denial or Timeout; and
5. End of Sale/Cancel.

In each of the above cases, either the Base CPS code 1502 notifies the CID Primitive 1304 or the CID Primitive 1304 notifies the Base CPS code 1502 that the event or step has transpired (FIG. 15). Both the Base CPS code and the CID Primitive handle these events.

3.4.1 A CID Number is First Read at a Pump

Referring to FIG. 17A, when a CID number is first read at a pump, the CID Primitive 1304 checks to see if there is a return on CID status change request for the pump (see step 1708 and subroutine step 1710 of FIG. 17A and flowchart 1700B "Handle Return on Status Change Request" in FIG. 17B). If so, the CID Primitive sends notification to the Base CPS processing code to inform it of the new CID read. The Base CPS code notifies the application code, which may perform some functions such as changing the CAT display to reflect that a CID has been read at the pump.

Similarly, if a vehicle-mounted CID transponder 23 passes out of the read range of a pump, the CID Primitive informs the Base CPS that the CID is no longer being read at the pump (if a return on status change is requested for that pump). This enables the application code to change the CAT display prompt back to its original state (no CID read state), or perform whatever actions are needed.

The CID Primitive status return interface uses mailboxes for the command request and for the status change notification. The Base CPS sends a return on status change request to the CID Primitive via the CID primitive's Command Mailbox. The CID Primitive processes the request and monitors the CID reads at the CAT. When a new CID is read, it returns the status change to the appropriate state mailbox (mbx) for the requesting CPT (slave reader). FIG. 15 is a diagram 1500 illustrating the return on status change interface.

3.4.2 Bill Insertion, Card Insertion or Pay Type Key Pressed

When a bill (e.g., paper currency) is inserted in the bill acceptor, a card is inserted at the CAT, or a pay type key is pressed at the CAT, the Base CPS code 1502 handles the event in its normal manner. The CPS code also calls the new routine "override_cid_at_pump( )."

The format of the call is:
    override_cid_at_pump (pump_num, & status).

This routine sends an override_cid_at_pump command to the CID command mailbox (see step 1712 and subroutine step 1714 of FIG. 17A, and flowchart 1700H "Handle CID Override" of FIG. 17H). With reference to FIG. 17H, if the pump is not activated yet, then the authorization light is turned off at the pump and the CID is prevented from being used in a sale at the pump (steps 1850 and 1852). If the pump has already been activated, however, then the attempted override is ignored and a message is displayed at the CAT to the effect that the override can not be made (steps 1850, 1854). In step 1856, the override subroutine is ended.

3.4.3 Nozzle Lift

When the nozzle is lifted at a pump 14, if the pump is not already authed (authorized) or an auth (authorization) in progress is set, and if the pump 14 has no problems preventing an authorization, the Base CPS code 1502 calls the new routine "latch_cid_at_pump( )."

The format of the call is:
    latch_cid_at_pump (pump_num, & status).

This routine sends a latch_cid_at_pump command to the CID command mailbox (see step 1716 and subroutine 1718 of FIG. 17A and flowchart 1700K "Handle Latch CID At Pump" of FIG. 17K). With reference to FIG. 17K, when processed, the command checks to see if the pump has a CID read, and if it can be used in the new sale. In particular, in step 1902, the system determines if the pump as an associated CID index. If not, then the sale will not be a CID sale (step 1904) and the force light off flag is set for true, i.e., the pump light is turned off (if not already off) (step 1906).

If the pump does have an associated CID index in step 1902, then the system checks to see whether the force light off flag is already set for the pump, i.e. set to off (step 1908). If yes, then in step 1910 the CID cannot be used in the sale. If the light not set to off, then the CID may be used in the sale, and the CID is associated with the pump sale (step 1912). A status is returned indicating whether or not the sale is a CID sale. In step 1914, Table 4 is updated to indicate the CID is in use at pump. In steps 1916, 1918, and 1920, the appropriate mailbox for the authorization responses is specified, and the CID Primitive forwards the Auth reply or timeout to the appropriate task's mailbox, which is how the system works with pre-auths.

As discussed further above, in order mitigate the effect of any spurious signals that may be picked up by the antennas and to verify that the same CID code is being detected both before and after the nozzle lift, the CID system preferably compares a sampling of readings made before the nozzle lift with a sampling of readings made after the nozzle is lifted. The CID system verifies that the readings before and after the nozzle lift are the same or nearly the same. For example, the CID system may take five readings before the nozzle lift and five readings after the nozzle lift. If all, two or three of the five readings made prior to the lift match all, two or three of the five readings made after the lift, then the CID code is verified. More readings could be made if desired. For example, ten readings made prior to the lift could be compared with ten readings made after the lift. An acceptable comparison may be if five of the readings made before the lift match five of the readings made after the lift.

3.4.4 End of Sale/Cancel

When a sale is canceled or finalized, the Base CPS code 1502 calls the new routine "end_cid_at_pump( )." The format of the call is:

end_cid_sale_at_pump (pump_num, & status);

This routine sends an end_cid_sale_at_pump command to the CID Command Mailbox (see step 1720 and subroutine 1722 of FIG. 17A and flowchart 1700L "Handle end_cid_use_at_pump" of FIG. 17L). This command tells the CID Primitive that the pump sale is over. With reference to FIG. 17L, the CID Primitive determines in step 1930 if a CID in the CID table is associated with the pump and if so, begins cleanup operations on the CID in steps 1932, 1934, 1936, 1938, and 1940. The CID is not immediately deleted, as the system needs to keep the CID and the status of its use in a sale. This is so that when a mounted transponder 23 sale is finished at a pump, the transponder does not turn on authorization lights as it passes other pumps for a predetermined period of time.

3.5 The CID Primitive/Network Communications Interface

The CID Primitive 1304 interfaces with the application-specific network communications code in order to send authorization requests to the appropriate network, and to receive replies from the network.

3.5.1 CID Authorization Request

When a new CID is first seen at an antenna, an authorization request is generated for the CID. A new routine, "authorize_cid( )", interacts with existing network communications code to generate an auth (authorization) request to be sent to a network.

The format of the call is:

authorize_cid (cid_number, cid_index, return_mbx, & status);

where cid_index is a method of identifying the auth return with the CID that is requesting the authorization. This procedure is called by the CID Primitive and does not involve sending any commands to the CID Primitive Command Mailbox.

The Auth Requests are filled in with the CID number rather than a credit card account number and its associated information. This needs to be done for each application, as the individual network interfaces are different.

3.5.2 Auth Approval, Denial or Timeout

When the CID auth is approved, denied or timed out, the CID Primitive receives an auth reply from the network communications code (see step 1724 and subroutine step 1726 of FIG. 17A and flowchart 1700J "Auth Reply" of FIG. 17J). FIG. 16 is a spacial diagram showing the authorization request and reply handling. A procedure, "decode_cid_auth_reply( )," is called by the project-specific network communications code. This procedure handles "decoding" the response from the network into a format that can be used by the application's auth reply handler. It then returns the decoded auth reply to the CID primitive.

The format of the call is:

decode_cid_auth_reply (parameters to be determined).

This procedure is called by the application network communications code. The procedure generates a command (process_cid_auth_reply) to the CID Primitive Command Mailbox to process and possibly forward the decoded Auth Reply.

When a decoded auth reply is received by the CID Primitive, it first determines whether the CID is in the CID list (i.e., is in use) in step 1940. If no, the CID authorization or time out is thrown away in step 1943. If yes, the CID Primitive stores a pointer to the auth reply in the CID structure, and changes the Auth Status for that CID (step 1942). If the CID is in use at a pump and the Forwarding Mailbox is set (step 1944), the CID Primitive sends the CID Auth Reply to the forwarding mailbox (step 1946). Note that in step 1946, if the Auth is approved, the Base CPS/Application will copy the billing information for the sale finalization. If the Auth is denied or times out, the Base CPS/Application will terminate the sale and stop the pump. If in step 1944 the CID's forwarding mailbox has not been set, then in step 1948 the authorization information is saved for future forwarding incase the CID is used later at a pump.

The auth reply, after being forwarded to the correct mailbox, is handled by the application-specific code, which processes the auth reply. If the auth is approved, the application may continue the sale. If the auth is denied or timed out, the application may stop the sale at the pump.

Note FIGS. 17N and 17O shows a flowchart 1700N of a "Begin CID Auth Task" 1950. The steps 1750N, 1752N, 1754N, 1756N, 1758N, 1760N, 1762N, 1764O, 1766O, 1768O, 1770O, 1772O, 1774O, 1776O, 1778O, and 1820O are similar to steps 1750, 1752, 1754, 1756, 1758, 1760, 1762, 1764, 1766, 1768, 1770, 1772, 1774, 1776, 1778, and 1820 of flowchart 1700D of FIGS. 17D and 17E. Flowchart 1700N has the added step 1952 of determining whether the pump is in use. If so, then in step 1954, any CID read at an in-use pump is ignored.

4.0 Options

The following are various descriptions of additions or changes that may be made to the CID system. One or more of the variations may be made to the system at a time.

4.1 Car Wash

For service stations that have an automated car wash, a stand-alone reader with a long-range antenna for detecting vehicle-mounted transponders and a short-range antenna for detecting key ring/card type transponders may be positioned at the entrance to the car wash. Customers can use either their vehicle-mounted transponder or hand-held transponder to pay for the car wash or be authorized for a free car wash if the service station gives free car washes for fueling.

The network can keep information regarding the customer's preferences for a car wash (such as a wash only, wax, dry, etc.) so that the customer does not need to input the information at the carwash, but may proceed with the car wash once authorization is given. The preferences may be displayed at a customer-activated-terminal (CAT) provided on the stand-alone reader and overridden by pressing appropriate keys at the CAT if desired.

Where a service station provides free car washes and the customer has met the criteria for receiving the free car wash, the CAT displays a message to the customer that the customer is entitled to the free car wash. The customer is also give the option to add other car wash services (such as wax or dry) that may not be included with the free car wash. These additional services can then be charged against the customer's transponder account.

4.2 Hand-Held Antenna

As an option service stations could be provided with hand-held or wand-type antennas at the dispenser islands. The hand-held antenna may be waved in front of a vehicle-mounted transponder by, for example, a gas station attendant who is dispensing fuel at a full service island.

4.3 Nozzle Antenna

As an option, reader antennas may be placed on the fuel dispenser nozzle, and the customer transponder may be placed in the inlet or neck of the vehicle gas tank. When the fuel nozzle dispenser nozzle is inserted into the gas tank inlet, the nozzle antenna detects the gas tank transponder.

4.4 PIN Number

As an option, the CID system may be programmed to display a request at the CAT for a personal identification number (PIN). The PIN would be a number different from the CID number and may be used in lieu of a correct CID number reading or to verify a transponder reading of a CID number. In response to the PIN request, the customer would use the key pad at the CAT to enter the PIN.

4.5 Indoor Payment

A key ring/card reader may placed inside the service station building for purchases of other products such as food, car supplies, or magazines that may be offered by the service station. For example, many service stations include a convenience store that offers a variety of items for sale. A reader could be positioned near the check-out counter. The customer may wave a key ring/card type transponder past the reader in order to pay for items being purchased.

4.6 Reward and Recognition

The network keeps track of the customer's past purchases and buying preferences and provides rewards for frequent purchases. When a transponder is read, the CAT can display a message indicating rewards that the customer may be entitled to such as a car wash.

The network can also keep a profile of the customer and provide customized service for the customer based on the profile. The profile can include customer information such as: customer name, address, telephone number, date of birth, and security code; payment information such as: primary method of payment (card number, valid dates, card type) and secondary method of payment (card number, valid dates, card type); preference information such as: CAT receipt desired, language (English, Spanish), car wash preference; and purchasing information such as: product purchased, date of purchase, amount of purchase, quantity purchased. An example of customized service based on a customer profile includes the automatic printing of a receipt at the CAT. Or, the customer can obtain full service fueling, i.e., dispensing of the fuel by a service attendant. The customer merely drives up to the dispenser, allow the vehicle-mounted transponder (or hand-held transponder) to be read by a dispenser antenna, and the network sends a signal to the attendant to dispense the fuel.

The profile of the customer can be constructed based on questionnaires completed by the customer and input into the network and by prior transactions completed by the customer.

4.7 Car Diagnostic

Many vehicles include computers that keep track of the car's diagnostics. For example, the computer keeps track of the radiator water level, the oil level, and the car mileage. The CID transponders may be linked to the vehicle's computer in order to read the diagnostic information and may broadcast the information to a service station CID antenna. The CAT at the service station dispenser can then display reminders based on the diagnostic information to the customer such as the car's oil needs to be changed.

4.8 Attendant Control Over Dispenser

A service station attendant may override the use of a transponder if fraud is suspected. For example, an attendant may wish to halt the dispensing of fuel at a pump if the attendant suspects that the user was merely waiting at the pump until a vehicle with a vehicle-mounted transponder went by and activated the authorization light on the pump.

5.0 Further System Description

Presented herein below is a further description of the CID system 10 as can be implemented with a commercially available fuel dispensing system, such as the Wayne Plus/2, Wayne Plus/3, or Nucleus fuel dispensing systems available from Wayne Division, Dresser Industries, Inc. of Austin, Tex. Specifically, certain changes can be made to the fuel dispensing control system for incorporating the remote RF CID features of the system 10, including changes that can be made to the programming screens as part of the host computer 16, the network record, and the reports and logs.

VI. Additional System Details

1.0 Detailed System Description

1.1. Changes to Programming Screens

For a station environment to operate with a CID system, certain programming screens will need to be added. An options screen, which contains the ability to turn CID functions on and off for an entire station, is added and is described in more detail below. The ability to turn on and off each reader is programmed. Also, if the station is configured for CID, a screen for the mapping of the antennae to the CATs is programmed. A diagnostic screen is added to display the status of each reader and its corresponding antennae.

1.1.1 Options Screen

The above mentioned screens can be added under the Plus/3 Options Menu of the Programming Menu on the Wayne Plus dispenser.

The Options Screen will contain the Station Options screen, the Reader Activation screen, the Antenna to CAT Mapping screen, and the Diagnostic screen. Each of these screens is described below. The "Reader Activation", "Antenna to CAT Mapping", and "Diagnostics" screens will not be seen if a station is not configured to run CID.

1.1.2 Station Options Screen

The Options screen, as shown in Table D-1 below, contains the information needed to setup a station for CID.

SpeedPass allowed at station . . . YES

Table D-1: Station Options Screen

This screen allows the station to turn the CID option on or off for the entire station. This will allow stations to shut off the CID option in the event that the station does not want to operate with CID. The term "SpeedPass," shall be used herein below as referring to the system 10. If "SpeedPass allowed at station" is set to No, the "Reader Activation", "Antenna to CAT Mapping", and "Diagnostics" screens will not be seen on the Options Screen.

1.1.3. Reader Activation Screen

A reader can be turned on or off at this menu. If a reader is turned off, the 4 antennae associated with it will not be used. The Reader Activation screen is shown in Table D-2 below.

TABLE D-2

| Reader Activation Screen | |
| --- | --- |
| SpeedPass Reader 1 | ON |
| SpeedPass Reader 2 | ON |
| SpeedPass Reader 3 | OFF |
| SpeedPass Reader 4 | ON |

Turning a reader off for a particular pump may be necessary if an individual reader is malfunctioning.

1.1.4. Antenna to CAT Mapping Screen

The Antenna to CAT Mapping Screen is shown in Table D-3 below.

TABLE D-3

| Antenna to CAT Mapping Screen | | | |
| --- | --- | --- | --- |
| Antenna to CAT Mapping | | | |
| Rdr-Ant:CAT | Rdr-Ant:CAT | Rdr-Ant:CAT | Rdr-Ant:CAT |
| 1½:1 | 2½:3 | 3½:5 | 4½:7 |
| 1¾:2 | 2¾:4 | 3¾:6 | 4¾:8 |

The Antenna-to-CAT Mapping screen indicates which antennae are positioned on which CATs. There are two antennae per CAT. The odd numbered antennae will be the long range antennae that read the mounted transponders. The even numbered antennae wilt be the short-range antennae that read the hand held transponders.

If the CAT number is a "0", then the antennae are not physically connected to a CAT and are ignored. An example of this type of reader setup is for a single-sided CAT where the reader only has 2 antennae connected.

1.1.5 Diagnostic Screen

This screen will provide the status of CIDs at the antennae. This screen will serve as an aid in the debugging process. An example of this screen is shown below in Table D-4.

TABLE D-4

| Diagnostics Screen | | |
| --- | --- | --- |
| SpeedPass Diagnostics | | |
| Rdr-Ant | Mounted CID # | Hand-Held CID # |
| 1½ | 1234567890123456789 | 0000000000000000000 |
| 1¾ | 0000000000000000000 | 1234567890123456789 |
| 2½ | 3456789012345678901 | 0000000000000000000 |
| 2¾ | 4567890123456789012 | 2345678901234567890 |
| 3½ | 0000000000000000000 | 0000000000000000000 |
| 3¾ | 0000000000000000000 | 0000000000000000000 |
| Refresh | | |

1.2 Network Record Changes 1.2.1 CID Authorization Request

For the CID authorization request, "ICID" will be appended to the 20 digits read from the transponder and sent in the magnetic stripe field of the authorization record.

1.2.2 CID Authorization Reply

For the CID authorization reply, Network will send the account number back in the reply record with the following fields:

Field 5, record type will be set to "A" denoting a CID transaction

Field 8 (new field), account number—19 bytes of account number, space filled

Field 9 (new field), expiration date—4 bytes

Field 10 (new field), print receipt indicator—1 byte

Field 11 (new field), prompt for car wash indicator 1 byte

Field 12 (new field), language indicator—1 byte

Field 13 (new field), reward indicator—1 byte

Field 14 (new field), preference indicator—1 byte

Field 15 (new field), preference data—40 bytes

The print receipt indicator (field 10) denotes whether the receipt will be automatically printed or the customer will be prompted. If a 'Y' is received in the authorization response, the receipt will automatically be printed for the customer. If a 'N' is received in the authorization response, the customer will be prompted "Press Yes for a receipt." The prompt for car wash indicator, the language indicator, and the reward indicator (fields 11, 12, and 13, respectively) may be implemented. The preference indicator (field 14) denotes whether the preference data field is present or not. The first 33 bytes of the preference data field (field 15) will be displayed on the indoor console in the pump message window.

1.2.3 CID Sale

For the CID sale completion, the 37th position of the magnetic stripe data will contain a "C" indicator similar to a manual entry.

1.3 Reports & Logs

The reports and authorization log will change for any transactions involving CID to include the CID number. The reports that will change are the Denied CAT Pre-Auth report and the Hardware Configuration report. The proposed changes are described below. Non-CID transaction will be reported as they previously were, with no change to the logs or the Denied CAT Pre-Auth report.

1.3.1 Authorization Log

The authorization log will be changed for CID to indicate that a CID transaction has occurred. The CID number will be added under the account number field on the log. An example of the CID authorization log is shown below in Table D-5. The proposed changes are in bold face print. If the transaction is a CID pre-auth (i.e. the Pre-auth field in the card table is set to 'Y'), the title on the authorization log will be "SP PRE AUTHORIZATION".

TABLE D-5

| Authorization Log |
| --- |
| 051695 14:30:36    SP AUTHORIZATION |
| Acct  #        805 086 000 91 906          Exp 0697 |
| SP    #        1CID 1234 5678 9012 3456 7890 |
| Addr  #        1    TID# 01           Amount $10.00 |
| Host Message: OK TO PUMP 05000 |

1.3.2 Denied CID/Timed-Out CID

If a customer has removed the nozzle on a Vista pump or lifted the lever on a non-Vista pump and the auth received from the network is denied, the transaction will be treated as a Denied Pre-Auth, shown in Table D-6 below.

TABLE D-6

| Denied CAT Pre-Auth Report without SpeedPass |
| --- |
| Station |
| Report Taker: Donna |
| Denied CAT Pre-Auths X Report |
| Start Time: 12:00:00pm Tue 09 May 95 |

TABLE D-6-continued

Denied CAT Pre-Auth Report without SpeedPass

FUEL TICKET #002929
05/17/95     06:05:18     PMP# 01
CR Acct 805 086 000 91 906     Exp. 0597
SPECIAL     Grade# 02     Amt $11.78
x0006e10s01t1 04:25:00pm Wed 24 May 95

The Modified Denied CAT Pre-Auth report will include CID numbers as shown in bold face print in Table D-7 below.

TABLE D-7

Modified Denied CAT Pre-Auth Report with SpeedPass

Station

Report Taker: Donna
Denied CAT Pre-Auths X Report
Start Time: 12:00:00pm Tue 09 May 95
FUEL TICKET #002929
05/17/95     06:05:18     PMP# 01
CR Acct 805 086 000 91 906     Exp. 0597
SP #1CID 1234 5678 9012 3456 7890
SPECIAL     Grade# 02     Amt $11.78
x0006e10s01t1 04:25:00pm Wed 24 May 95

If a customer has removed the nozzle (Vista pump) or lifted the lever (non-Vista pump) and the network goes down prior to receiving the auth response, the transaction will be treated as a Denied CAT Pre-Auth (the report is shown in Table D-8 below). The account number and expiration date fields will be printed with all zeroes to indicate that a time-out has occurred prior to receiving the auth (i.e. no account information is available at that time).

TABLE D-8

Denied CAT Pre-Auth Report with SpeedPass and No Auth Response

Station

Report Taker: Donna
Denied CAT Pre-Auths X Report
Start Time: 12:00:00pm Tue 09 May 95
FUEL TICKET #003131
05/17/95     06:05:18     PMP# 01
CR Acct 000 000 000 00 000     Exp. 0000
SP #1CID 1234 5678 9012 3456 7890

TABLE D-8-continued

Denied CAT Pre-Auth Report with SpeedPass and No Auth Response

SPECIAL     Grade# 02     Amt $11.78
x0006e10s01t1 04:25:00pm Wed 24 May 95

1.3.3 Hardware Configuration Report

The Hardware Configuration Report will change to include the CID reader firmware revision information. A sample report is shown in Table D-9 below.

TABLE D-9

Modified Hardware Configuration Report with SpeedPass

Station

Report Taker: Donna
H/W Configuration Report
POS CPU:
Wayne Plus/2 Release 2.10e
DATE: Mar 23, 1995
.
.
.
PUMP 1:
TYPE: 3 Product
REVISION: 15
PUMP 2:
TYPE: 3 Product
REVISION: 15
SPEEDPASS READER 1:
REVISION: 1.23
x000E04S01T1 08:00:00am Mon 1 Jan 95

1.4 CAT Display Changes

If the CID light is on and the CID idle prompt "Begin Fueling or Cancel SpeedPass" is displayed at the CAT, indicating a CID has been read at the CAT, and the nozzle has not been removed or the lever has not been lifted, the customer may press the cancel key to override the CID payment method. The CAT will prompt the customer "Cancel use of SpeedPass? (Y/N)". If Yes is pressed, the CID light will turn off and the CAT will display the normal idle prompt (e.g. "Insert card or Begin Fueling"). If No is pressed, the CAT will display "Begin fueling or Cancel SpeedPass" and the scenario will continue as if the cancel key was never pressed (i.e. as a CID transaction).

Table D-10 below describes the idle prompts that will be used if a CID has been read.

TABLE D-10

CAT Idle Prompt Changes

| Station Operation | Current Idle Display* | | New Idle Display[1] | |
|---|---|---|---|---|
| Postpay | Insert card or Begin fueling | | Begin fueling or Cancel SpeedPass | |
| Postpay/Network Down | Pump first then Pay inside | | Network down Press cancel | |
| Postpay w/BAC | Insert card/cash or Remove nozzle | | Begin fueling or Cancel SpeedPass | |
| Postpay w/BAC/Network Down | Pump first then Pay inside | | Network down Press cancel | |
| Prepay | Insert card or Pay cashier | | Begin fueling or Cancel SpeedPass | |
| Prepay/Network Down | Pay cashier before fueling | | Network down Press cancel | |
| Prepay w/BAC | Insert card/cash or Pay cashier | | Begin fueling or Cancel SpeedPass | |
| Prepay w/BAC/Network Down | Insert cash or Pay cashier | | Network down Press cancel | |
| Full Serve[1] | Card, Nozzle or Preset | 0.00 | Card, Nozzle or Preset | 0.00 |
| Full Serve/Network Down[1] | Remove Nozzle or Preset | 0.00 | Remove Nozzle or Preset | 0.00 |
| Full Serve w/BAC[1] | Card, Cash, Nozzle or Preset | 0.00 | Card, Cash, Nozzle or Preset | 0.00 |
| Full Serve w/BAC/Net Down[1] | Cash, Nozzle or Preset | 0.00 | Cash, Nozzle or Preset | 0.00 |

TABLE D-10-continued

CAT Idle Prompt Changes

| Station Operation | Current Idle Display* | New Idle Display<sup>f</sup> |
|---|---|---|
| Unattended | Insert card | Begin fueling or Cancel SpeedPass |
| Unattended w/BAC | Insert card or cash | Begin fueling or Cancel SpeedPass |
| Unattended w/BAC, Net Down | Insert cash | Network down Press cancel |

*Idle Prompts
[1]Prompts to be used if station is configured for CID and a transponder has been read at CAT
[f]Idle prompts in full serve mode will not change 2.0 Additional Features 2.1 Multiple Transponder Use A transponder may be used at more than one pump at a time. A warning system has been implemented to inform the cashier that a transponder is currently being used for a CID sale at one pump and a sale is beginning at another pump that will use the same CID. An inform message is displayed on the POS for the second use of the CID when the nozzle is removed for a Vista pump or when the lever is lifted for a non-Vista pump. The cashier is required to acknowledge the message, the customer is not stopped in any way from using this transponder in a multiple use scenario. If the cashier does not want the customer to use the transponder in this manner then the cashier must hit pump stop or notify the customer.

The message displayed on the indoor POS is "CID at CAT #X in use at CAT #Y". The cashier will then press the acknowledge key. An error log message, "CID IN USE AT OTHER CAT", will also be printed.

2.2 Reward Indicator

The authorization response received from the host contains a reward indicator field. If this field contains a 'Y', then the CID light will flash off and on until the end of the sale, if this field contains a 'N', then the CID light will remain on as before indicating that a CID has been read. When the light is in flash mode, the light is not an indicating of a CID in read range anymore; if the nozzle is removed for a Vista pump or lifted for a non-Vista pump when the tight is off during this flash mode, the sale is a CID transaction.

2.3 Blank Read Threshold

The Station Options Screen has been modified to include a programmable blank read threshold as shown in Table D-11 below. This field is used to aid in weeding out false CID reads, these blank reads can occur while the CID is actually in read range. This option allows programming the number of consecutive blanks that register that the CID has moved out of read range. The CID light will not be turned off for a mounted CID until the number of consecutive blank reads threshold is reached.

TABLE D-11

Modified Station Options Screen

| SpeedPass Station Options | |
|---|---|
| SpeedPass allowed at station | YES |
| Blank CID reads required to indicate no CID | 5 |

2.4 CID Light Operation for Denied Mounted CID Authorization

For mounted CIDs, the CID light will be turned off whenever a denied authorization is received from the host. The light will not be turned on again after the nozzle is replaced for that mounted CID.

3.0 Miscellaneous Additional Features

Miscellaneous additional features, including the following items, may also be implemented. Such miscellaneous additional features may include: Use Car Wash preference; Use of transponders indoors; Turn on car wash; Display reward at the CAT during fueling; Flashing "P" for customer preferences display on the console; Use of the language indicator; and Poor Man's Store & Forward.

VII. Functional Operation of Speedpass System

In addition to the above, the following section further describes some of the functional operation of another embodiment of an RF-CID (LUHF) system, hereafter referred to as the "SpeedPass system." In particular, the following section provides a description of the relationship between customer activities, the dispenser control board (a.k.a., digital control board, DCB) activities, messages exchanged on the RS 485 bus, and the host computer responses to these activities and events. Customer refers to a person at a fuel dispenser purchasing fuel.

As previously discussed, transponders are used with the LUHF system of the present invention. The transponders may include three types of transponders, such as, read only hand held transponders; digital signal transponder (DST) hand held transponders; and vehicle transponders which can be read by the LUHF system. The DST hand held and vehicle transponders have a 32 bit ID. Older read only transponders have a 64 bit ID. Hereafter, reference to a 32 bit ID shall be interpreted to include a 64 bit ID, for simplicity.

1.0 System Software Architecture 1.1 Message Traffic

The host computer is continuously polling the DCB's which, in response, return their antenna scan buffers. The DCB's are continuously polling the antennas, both overhead (long range) and hand held (short range), for a transponder in range. Polling refers to the sending of a get variable length antenna scan buffer command to a DCB. When a DCB detects a transponder, the transponder's ID number is placed in the scan buffer, wherein the scan buffer is passed onto the host computer. When the host computer is ready to proceed with a sale, the host computer takes over the bezel light control (alternatively, the activation light) of a dispenser pump from the particular DCB. This is accomplished via the enable/disable light control command. That is, when the host computer is controlling the light, it uses the enable/disable light control command. In addition, periodically, the host computer broadcasts a sync message that all DCBs will use to resynchronize their internal clocks.

1.2 Antenna Scan Buffers

The antenna scan buffer is a data structure that is maintained by each DCB. Each DCB can control up to four antennas. Each scan buffer has room to store the ID for a transponder at each antenna.

We will now briefly describe how data gets from the transponder to the DCB for the hand held transponder. Due to the nature of operation of a DST (Digital Signature Transponder) type hand held transponder, the DCB must retrieve all the needed data from the transponder at the time it is presented. The DCB must retrieve all of this data before turning on the SpeedPass light (a.k.a., authorization light), or the customer may remove the transponder from the antenna reading range before the DCB has had an opportunity to complete it's interrogation of the transponder. This needed data information is preferably stored by the DCB until requested by the host computer. By temporarily maintaining this information, the DCB will make the mechanics of retrieving data from a hand held and a vehicle transponder appear the same to the host computer.

When the DCB places the ID from a hand held transponder in the antenna scan buffer, the ID will remain there until the data is transmitted to the host computer. This is true even if the transponder can no longer be read by the DCB. The command response protocol used by the host computer does not have a mechanism for data retransmission. If a data link error occurs during transmission of the data to the host computer, then on the next poll to that DCB the host computer will poll with a retry buffer command. Upon receiving the retry buffer command, the DCB will transmit the same transponder data it transmitted the last time. This means that the DCB must keep the hand held transponder ID in the antenna scan buffer until it receives a second poll. In response to the second poll, the DCB is no longer required to maintain the transponder ID in the antenna scan buffer, unless the transponder is still being scanned by the antenna. In the later instance, the data will still be in the buffer and transmitted to the host computer.

2.0 Typical Vehicle Transponder Scenario

At an idle state, the host computer gives control of the SpeedPass light to the DCB. As a transponder comes in to an antenna read range, its response is detected by the DCB and the SpeedPass light is turned on. After querying the transponder for its identifier, the identifier is placed in the DCBs antenna scan buffer. The host computer, which is continuously polling the DCBs for antenna scan buffer data, sends the new transponder data to a DCPT task, which is responsible for the control of that fueling point. The system has one DCPT task for each CAT controlled fueling point in the station.

The DCPT task changes the CAT prompt and waits for up to three minutes for the nozzle to be lifted, a CAT button to be pushed, a card to be swiped at the CAT, or a bill to be placed in the bill acceptor. If none of these occur within three minutes, the DCPT task sends messages to the DCB that turn off the SpeedPass light and take control of the Light from the DCB via the Enable/Disable Dispenser Lamp control command. The DCPT task then returns the CAT prompts back to idle state messages. At this point, a CID sale cannot occur until the transponder is removed from the dispenser antenna read range.

If the customer pushes the cancel key on the CAT keypad, then the DCPT task sends messages to the DCB that turn off the SpeedPass light, take control of the light from the DCB and resume polling after a blank read (Resume Polling command). The DCPT task then returns the CAT prompts back to idle state messages. The customer may then swipe a card for a credit sale, present a hand held transponder or remove the nozzle and begin fueling, in which case the system assumes the sale will be tendered inside.

If a customer swipes a credit card at the CAT, then the DCPT task sends messages to the DCB that turn off the SpeedPass light, take control of the light from the DCB, and quit polling the overhead antenna (Get Transponder Challenge Code command). The DCPT task then sets the CAT prompts to a credit sale message. The sale is then handled as a credit sale.

If the customer loads bills into the bill acceptor, the DCPT task sends messages to the DCB that turn off the SpeedPass light, take control of the light from the DCB, and quit polling the overhead antenna. The DCPT task then sets the CAT prompts to a bill acceptor sale message. The sale is then handled as a bill acceptor sale.

If the customer presents a hand held transponder, the system processes the hand held transponder and ignores the vehicle transponder. The DCPT task sends a message to the DCB to quit polling the overhead antenna and, while the DCB stops polling, it maintains the identifier in the antenna scan buffer for the vehicle transponder until instructed to resume polling. This is to prevent turning on the SpeedPass light after the sale is over using the hand held transponder.

If the nozzle is lifted within the three minute time period, the DCPT tasks sends messages to the DCB to turn on the SpeedPass light (which was already on), take control of the SpeedPass light from the DCB, change the CAT prompts to begin fueling, and command the DCB to retrieve the authentication code from the transponder. At this point, the sale is a CID sale. The DCB retrieves the authentication code from the transponder and returns it to the host computer, which then sends the information on to the appropriate credit corporation for authorization.

When the host computer detects fuel being dispensed, it will command the DCB to poll the transponder. If the transponder cannot be read, the scan buffer is cleared of data and the DCB returns as an active antenna status on the next poll by the host computer. If the authorization from the credit corporation is denied, then the pump is stopped and the station attendant is alerted. At that point, the sale is to be tendered inside the station. If the authorization from the credit corporation is approved, the sale is completed as a credit sale using the authorization information sent from the credit corporation. When the sale is completed (e.g., customer has replaced the nozzle), the host computer sends messages to the DCB to turn off the SpeedPass light and give control of the light to the DCB. Since there is a transponder in read range when the DCB receives control of the light, it waits for that transponder to leave before it allows the light to come on again.

3.0 Typical Hand Held Transponder Scenario

At an idle state, the host computer gives control of the SpeedPass light to the DCB. When a customer places his hand held transponder in front of the hand held antenna, the DCB will read the 32 bit ID from the transponder. This allows the DCB to determine if the transponder is a read only or DST type transponder. If the transponder is a DST type, the challenge code is presented by the DCB right away with no intervention by the host computer. When the DCB has received all the necessary transponder data, the 32 bit transponder ID is placed in the antenna scan buffer. If the transponder is a DST type, the challenge code and authentication data is placed in a separate buffer.

The host computer, which is continuously polling the DCBs for antenna scan buffer data, sends the new transponder data to the DCPT task, which is responsible for the control of that fueling point. The task changes the CAT prompts, sends a message to the DCB taking control of the SpeedPass light and waits for up to 30 seconds for the nozzle to be lifted, a CAT button to be pushed, or a card to be swiped at the CAT. If none of these events occur within 30 seconds, the DCPT task sends messages to the DCB that turn off the SpeedPass light and return control of the light to the DCB that turn off the SpeedPass light and return control of the light to the DCB. The DCPT task then returns the CAT prompt back to the idle state message.

If the customer pushes the cancel key on the CAT keypad, then the DCPT task sends messages to the DCB that turn off the SpeedPass light and return control of the light to the DCB. The DCPT task then returns the CAT prompt back to the idle state message. The customer may then swipe a card for a credit sale, put bills in the bill acceptor, present another hand held transponder, or remove the nozzle and begin fueling, in which case the system will assume the sale will be tendered inside the station.

If the customer swipes a credit card at the CAT, then the DCPT task sends messages to the DCB that turn off the SpeedPass light and return control of the light to the DCB. The DCPT task then sets the cat prompt to the credit sale message. The sale is then handled as a credit sale.

If the customer presents a second hand held transponder, the sale is terminated. The CAT first displays "CANNOT ACCEPT SECOND SPEEDPASS NOW" then goes into a pump stopped condition. The SpeedPass light is turned off. At this point the station operator must get involved to restart the sale. Control of the light by the DCB and resumption of polling begins when the pump is returned to its normal state. This is similar to the way a second credit card swipe at a CAT is currently handled.

If the nozzle is lifted within the 30 second time period, then the DCPT task changes the CAT prompt to begin fueling and commands the DCB to retrieve the authentication code from the transponder. At this point the sale is a CID sale. The DCB returns the authentication code, retrieved earlier, to the host computer which sends the information to the appropriate credit corporation for authorization. If the authorization from the credit corporation is denied, then the pump is stopped and the station attendant is alerted. At that point, the sale is to be tendered inside the station as it is no longer a CID sale. If the authorization is approved, then the sale is completed as a credit sale using the authorization information sent from the credit corporation. When the sale is completed, the host computer sends messages to the DCB to turn off the SpeedPass light and give control of the light to the DCB.

4.0 Invalid Hand Held Transponder Scenario

There are two types of invalid SpeedPass transponders, those which were issued by an accepted credit issuer (e.g., Mobil) but are not valid, and those not issued by the accepted credit issuer. When either is detected by the DCB, the DCB sends the transponder data to the host computer. The host computer compares the transponder data to card table data to determine if the transponder was one issued by an accepted credit issuer. If the transponder data indicates that it is one issued by an accepted credit issuer and if the card table indicates that the SpeedPass is to be preauthed, the pump is authorized and customer is allowed to fuel. The transponder data is then sent to appropriate credit corporation. If the credit corporation denies the authorization, then the host computer will stop the pump, display the "See Cashier" message on the pump, and turn of the SpeedPass light. If the transponder data indicates that it is not one issued by an accepted credit issuer, then the pump is not turned on, the SpeedPass light is turned off, and CAT displays the "See Cashier" message. This later operation will take approximately 1 second after recognition of the transponder by the DCB.

Although illustrative embodiments of the present invention have been shown and described, a latitude of modification, change and substitution is intended in the foregoing disclosure, and in certain instances, some features of the invention will be employed without a corresponding use of other features. For example, any type of commercially available dispensing system may be modified, adapted or replaced to comprise the system 10. Any number of pumps, islands, antennas, dispensing areas and kiosks may be included as part of the system. Certain features are to be modified to meet the specific needs of different competing service station companies. Aspects of the operational flow of the system may optionally be used or not used. While the system may be used for retail fuel dispensing; it is also understood that the system also has application for convenience stores, quick service restaurants, car washes and the like. For example, the system may have application at a drive-up window or service counter. Accordingly, it is appropriate that the appended claims be construed broadly and in a manner consistent with the scope of the invention.

What is claimed is:

1. A fuel dispensing method with radio frequency customer identification capabilities for charging a customer for sales transacted by the customer at one of a plurality of fuel dispensers located in a fuel dispensing area in which vehicles may drive through and may stop in order to receive fuel from one of the fuel dispensers, each of the fuel dispensers requiring activation by the customer in order to initiate a transaction resulting in a sale, the method comprising:

emitting radio frequency signals from a plurality of first antennas in such a manner that a plurality of first, independent, electromagnetic fields of predetermined operable range are created adjacent the fuel dispensers such that each said first electromagnetic field corresponds to one dispenser and the operable range of each said first electromagnetic field does not overlap the operable range of another said first electromagnetic field corresponding to a different dispenser;

determining whether a vehicle-mounted transponder containing customer identification data is within the operable range of one of said first electromagnetic fields whereupon the customer identification data contained in the vehicle-mounted transponder is received by a reader associated with the fuel dispenser corresponding to the electromagnetic field which the vehicle-mounted transponder is within;

if a vehicle-mounted transponder is determined to be within the operable range of one of said first electromagnetic fields, providing an in-range indication to the customer that the vehicle-mounted transponder is within the electromagnetic field;

determining whether the dispenser has been activated by the customer;

if there has been a determination that there has been an activation of the dispenser associating the customer identification data received by the reader from the vehicle-mounted transponder with a transaction at the activated dispenser, whereupon the transaction at the activated dispenser is permitted and charged to the customer according to the customer identification data;

emitting radio frequency signals from a plurality of second antennas in such a manner that a plurality of second, independent electromagnetic fields of predetermined operable range are created adjacent said fuel dispensers such that each said second electromagnetic field corresponds to one dispenser and the operable range of each said second electromagnetic field does not overlap the operable range of another said second electromagnetic field corresponding to a different dispenser, and wherein said second electromagnetic fields have relatively small operable ranges in relation to the operable ranges of said first electromagnetic fields;

determining whether a hand-held transponder containing customer identification data is within the operable range of one of said second electromagnetic fields whereupon the customer identification data contained in the hand-held transponder is received by a reader associated with the fuel dispenser corresponding to the electromagnetic field which the hand-held transponder is within;

if a hand-held transponder is determined to be within the operable range, of one of said second electromagnetic fields, determining whether the fuel dispenser corresponding to the electromagnetic field that the hand-held transponder is within has been activated by the customer;

if a hand-held transponder is determined to be within the operable range of one of said second electromagnetic fields and there has been a determination that there has been an activation of the corresponding fuel dispenser, associating the customer identification data received by the reader from the hand-held transponder with a transaction at the activated dispenser, whereupon the transaction at the activated dispenser is permitted and charged to the customer according to the customer identification data from the hand-held transponder; and if a vehicle-mounted transponder is determined to be within the operable range of one of said first electromagnetic fields and if a hand-held transponder is determined to be within the operable range of one of said second electromagnetic fields corresponding to the same fuel dispenser, then overriding the use of the customer identification data from the vehicle-mounted transponder so that the customer identification data from the hand-held transponder may be used to process the transaction at the fuel dispenser.

2. The method of claim 1 wherein the dispenser is a fuel dispenser having a nozzle, and activation of the dispenser comprises lifting the nozzle.

3. The method of claim 1 wherein the dispenser is a fuel dispenser having a nozzle lever, and activation of the dispenser comprises lifting the nozzle lever.

4. The method of claim 1 wherein the antenna is a hand-held antenna which may be waved in front of the vehicle mounted transponder for placing the transponder in dispenser range.

5. The method of claim 1 wherein the vehicle to which a vehicle-mounted transponder is mounted includes an on-board computer and the vehicle-mounted transponder is linkable to the on-board computer for reading vehicle diagnostic information for transmission from the vehicle-mounted transponder to one of the first antennas.

6. The method of claim 1 wherein said fuel dispensing area includes a service station building, a reader placed inside said service station building, and at least one third antenna associated with said service station building reader, said method further comprising:

emitting radio frequency signals from said third antenna in order to create an electromagnetic field of predetermined operable range in said service station building for use with a hand-held transponder for completing transactions at the service station building.

7. The method of claim 1 wherein a reader is associated with a car wash for use of the transponder for completing a car wash transaction.

8. A dispensing system with radio frequency customer identification capabilities for charging a customer for sales transacted by the customer, the system comprising:

a plurality of transponders containing customer identification data, the plurality of transponders comprising at least one vehicle-mounted transponder and at least one hand-held transponder;

a dispenser having at least one associated dispensing area at which a customer may conduct a dispensing transaction with the dispenser;

a plurality of antennas, each including at least one long-range antenna having a predetermined operable long range in the dispensing area and at least one short range antenna having a predetermined operable short range in the dispensing area of the dispenser, the long-range antenna being located relative to the dispenser for use in connection with the vehicle-mounted transponder, and the short-range antenna being located relative to the dispenser for use in connection with the hand-held transponder;

at least one reader operably commented to the antennas to emit radio frequency signals from the long range antenna within the predetermined operable long range of the dispensing area and from the short range antenna within the predetermined operable short range of the dispensing area, and to receive customer identification data from the vehicle-mounted transponder or the hand-held transponder responsive to the emitted radio frequency signals when the vehicle-mounted transponder or the hand-held transponder is within the predetermined operable range of the respective long-range antenna or short-range antenna associated with the dispensing area; and processing equipment in communication with the at least one reader and the dispenser for associating customer identification data received at the dispensing area with a transaction at the dispenser, whereupon the transaction at the dispenser is charged to the customer according to the customer identification data, the processing equipment being operable to override the use of the vehicle-mounted transponder for charging the transaction to the customer and instead allowing use of the hand-held transponder for charging the transaction to the customer when both the vehicle-mounted transponder and hand-held transponder are within the respective predetermined operable long range and short range of the dispensing area.

9. The system of claim 8 further comprising an in-range indicator associated with the dispenser and responsive to said vehicle-mounted transponder or the hand-held transponder being within the predetermined range of the respective long-range antenna or short-range antenna.

10. The system of claim 8 wherein the predetermined operable long range comprises a vehicle fueling distance from the dispenser.

11. The system of claim 8 wherein the predetermined operable short range comprises a location within several inches from the short-range antenna in which the hand-held transponder may be waived by the customer.

12. A fuel dispensing method with radio frequency customer identification capabilities for charging a customer for sales transacted by the customer, the method comprising:

determining whether a vehicle-mounted transponder containing customer identification data is within a vehicle fueling range of a dispenser, the dispenser requiring activation by the customer to initiate a transaction and including a reader associated therewith for emitting from a first antenna radio frequency signals within the vehicle fueling range, and for receiving customer identification data from the transponder responsive to the emitted radio frequency signals received by the transponder;

determining whether a hand-held transponder containing customer identification data is within a close range of the dispenser, the close range being smaller than the vehicle fueling range, the reader including a second antenna for emitting radio frequency signals within the close range, and for receiving customer identification data from the transponder responsive to the emitted radio frequency signals received by the transponder;

providing an in-range indication to the customer when a vehicle-mounted transponder is within the vehicle fueling range or a hand-held transponder is within the close range;

determining whether the dispenser has been activated by the customer;

if there has been a determination that there has been an activation of the dispenser, associating the customer identification data received by the reader from either the vehicle-mounted transponder or the hand-held transponder with a transaction at the activated dispenser, whereupon the transaction at the activated dispenser is permitted and charged to the customer according to the customer identification data; and if both a vehicle-mounted transponder and a hand-held transponder are determined to be within the respective vehicle fueling range and close range before the dispenser is activated, overriding the use at the dispenser of the vehicle-mounted transponder, whereupon following activation of the dispenser the hand-held customer identification data received by the reader is associated with a transaction at the activated dispenser, the transaction at the activated dispenser is permitted and charged to the customer according to the hand-held transponder customer identification data.

13. A fuel dispensing method with radio frequency customer identification capabilities for charging a customer for sales transacted by the customer, the method comprising:

determining whether a vehicle-mounted transponder containing customer identification data is within a vehicle fueling range of a dispenser, the dispenser requiring activation by the customer to initiate a transaction and including a reader associated therewith for emitting from a first antenna radio frequency signals within the vehicle fueling range, and for receiving customer identification data from the transponder responsive to the emitted radio frequency signals received by the transponder;

determining whether a hand-held transponder containing customer identification data is within a close range of the dispenser, the close range being smaller than the vehicle fueling range, the reader including a second antenna for emitting radio frequency signals within the close range, and for receiving customer identification data from the transponder responsive to the emitted radio frequency signals received by the transponder; and associating the customer identification data received by the reader from either the vehicle-mounted transponder or the hand-held transponder with a transaction at the dispenser, whereupon the transaction at the dispenser is permitted and charged to the customer according to the customer identification data; and providing an in-range indication to the customer when a vehicle-mounted transponder is within the vehicle fueling range or a hand-held transponder is within the close range.

14. A fuel dispensing method with radio frequency customer identification capabilities for charging a customer for sales transacted by the customer, the method comprising:

determining whether a vehicle-mounted transponder containing customer identification data is within a vehicle fueling range of a dispenser, the dispenser requiring activation by the customer to initiate a transaction and including a reader associated therewith for emitting from a first antenna radio frequency signals within the vehicle fueling range, and for receiving customer identification data from the transponder responsive to the emitted radio frequency signals received by the transponder;

determining whether a hand-held transponder containing customer identification data is within a close range of the dispenser, the close range being smaller than the vehicle fueling range, the reader including a second antenna for emitting radio frequency signals within the close range, and for receiving customer identification data from the transponder responsive to the emitted radio frequency signals received by the transponder;

associating the customer identification data received by the reader from either the vehicle-mounted transponder or the hand-held transponder with a transaction at the dispenser, whereupon the transaction at the dispenser is permitted and charged to the customer according to the customer identification data; and if both a vehicle-mounted transponder and a hand-held transponder are determined to be within the respective vehicle fueling range and close range, overriding the use at the dispenser of the vehicle-mounted transponder, whereupon the hand-held customer identification data received by the reader is associated with a transaction at the dispenser, and the transaction is permitted and charged to the customer according to the hand-held transponder customer identification data.

15. A method for authorizing a dispensing transaction, comprising:

emitting radio frequency signals from a short-range antenna mounted in or on a first dispenser of a plurality of dispensers such that an electromagnetic field of a predetermined operable range is created proximate a surface of the first dispenser, and the dispenser can wirelessly communicate with hand-held transponders within the operable range independent of electromagnetic fields generated by other dispensers in the plurality of dispensers, wherein the predetermined operable range is up to about six inches extending perpendicular to the surface of the first dispenser;

determining that a hand-held transponder containing customer identification data is within the operable range of the short-range antenna of the first dispenser;

wirelessly receiving customer identification data in the hand-held transponder by a reader associated with the first dispenser and activating the first dispenser in response to the hand-held transponder passing within the operable range of the short-range antenna;

identifying credit card information based, at least in part, on the customer identification data;

verifying, with a remote credit card processing site, a customer account associated with the customer identification data prior to permitting the transaction at the activated dispenser; and authorizing a charge of the transaction to the verified customer account.

16. The method of claim 15, wherein verifying the customer account includes accessing a remote card processing network.

17. The method of claim 15, wherein verifying the customer account includes accessing a local file for account verification.

18. The method of claim 15, wherein verifying the customer account occurs after the at least one dispenser is activated.

19. The method of claim 15, wherein verifying the customer account occurs prior to the activation of the dispenser.

20. The method of claim 15, wherein the dispenser comprises a fuel dispenser.

21. The method of claim 15, further comprising presenting an indication generated by an indicator on the first dispenser to indicate to a customer at least one of when the transponder is within the operable range of the first dispenser and when the customer is authorized to begin dispensing.

22. The method of claim 15, further comprising canceling the requested transaction if there is a violation of a predetermined time limit.

23. The method of claim 15, wherein the first dispenser wirelessly communicates with the hand-held transponder without substantial interference from other dispensers wirelessly communicating with transponders.

24. A method for authorizing a dispensing transaction, comprising:

emitting radio frequency signals from a short-range antenna mounted in or on a first dispenser surface of a plurality of dispenser surfaces such that a first electromagnetic field of a predetermined operable range is created proximate the first dispenser surface to wirelessly communicate with hand-held transponders within the predetermined operable range independent of a second electromagnetic field of the predetermined operable range created proximate a second dispenser surface in the plurality of dispenser surfaces and generated by a short-range antenna integral to the second dispenser surface, wherein the first electromagnetic field is emitted throughout the predetermined operable range adjacent the second electromagnetic field such that the first electromagnetic field does not overlap the second electromagnetic field;

determining that a hand-held transponder containing customer identification data is within the operable range of the short-range antenna of the first dispenser surface;

wirelessly receiving customer identification data in the hand-held transponder by a reader associated with the first dispenser surface: and activating a corresponding dispenser in response to the hand-held transponder passing within the operable range of the short-range antenna of the first dispenser surface;

identifying credit card information based, at least in part, on the customer identification data;

verifying, with a remote credit card processing site, a customer account associated with the customer identification data prior to permitting the transaction at the activated dispenser; and authorizing a charge of the transaction to the verified customer account.

25. The method of claim 24, wherein verifying the customer account includes accessing a remote card processing network.

26. The method of claim 24, wherein verifying the customer account includes accessing a local file for account verification.

27. The method of claim 24, wherein verifying the customer account occurs after the dispenser is activated.

28. The method of claim 24, wherein verifying the customer account occurs prior to the activation of the dispenser.

29. The method of claim 24, wherein the dispenser comprises a fuel dispenser.

30. The method of claim 24, further comprising presenting an indication generated by an indicator on the first dispenser surface to indicate to a customer at least one of when the transponder is within the operable range of the first dispenser surface and when the customer is authorized to begin dispensing.

31. The method of claim 24, further comprising canceling the requested transaction if there is a violation of a predetermined time limit.

32. The method of claim 24, wherein the short range antenna of the first dispenser surface wirelessly communicates with the hand-held transponder without substantial interference from the short range antenna of the second dispenser surface wirelessly communicating with a second hand-held transponder.

33. The method of claim 24, wherein the predetermined operable range is up to about six inches extending perpendicular to the first or second dispenser surface.

34. The method of claim 24, wherein the first dispenser surface and the second dispenser surface are opposite sides of one dispenser.

* * * * *

UNITED STATES PATENT AND TRADEMARK OFFICE
CERTIFICATE OF CORRECTION

| | | |
|---|---|---|
| PATENT NO. | : 7,640,185 B1 | Page 1 of 2 |
| APPLICATION NO. | : 09/224027 | |
| DATED | : December 29, 2009 | |
| INVENTOR(S) | : Giordano | |

It is certified that error appears in the above-identified patent and that said Letters Patent is hereby corrected as shown below:

First page Column 1 (Inventors), Line 1: Delete "Centerville," and insert --Centreville,--, therefore; (Assignees) Lines 2-3: Delete "ExxonMobile Oil Corporation, Fairview, VA (US);" and insert -- ExxonMobil Oil Corporation, Fairfax, VA (US); --, therefore.

Column 3, Line 51: Delete "vet" and insert -- yet --, therefore.

Column 4, Line 67: Delete "With" and insert -- with --, therefore.

Column 6, Line 19: Delete "With" and insert -- with --, therefore; Line 25: Delete "or" and insert -- of --, therefore.

Column 9, Line 3: Delete "Graphically" and insert -- graphically --, therefore.

Column 10, Line 34: Delete "tights" and insert -- lights --, therefore.

Column 13, Line 19: Delete "22A." and insert -- 22A, --, therefore.

Column 14, Line 59: Delete "A and A respectively. Transponder Y" and insert -- B and A respectively. Transponder Y --, therefore.

Column 18, Line 37: Delete "number=2" and insert -- number=1 --, therefore.

Column 24, Line 29: Delete "Tektronics" and insert -- Tektronix --, therefore.

Column 27, Line 14: Delete "keying," and insert -- keyring, --, therefore.

Column 34, Line 32: Delete "Returned" and insert -- Returned: --, therefore; Line 58: Delete "Wavne+host" and insert -- Wayne+host --, therefore.

Column 38, Line 24: Delete "tight" and insert -- light --, therefore.

Signed and Sealed this

Twenty-second Day of June, 2010

David J. Kappos
*Director of the United States Patent and Trademark Office*

Column 39, Line 28: Delete "Mounted" and insert -- mounted --, therefore.

Column 40, Line 14: Delete "it" and insert -- if --, therefore.

Column 45, Line 17: Delete "Light" and insert -- light --, therefore.

Column 46, Line 53: Delete "tights" and insert -- lights --, therefore.

Column 49, Line 47: Delete "fights." and insert -- lights --, therefore; Line 67: Delete "code)" and insert -- code). --, therefore.

Column 50, Line 2: Delete "code)" and insert -- code). --, therefore.

Column 51, Line 48: Delete "a the" and insert -- the --, therefore.

Column 53, Line 11: Delete "the a" and insert -- a --, therefore; Line 16: Delete "the a" and insert -- a --, therefore.

Column 58, Line 58: Delete ""SpeedPass,"" and insert -- "SpeedPass" --, therefore.

Column 59, Line 30: Delete "wilt" and insert -- will --, therefore.

Column 63, Line 44: Delete "tight" and insert -- light --, therefore.

Column 65, Line 57: Delete "Light" and insert -- light --, therefore.

Column 68, Line 35, in claim 1: Delete "in such a manner that" and insert -- and creating --, therefore; Line 37: after "range" delete "are created"; Lines 37-38: Delete "such that" and insert -- wherein --, therefore; Line 66: Delete "in such a manner that" and insert -- and creating --, therefore.

Column 69, Line 2, in claim 1: Delete "such that" and insert -- wherein --, therefore.

Column 74, Line 6, in claim 1: Delete "surface:and" and insert -- surface and --, therefore.